(12) United States Patent
Swanson et al.

(10) Patent No.: US 10,132,367 B2
(45) Date of Patent: Nov. 20, 2018

(54) MODULAR VISCOUS FAN CLUTCH SYSTEM

(71) Applicant: Kit Masters, Perham, MN (US)

(72) Inventors: Craig Swanson, Perham, MN (US); Dale Scherman, Perham, MN (US)

(73) Assignee: KIT MASTERS, INC., Perham, MN (US)

( * ) Notice: Subject to any disclaimer, the term of this patent is extended or adjusted under 35 U.S.C. 154(b) by 286 days.

(21) Appl. No.: 14/230,608

(22) Filed: Mar. 31, 2014

(65) Prior Publication Data

US 2014/0209492 A1 Jul. 31, 2014

Related U.S. Application Data

(62) Division of application No. 13/843,703, filed on Mar. 15, 2013, now Pat. No. 8,745,867.

(Continued)

(51) Int. Cl.
*F16D 35/00* (2006.01)
*B65D 85/00* (2006.01)
(Continued)

(52) U.S. Cl.
CPC ............... *F16D 35/00* (2013.01); *B25H 5/00* (2013.01); *B62B 3/10* (2013.01); *B65D 85/00* (2013.01); *F16D 2300/12* (2013.01); *Y10T 29/4973* (2015.01); *Y10T 29/49318* (2015.01); *Y10T 29/49739* (2015.01); *Y10T 29/49895* (2015.01); *Y10T 29/53* (2015.01)

(58) Field of Classification Search
CPC ................ F16D 35/00; F16D 2250/00; F16D 2250/0061; F16D 2250/0084; F16D 2300/12; B23P 6/00; Y10T 29/49233; Y10T 29/49318; Y10T 29/4973
See application file for complete search history.

(56) References Cited

U.S. PATENT DOCUMENTS 5,971,512 A * 10/1999 Swan ...................... B25H 1/10
                                                            211/131.1
6,102,177 A *  8/2000 Moser ..................... F16D 37/02
                                                            192/21.5
(Continued)

OTHER PUBLICATIONS

U.S. Appl. No. 29/467,160, filed Sep. 16, 2013, Swanson, et al.
(Continued)

*Primary Examiner* — Christopher Besler
(74) *Attorney, Agent, or Firm* — Gardella Grace P.A.

(57) ABSTRACT

A viscous clutch head may be replaced by selecting a viscous clutch head and a mount adapter. The viscous clutch head and the mount adapter may be selected from a group of universal modular fan drives and from a group of mount adapters. The mount adapter of a threaded type or a flange and bolt type may be selected. Depending on the viscous clutch head to be replaced, a fan adapter and/or a pilot adapter may also be selected from a group of fan adapters and from a group of pilot adapters. Accordingly, a range of models of viscous fan clutch systems may be replaced by using a limited number of parts. These parts may be stored on a tool cart. As different models of viscous fan clutch systems may be replaced using a limited number of parts, the in-stock inventory of replacement parts may be reduced.

19 Claims, 84 Drawing Sheets

Related U.S. Application Data

(60) Provisional application No. 61/752,067, filed on Jan. 14, 2013, provisional application No. 61/754,728, filed on Jan. 21, 2013.

(51) Int. Cl.
*B25H 5/00* (2006.01)
*B62B 3/10* (2006.01)

(56) References Cited

U.S. PATENT DOCUMENTS

| | | | | |
|---|---|---|---|---|
| 6,669,214 | B1* | 12/2003 | Domis | B25H 3/00 |
| | | | | 280/47.19 |
| 2010/0282562 | A1 | 11/2010 | Swanson et al. | |
| 2011/0207577 | A1* | 8/2011 | Swanson | H02K 49/00 |
| | | | | 476/11 |
| 2012/0164002 | A1* | 6/2012 | Roczniak | F04D 25/022 |
| | | | | 417/319 |

OTHER PUBLICATIONS

U.S. Appl. No. 29/467,163, filed Sep. 16, 2013, Swanson, et al.
U.S. Appl. No. 29/467,162, filed Sep. 16, 2013, Swanson, et al.
U.S. Appl. No. 14/268,499, filed May 2, 2014, Swanson, et al.

* cited by examiner

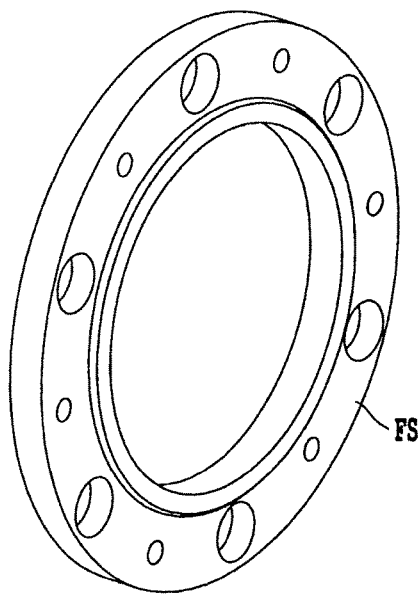
*Fig.3A*
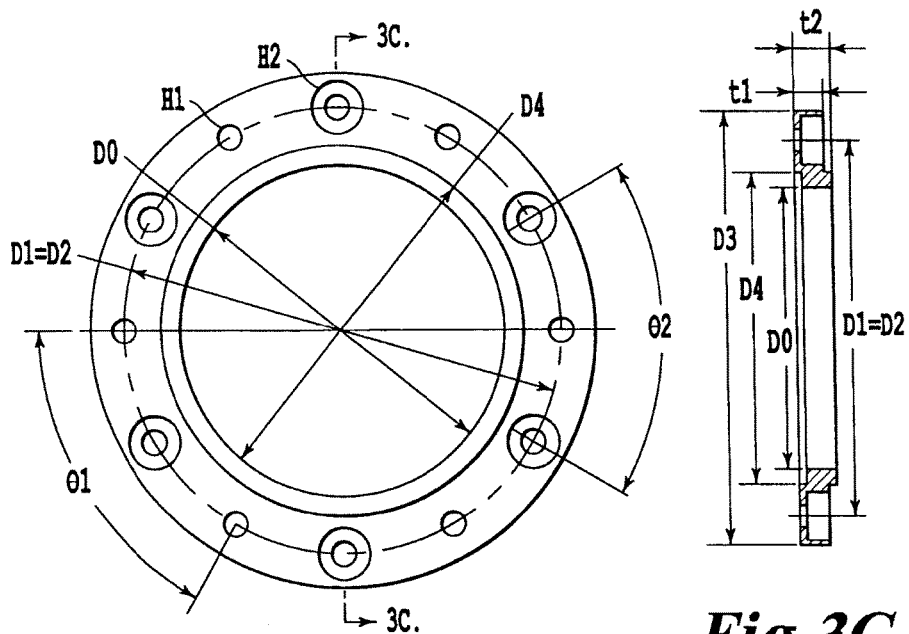
*Fig.3B*
*Fig.3C*

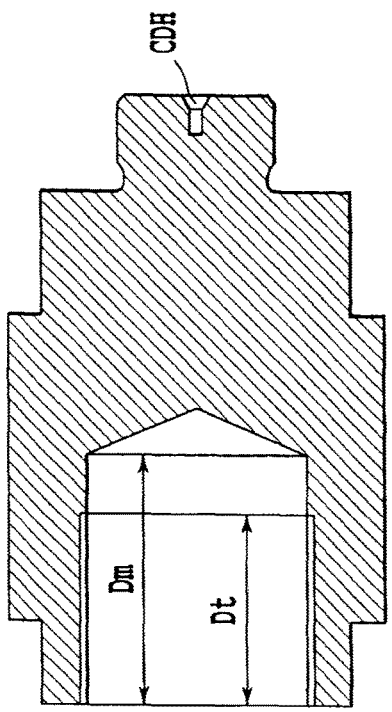
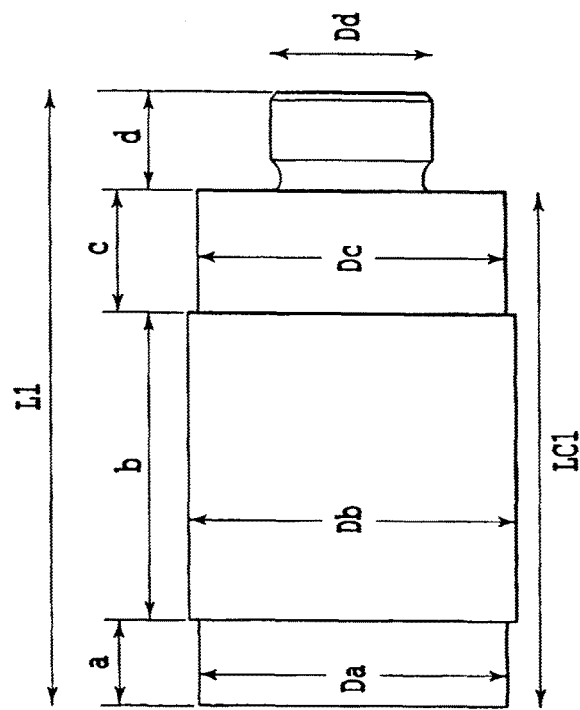
*Fig. 4D*
*Fig. 4C*

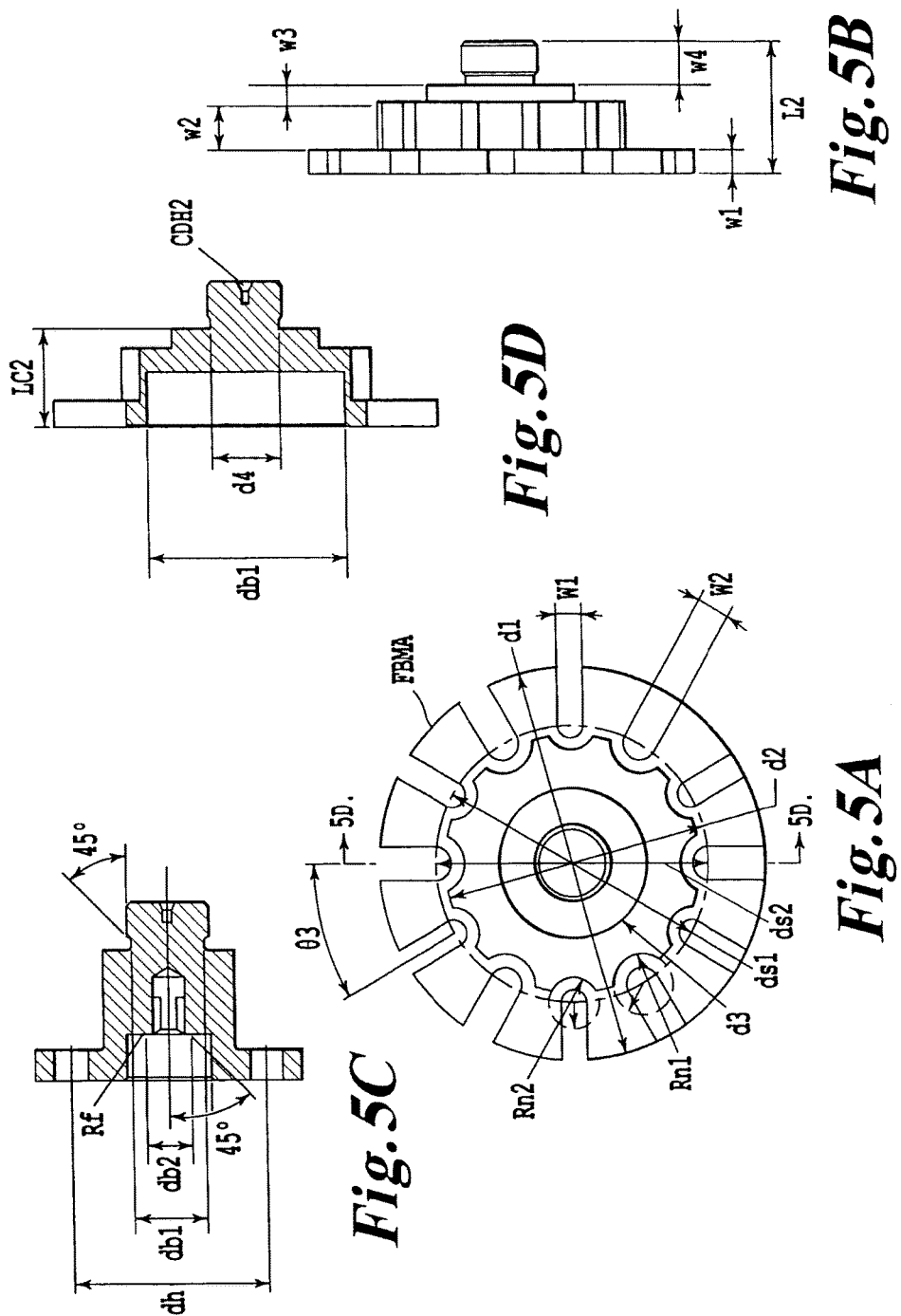

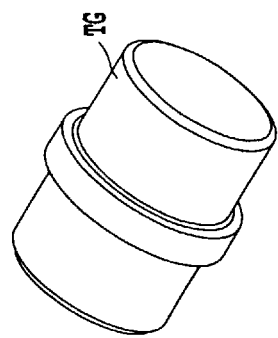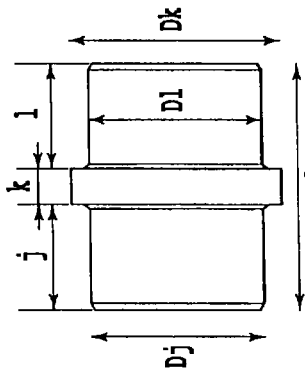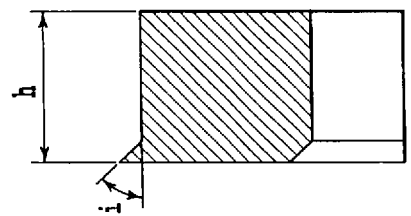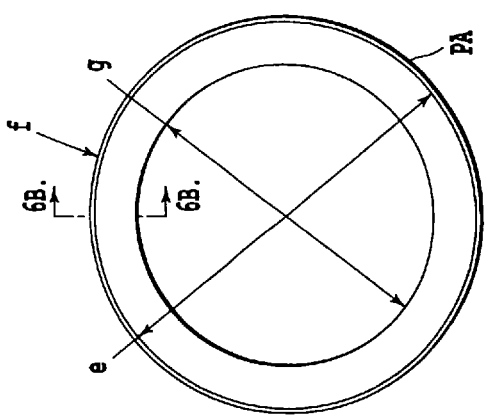

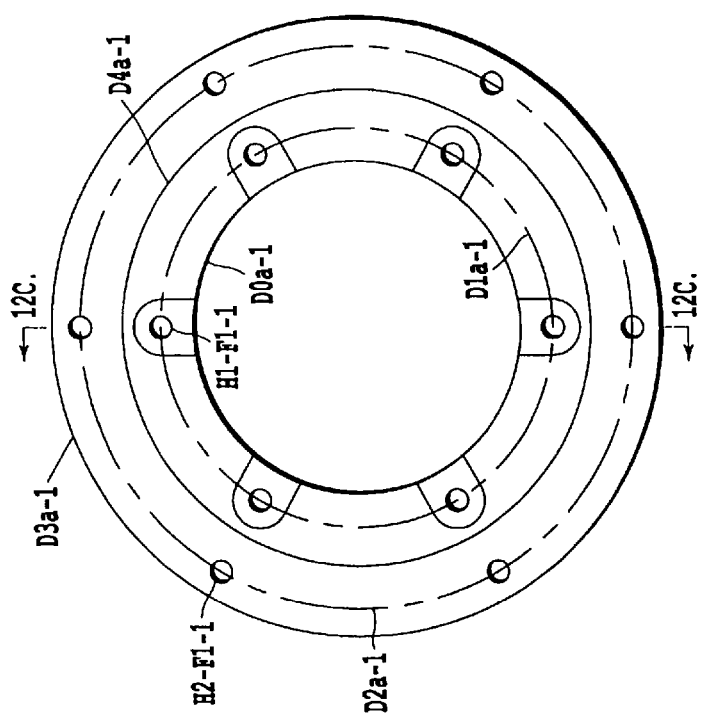

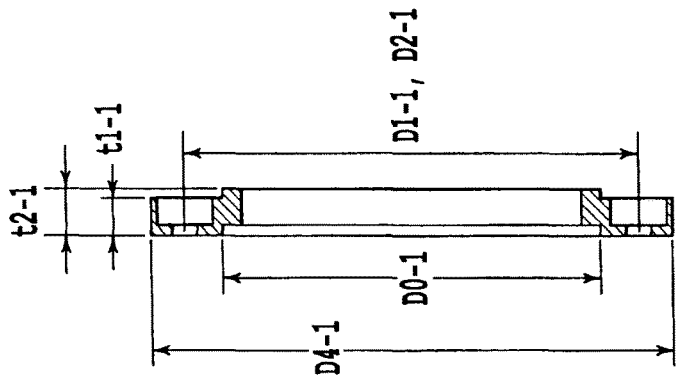
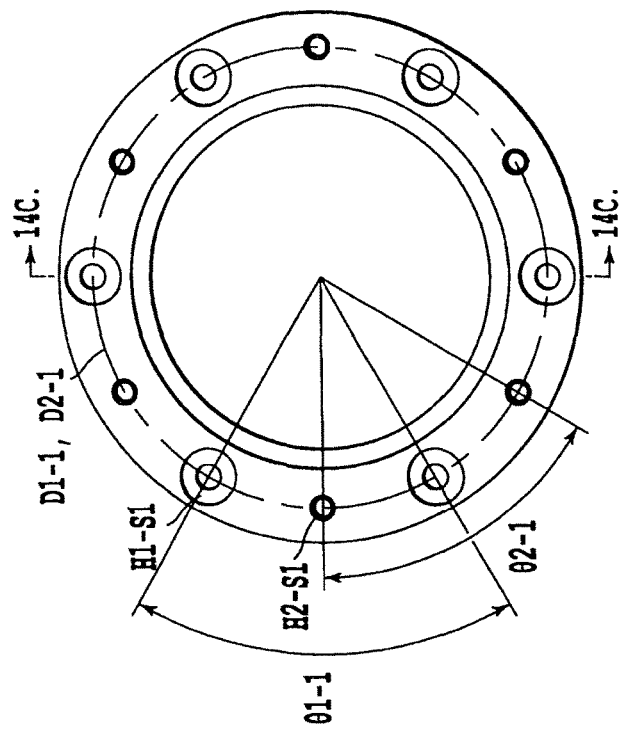
Fig.14C
Fig.14B

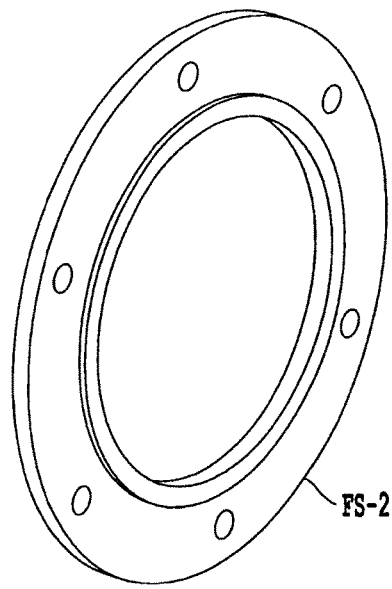
*Fig.15A*
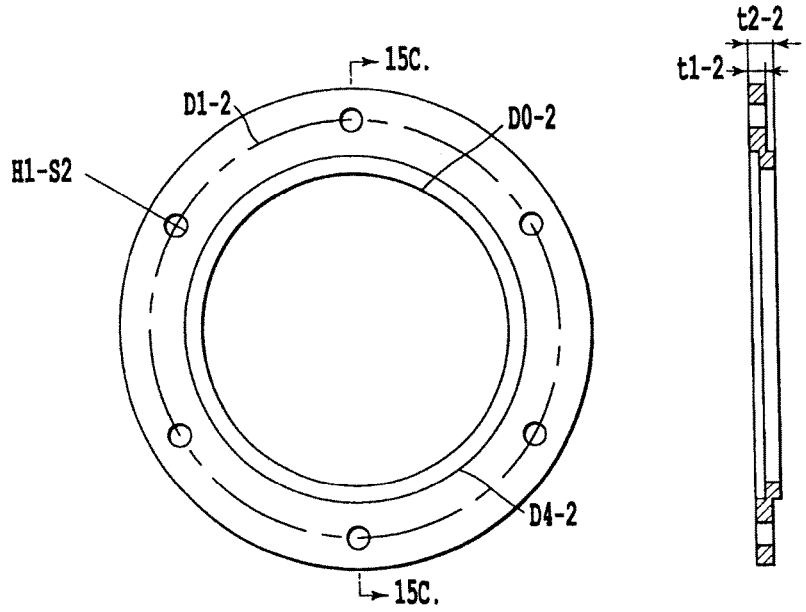 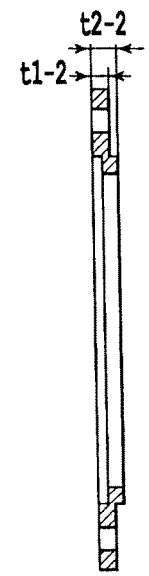
*Fig.15B*          *Fig.15C*

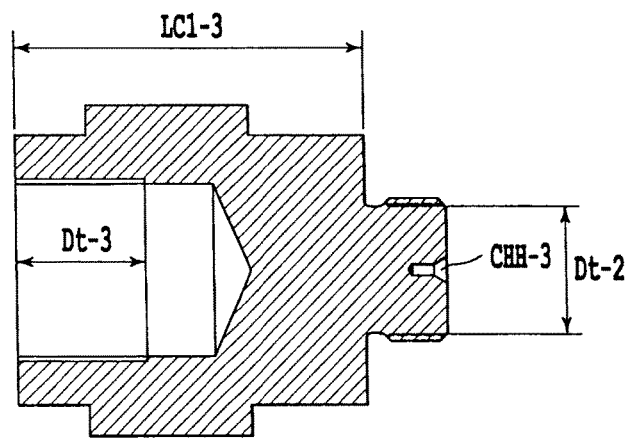
*Fig.18D*
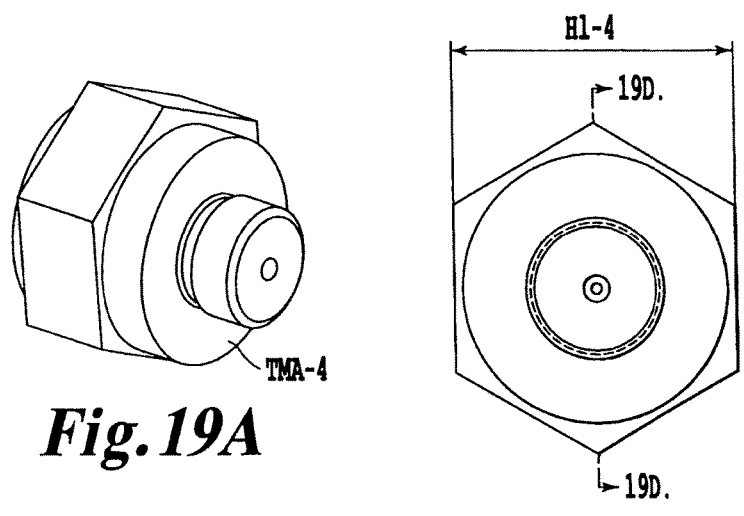
*Fig.19A*  *Fig.19B*

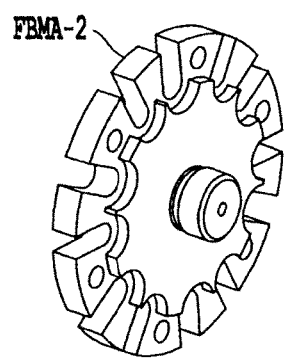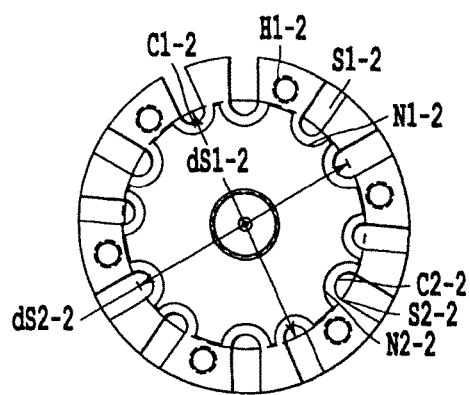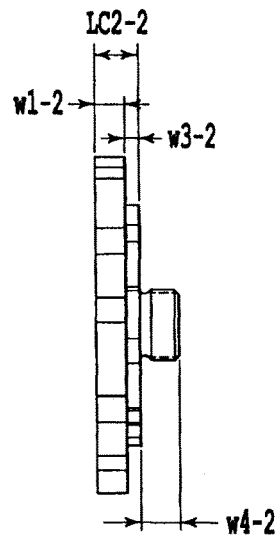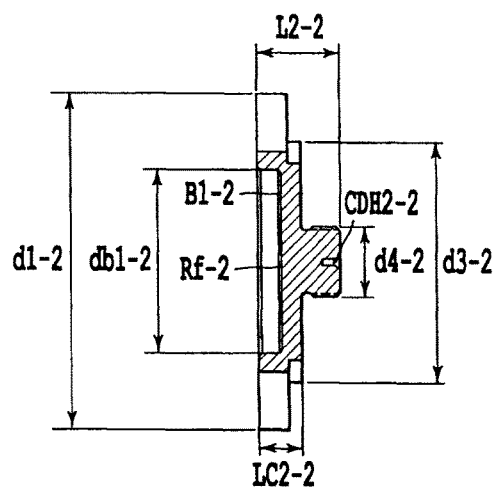
*Fig.40A*   *Fig.40B*
*Fig.40C*   *Fig.40D*

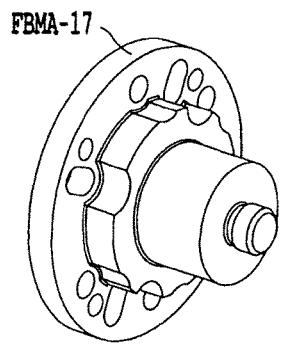
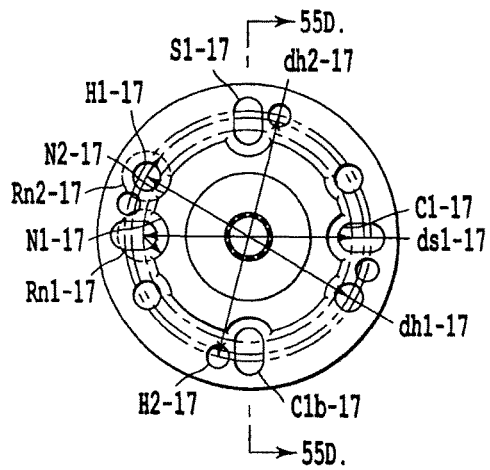
*Fig.55A*
*Fig.55B*
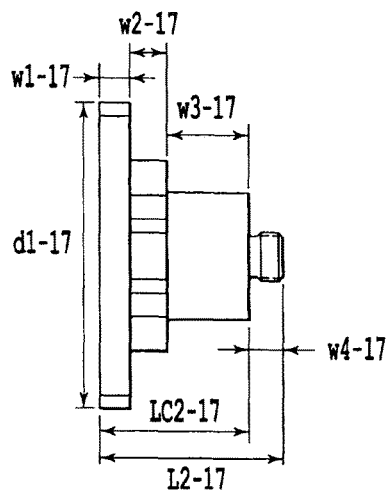
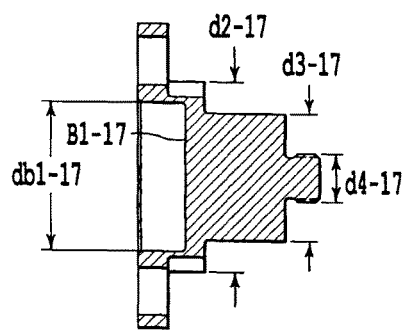
*Fig.55C*
*Fig.55D*

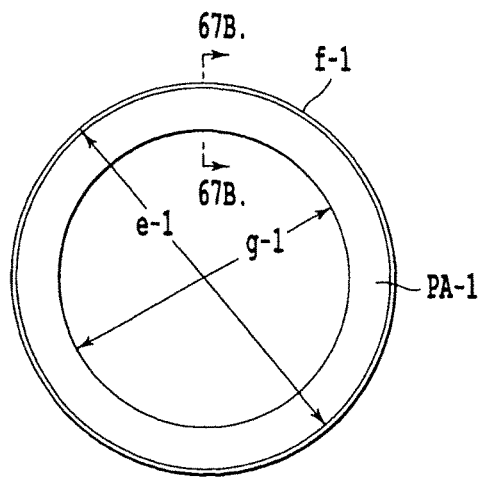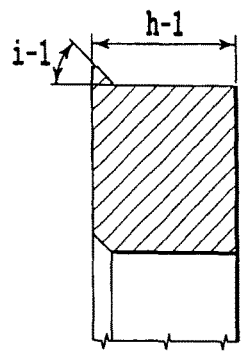
*Fig.67A*  *Fig.67B*
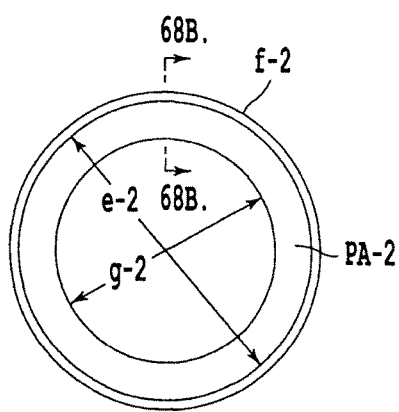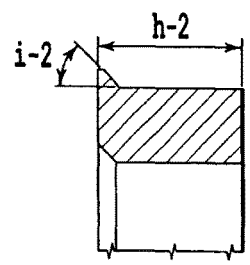
*Fig.68A*  *Fig.68B*

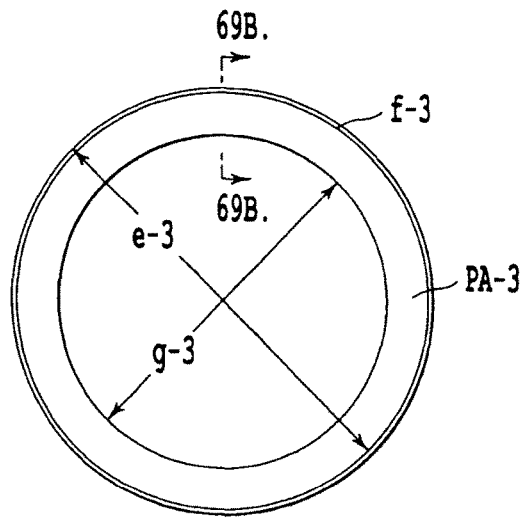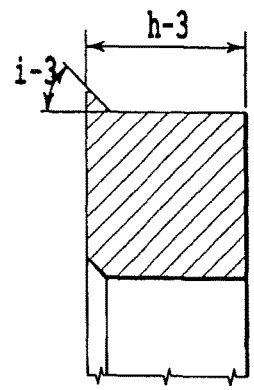
*Fig. 69A*  *Fig. 69B*
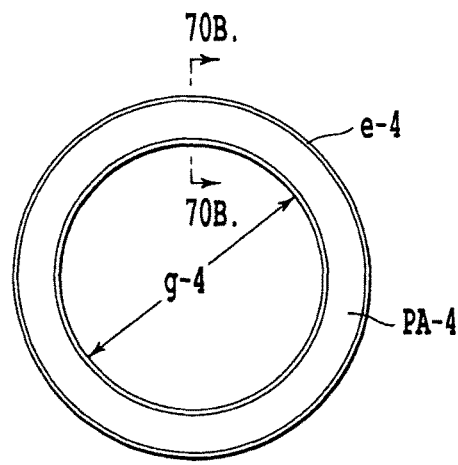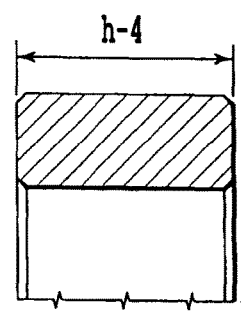
*Fig. 70A*  *Fig. 70B*

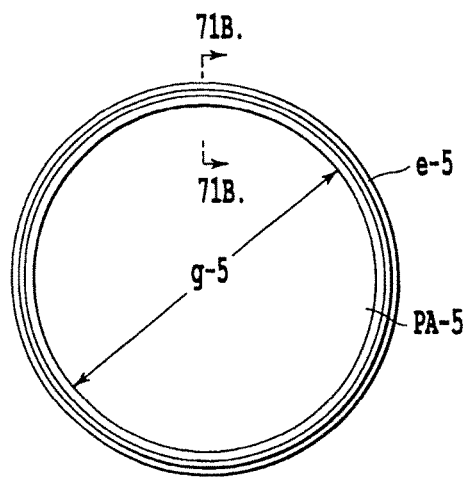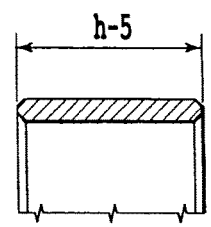
*Fig. 71A*  *Fig. 71B*
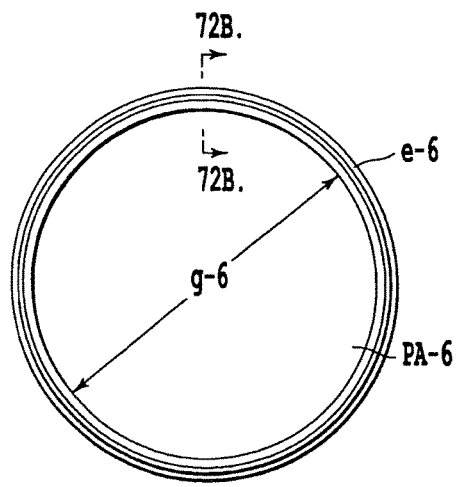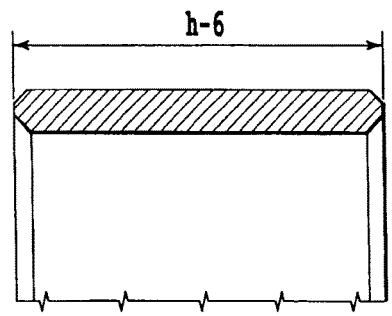
*Fig. 72A*  *Fig. 72B*

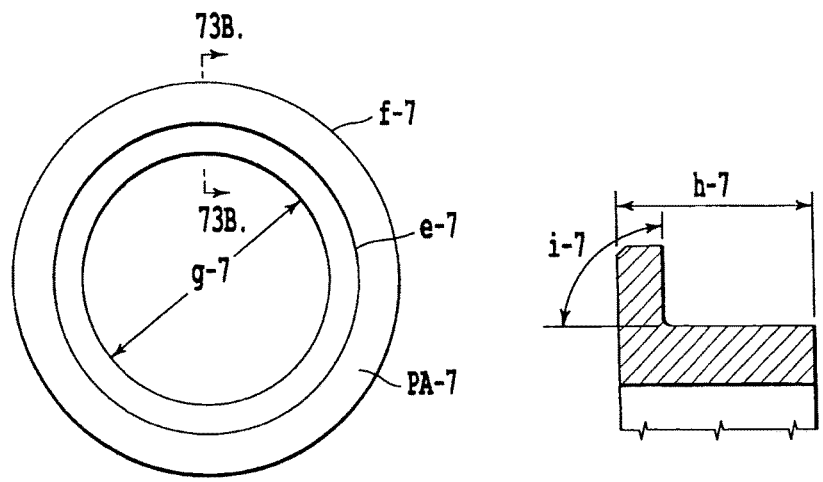
*Fig. 73A*     *Fig. 73B*
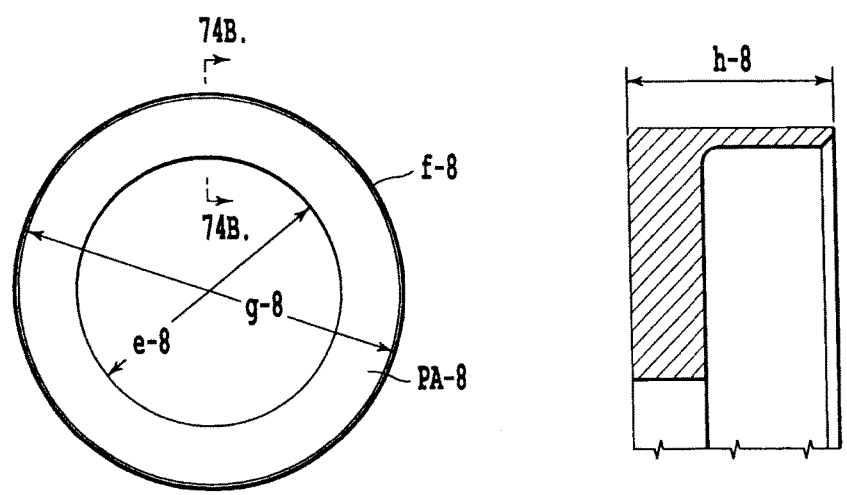
*Fig. 74A*     *Fig. 74B*

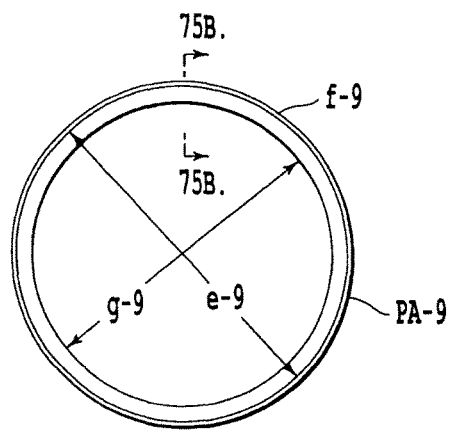 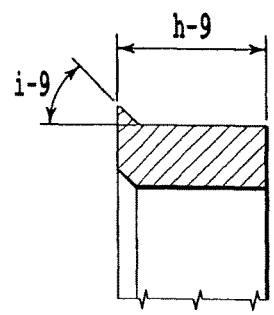
*Fig. 75A*      *Fig. 75B*
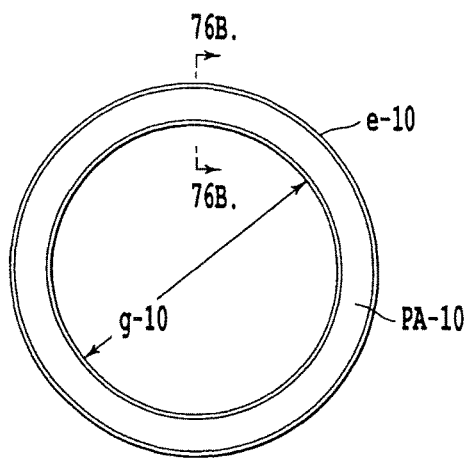 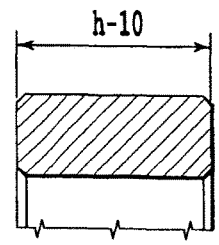
*Fig. 76A*      *Fig. 76B*

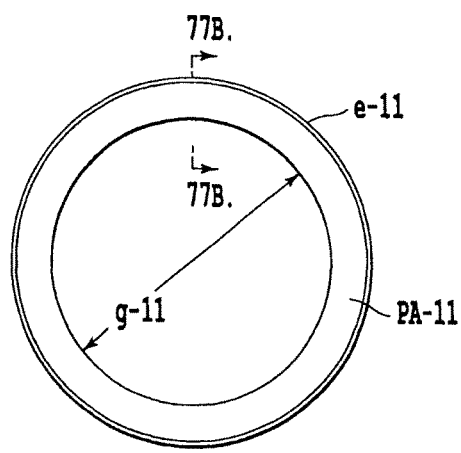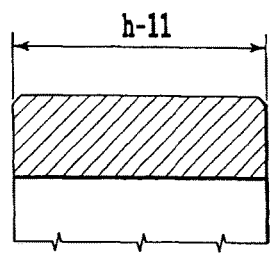
*Fig. 77A*  *Fig. 77B*
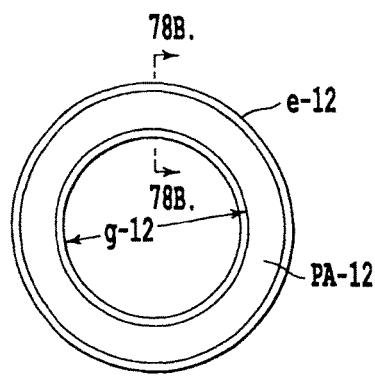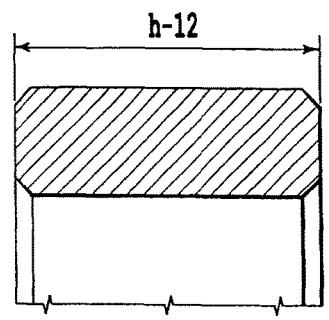
*Fig. 78A*  *Fig. 78B*

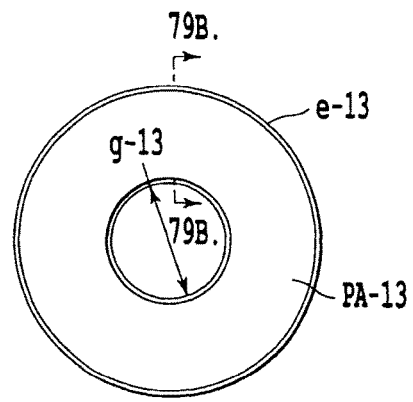
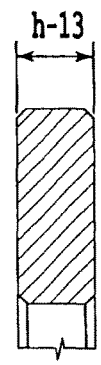
*Fig. 79A*  *Fig. 79B*
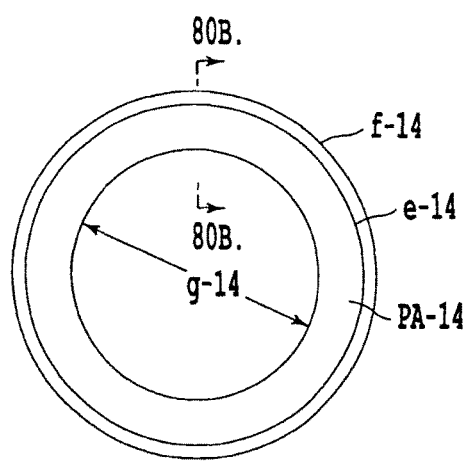
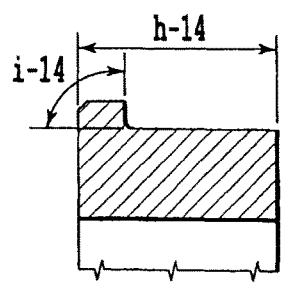
*Fig. 80A*  *Fig. 80B*

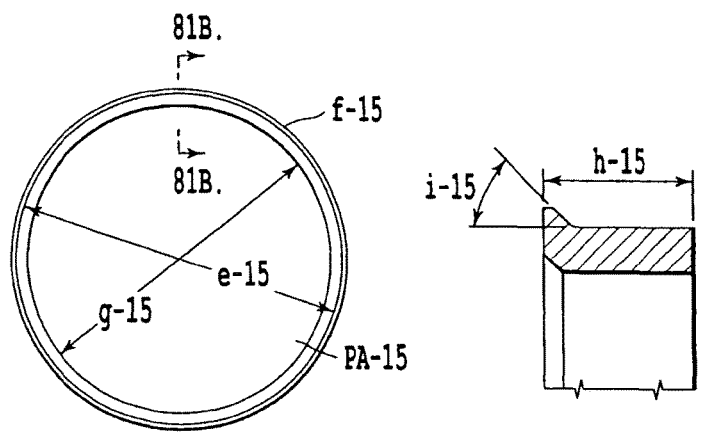
*Fig.81A*　　*Fig.81B*
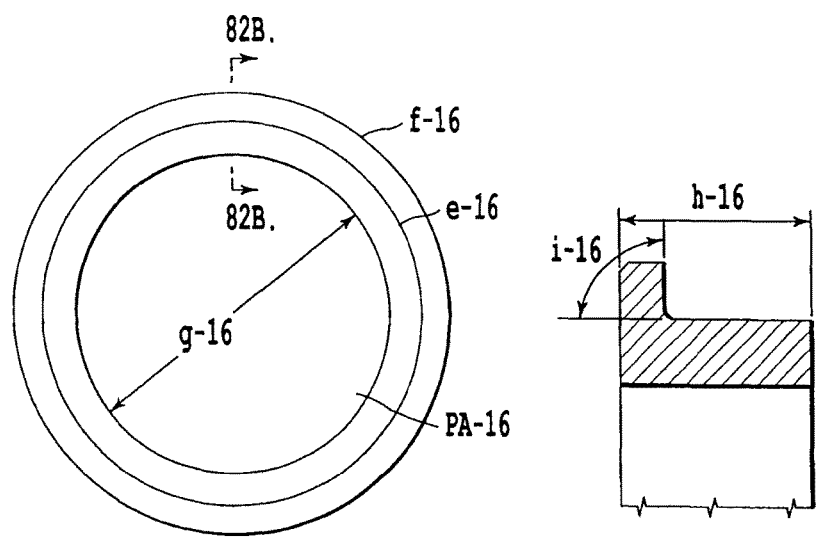
*Fig.82A*　　*Fig.82B*

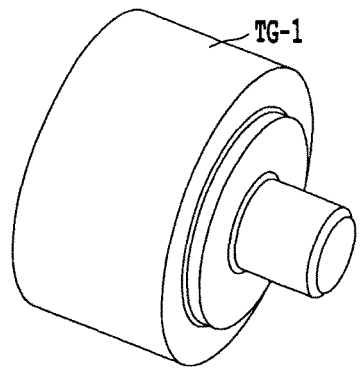
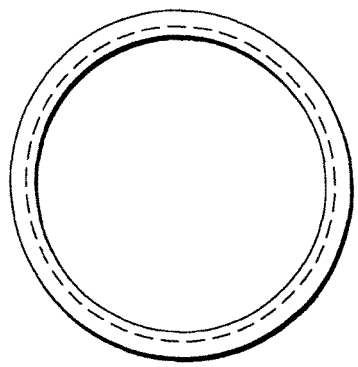
Fig.85A          Fig.85B
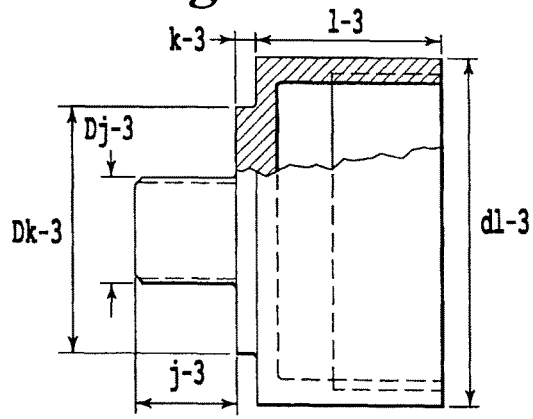
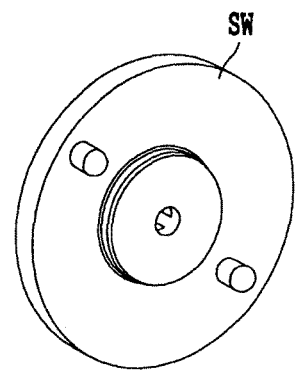
Fig.85C          Fig.86A
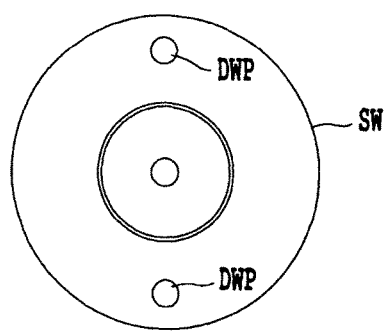
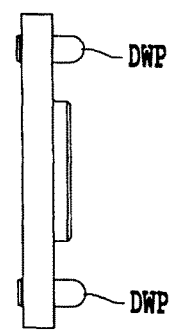
Fig.86B          Fig.86C

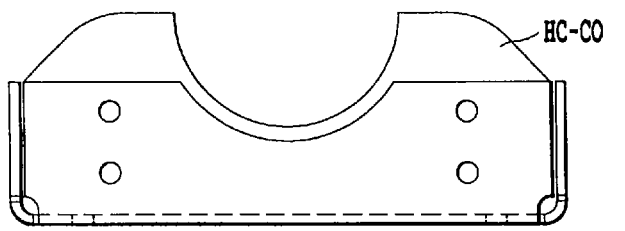 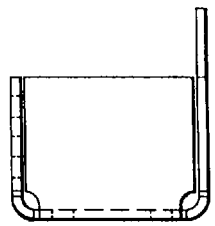
*Fig.87A*  *Fig.87B*
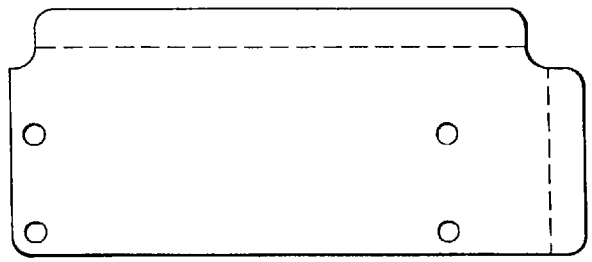
*Fig.88A*
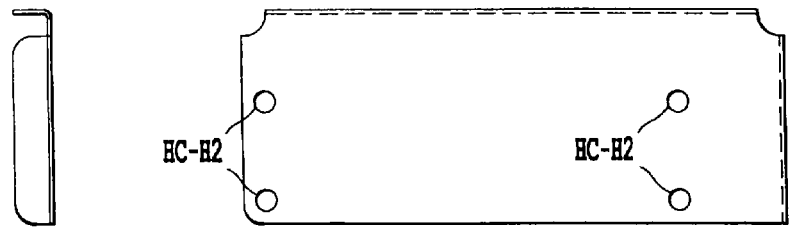 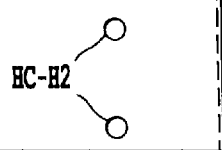
*Fig.88B*  *Fig.88C*
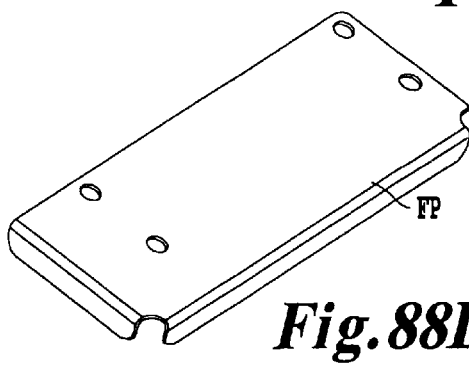
*Fig.88D*

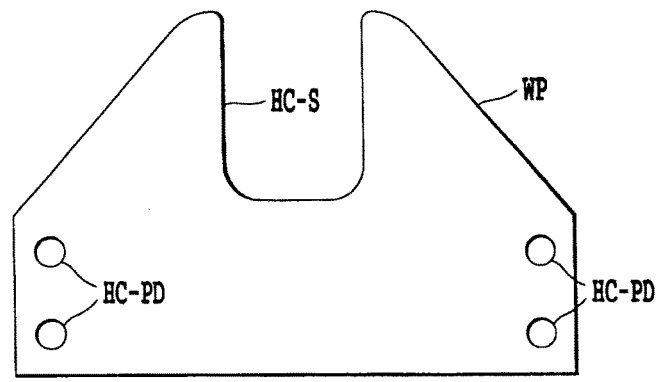
*Fig.89A*  *Fig.89B*
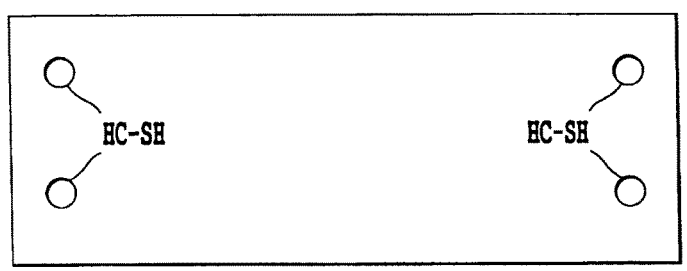
*Fig.90A*  *Fig.90B*

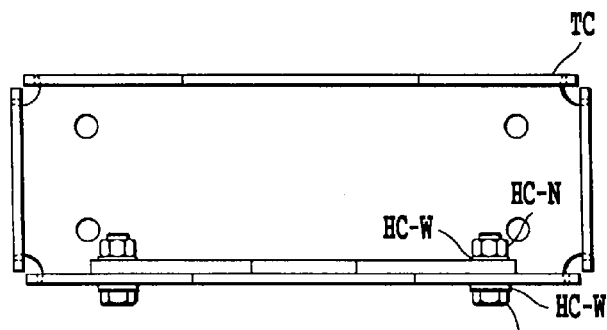
*Fig.91A*
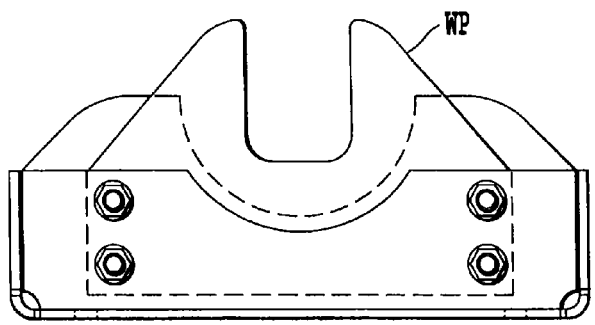 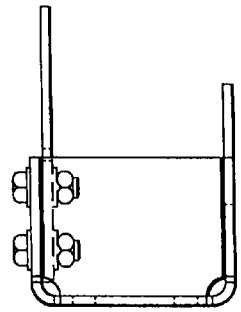
*Fig.91B*  *Fig.91C*

MODULAR VISCOUS FAN CLUTCH SYSTEM

CROSS-REFERENCE TO RELATED APPLICATIONS

This application is a division of U.S. application Ser. No. 13/843,703 filed Mar. 15, 2013, which claims priority to U.S. Application No. 61/752,067 filed Jan. 14, 2013, and U.S. Application No. 61/754,728 filed Jan. 21, 2013, the entire contents of each of which are incorporated herein by reference.

BACKGROUND

A conventional viscous fan clutch system consists of a clutch acting as an input member and a fan acting as an output member. Both clutch and fan are on a shaft assembly which drives the input member, in turn powering the output member. As the driving member, the clutch transfers torque to the fan through shearing of a viscous fluid, thus driving the fan. A pumping mechanism and temperature sensor regulate the amount of fluid in the cavity between clutch and fan, thus setting the amount of torque transmitted to the fan through shearing.

Clutches can have different design parameters based on the application. The fan can provide cooling when the engine temperature rises about a threshold temperature. In this case, the clutch and fan are fully engaged to transfer more torque and drive more air in order to cool the engine to the desired temperature. When the engine temperature is below a threshold temperature, the fan clutch can partially disengage, avoiding unnecessary power expenditures from the engine. Instead of a threshold temperature, factors such as delayed or advanced engagement time, valve size or rpm may be used to set clutch and fan engagement.

When a viscous clutch fan assembly fails, parts may be replaced with a compatible repair part. Given the wide range of applications for viscous fan clutches, there are numerous models and makes, each with their own integral mounting systems. In the heavy duty viscous clutch market, manufacturers and dealers may have to build and stock several thousands of different parts to provide replacements for each model of viscous fan clutches, as each model of viscous fan clutch requires model-specific replacement parts.

SUMMARY

A viscous clutch head may be replaced by selecting a viscous clutch head and a mount adapter. In an illustrative embodiment, the viscous clutch head and the mount adapter may be selected from a group of universal modular fan drives and from a group of mount adapters. In the illustrative embodiment, the mount adapter of a threaded type or a flange and bolt type may be selected. Depending on the viscous clutch head to be replaced, a fan adapter and/or a pilot adapter may also be selected from a group of fan adapters and from a group of pilot adapters in another illustrative embodiment.

Accordingly, in the illustrative embodiments, a range of models of viscous fan clutch systems may be replaced by using a limited number of parts. These parts may be stored on a tool cart. As different models of viscous fan clutch systems may be replaced using a limited number of parts, the in-stock inventory of replacement parts may be reduced.

In an exemplary embodiment, the mount adapter may have two ends, with a circular bore and a square bore on one end, a male thread on the other end, and through holes located around the circumference.

BRIEF DESCRIPTION OF THE DRAWINGS

The characteristics and advantages of an exemplary embodiment are set out in more detail in the following description, made with reference to the accompanying drawings.

FIGS. 3A-C depict respectively a schematic front, isometric, and cross-sectional view of a fan spacer;

FIGS. 4A-D depict respectively a schematic front, side, isometric, and cross-sectional view of a threaded type mount adapter;

FIGS. 5A-D depict respectively a schematic front, side, isometric, and cross-sectional view of a flange and bolt type mount adapter;

FIGS. 6A-B depict respectively a schematic front and cross-sectional view of a pilot adapter;

FIGS. 7A-B depict respectively a schematic isometric and side view of a thread gauge;

FIGS. 12A-C depict respectively a schematic isometric, front, and cross-sectional view of a fan adapter;

FIGS. 14A-C depicts a first fan spacer;

FIGS. 15A-C depict respectively a schematic isometric, front, and cross-sectional view of a second fan spacer;

FIGS. 18A-D depict respectively a schematic isometric, front, side, and cross-sectional view of a third threaded mount adapter;

FIGS. 19A-D depict respectively a schematic isometric, front, side, and cross-sectional view of a fourth threaded mount adapter;

FIGS. 40A-D depict respectively a schematic isometric, front, side, and cross-sectional view of a second flange and bolt mount adapter;

FIGS. 55A-D depict respectively a schematic isometric, front, side, and cross-sectional view of a seventeenth flange and bolt mount adapter;

FIGS. 67A-B depict respectively a schematic front and cross-sectional view of a first pilot adapter;

FIGS. 68A-B depict respectively a schematic front and cross-sectional view of a second pilot adapter;

FIGS. 69A-B depict respectively a schematic front and cross-sectional view of a third pilot adapter;

FIGS. 70A-B depict respectively a schematic front and cross-sectional view of a fourth pilot adapter;

FIGS. 71A-B depict respectively a schematic front and cross-sectional view of a fifth pilot adapter;

FIGS. 72A-B depict respectively a schematic front and cross-sectional view of a sixth pilot adapter;

FIGS. 73A-B depict respectively a schematic front and cross-sectional view of a seventh pilot adapter;

FIGS. 74A-B depict respectively a schematic front and cross-sectional view of a eighth pilot adapter;

FIGS. 75A-B depict respectively a schematic front and cross-sectional view of a ninth pilot adapter;

FIGS. 76A-B depict respectively a schematic front and cross-sectional view of a tenth pilot adapter;

FIGS. 77A-B depict respectively a schematic front and cross-sectional view of a eleventh pilot adapter;

FIGS. 78A-B depict respectively a schematic front and cross-sectional view of a twelfth pilot adapter;

FIGS. 79A-B depict respectively a schematic front and cross-sectional view of a thirteenth pilot adapter;

FIGS. 80A-B depict respectively a schematic front and cross-sectional view of a fourteenth pilot adapter;

FIGS. 81A-B depict respectively a schematic front and cross-sectional view of a fifteenth pilot adapter;

FIGS. 82A-B depict respectively a schematic front and cross-sectional view of a sixteenth pilot adapter;

FIGS. 85A-C depict respectively a schematic isometric, front, and cross-sectional view of a third thread gauge;

FIGS. 86A-C depict respectively a schematic isometric, front, and cross-sectional view of a spanner wrench;

FIGS. 87A-B depict respectively a schematic front and side view of a tool cradle;

FIGS. 88A-D depict respectively a schematic unfolded, side, front, and isometric view of a drill template;

FIGS. 89A-B depict respectively a schematic front and side view of a wrenching plate;

FIGS. 90A-B depict respectively a schematic front and side view of a stiffener plate; and FIGS. 91A-C depict respectively a schematic top, front, and side view of a tool cradle assembly.

DETAILED DESCRIPTION OF THE ILLUSTRATIVE EMBODIMENTS

Objects, advantages, and features of the exemplary modular viscous fan clutch system described herein will be apparent to one skilled in the art from a consideration of this specification, including the attached drawings.

Universal modular fan drives (UMFD) may replace multiple viscous clutch head designs currently in service. There may be two UMFDs of different sizes; for example: a large UMFD which may have a maximum outer diameter between approximately 200 mm to approximately 300 mm, and a small UMFD which may have a maximum outer diameter of approximately 100 mm to approximately 200 mm. There may be four different designs for each UMFD, with two designs differing based on viscosity and two designs differing on volume of fluid to be used. Therefore, each UMFD may have four different designs to cover the use of two different ranges of fluid viscosity and two different ranges of fluid volume. In other words, there may be eight different UMFDs.

An exemplary embodiment may use UMFDs, and may provide a limited number of adapters to connect one of the UMFDs with a fan (not shown), thereby allowing a viscous clutch system to be replaced.

In an exemplary embodiment of the present invention, the UMFD may be distinct from a mounting system. An exemplary embodiment provides adapters to mate one of the UMFDs with both a fan blade hub (not shown) on one end, and an engine block mount (not shown) on the other end, using a combination of an optional fan adapter or spacer, a mount adapter, and an optional pilot adapter.

In an exemplary embodiment, a method of selecting one of a plurality of UMFDs may be used, where each UMFD may be universal in the sense that it may be adapted to replace a plurality of individual viscous clutch designs. The method may comprise selecting one of a plurality of universal mount adapters which are configured to connect the UMFDs to an applicable fan blade hub, optionally selecting one or more fan adapters designed to adapt the pilot and bolt pattern of the selected UMFD to an applicable fan blade hub, and optionally selecting a pilot adapter which helps align the mount adapter to a post or other mounting position on the engine.

Figure 1:
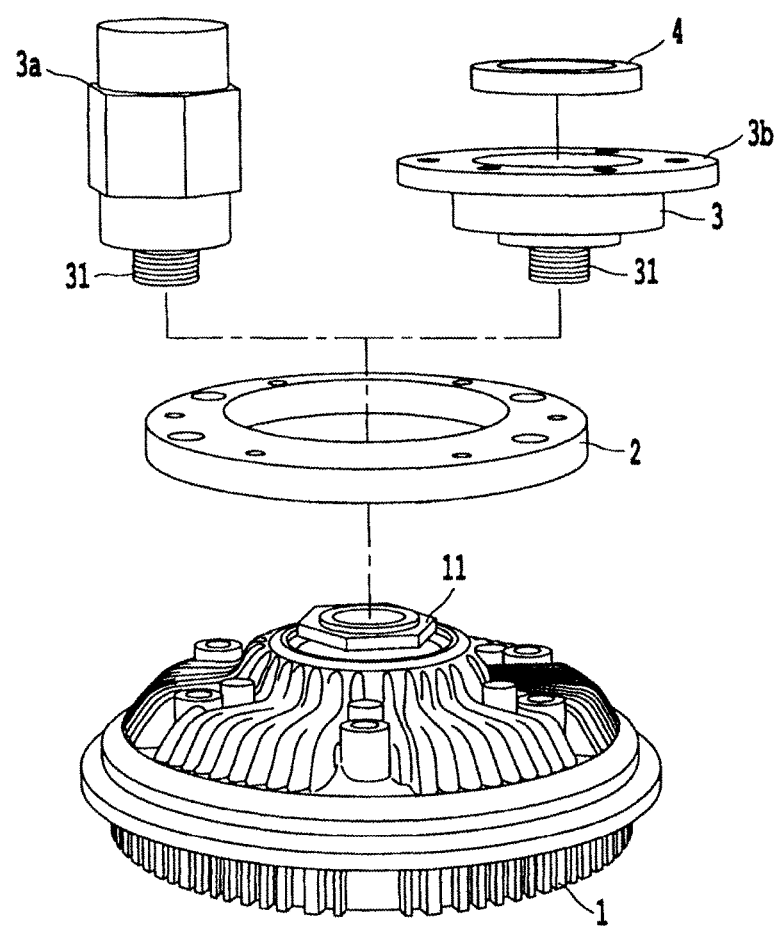
FIG. 1 depicts a schematic view of an exemplary embodiment.

Referring to FIG. 1, an exemplary embodiment may use a UMFD 1, and a mount adapter 3, which may be a threaded type 3a or a flange and bolt type 3b. The adapter 3 includes a threaded end 31 which is threaded into a receiving nut 11 of the UMFD 1. Optionally, a fan adapter or spacer 2 and a pilot adapter 4 may be used.

An exemplary embodiment may use a flange and bolt type mount adapter 3b in combination with a pilot adapter 4 to fit the part diameter and to ensure the clutch may be mounted on center and balanced. In another embodiment of the present invention, a threaded type mount adapter 3a may be used instead.

In an exemplary embodiment a viscous clutch system may be repaired or replaced using only one of the UMFDs, and one of fifty-one mount adapters. In addition, one of sixteen pilot adapters and one of three fan pilot adapters or spacers may be used. In an exemplary embodiment of the present invention, the UMFDs in combination with the adapter combination described above allow replacements for a majority of existing clutch heads.

The number and type of models for mount adapters, pilot adapters, and fan adapters or spacers may be based on sizing and dimensional specifications, such that the combination of adapters covers a wide range of fan clutch systems. In one embodiment, a number of parts for replacing the wide range of fan clutch systems may be reduced.

Figure 2A:
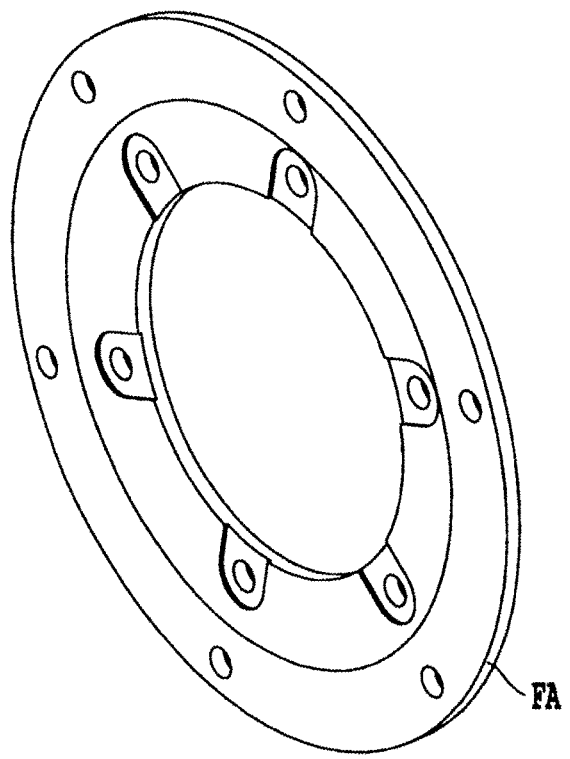
FIGS. 2A-2C depict respectively a schematic front, isometric, and cross-sectional view of a fan adapter.
Figure 2C:
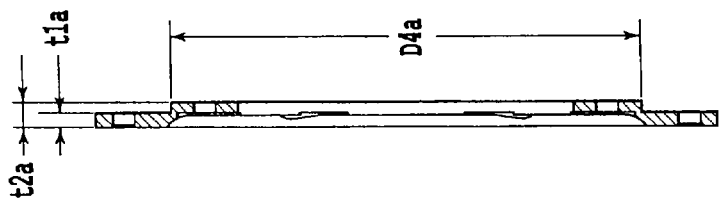
Figure 2B:
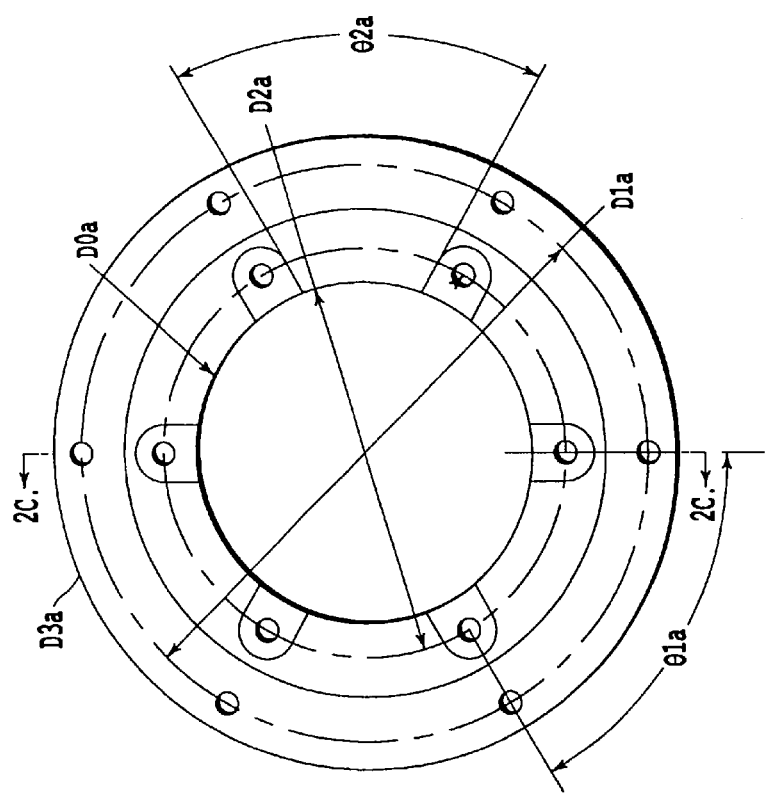
Figure 4A:
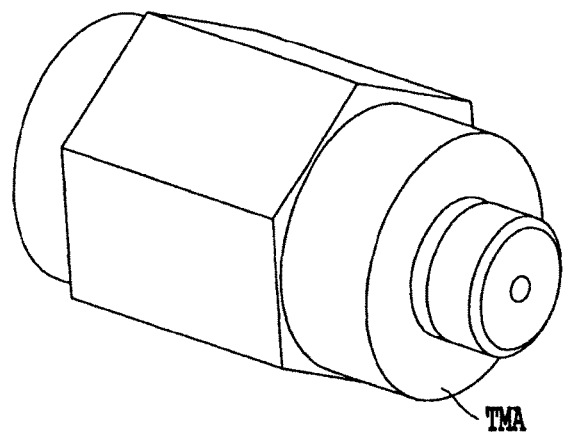
Figure 4B:
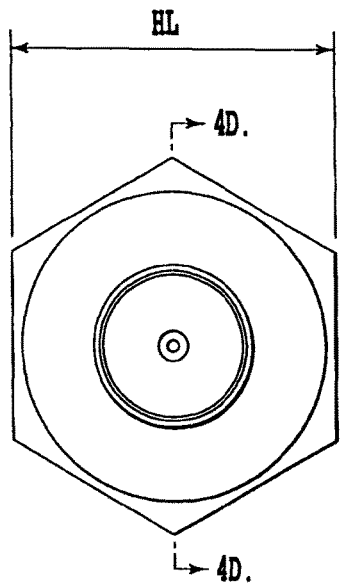

FIGS. 2A-2C show a generic fan adapter and associated parameters. FIGS. 3A-3C show a generic fan spacer and associated parameters. FIGS. 4A-4D show a generic threaded type mount adapter and FIGS. 5A-5D show a generic flange and bolt type mount adapter. FIGS. 6A-6B show a generic pilot adapter.

Figure 9:
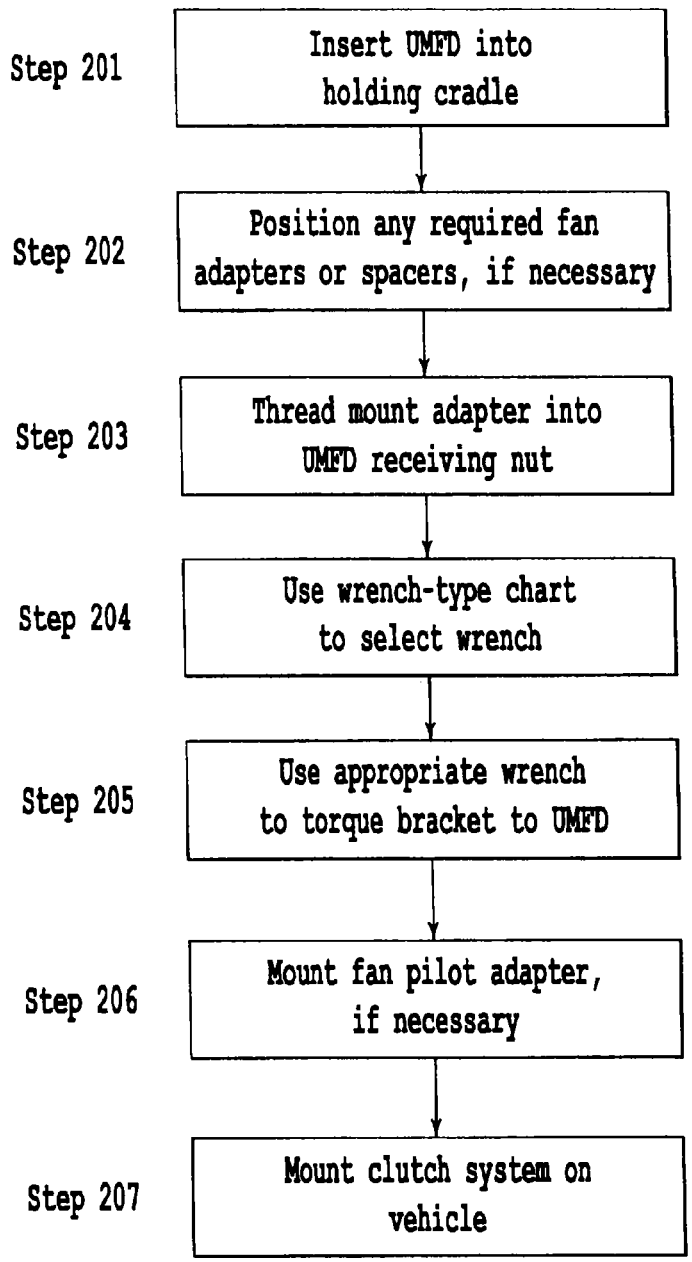
FIG. 9 depicts a flow chart used in an exemplary embodiment for assembling a universal modular fan drive (UMFD) with adapters.

To assemble a replacement viscous fan clutch system, an exemplary embodiment indicates an assembly procedure with steps described in FIG. 9. Step 201 inserts a UMFD 1 into a holding cradle HC. The holding cradle HC may be located on top of a tool cart. Step 202 positions any optionally required fan adapters or spacers 2, which may be required for some viscous fan clutch systems. Step 203 threads the threaded end 31 of a selected mount adapter 3 into the receiving nut 11 of the UMFD 1. This secures the optionally required fan adapter or spacer 2 in place. Step 204 selects an appropriate wrench type using a chart which may be provided. Step 205 uses the appropriate wrench selected in Step 204 to torque the selected mount adapter 3 to the UMFD 1. If needed, step 206 installs a fan pilot adapter 4 immediately prior to step 207, which is mounting the clutch system on the vehicle.

Figure 10:
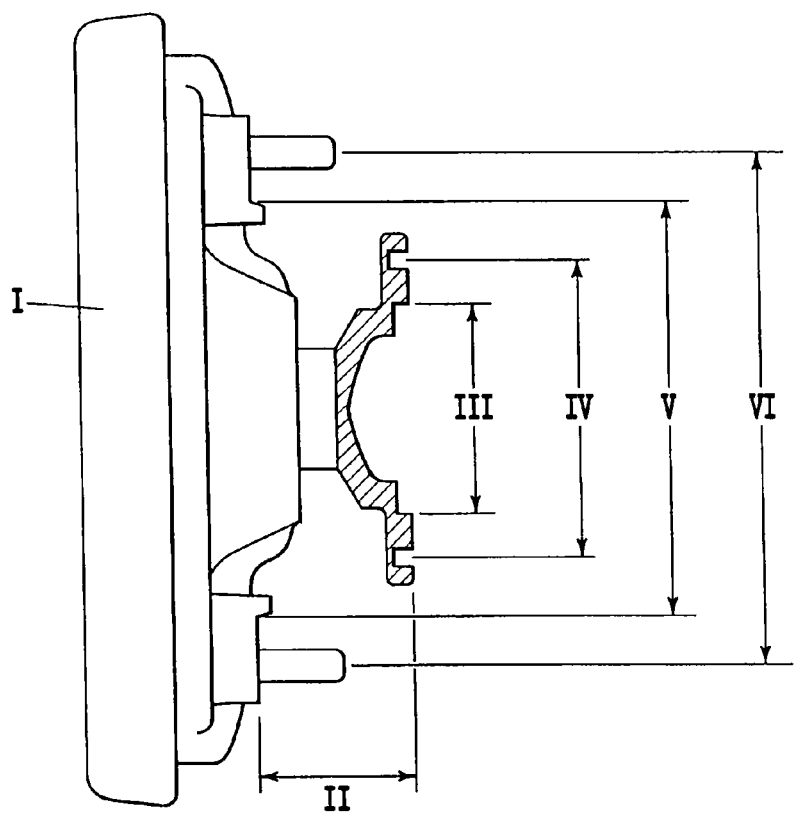
FIG. 10 depicts a schematic cross-sectional view of a viscous clutch head.

Referring to FIG. 10, an exemplary embodiment indicates a process of selecting the appropriate UMFD and adapter combination by measuring the viscous clutch head I to be replaced. As shown in FIG. 10, key dimensions to be measured on the viscous clutch head I to be replaced are a length II, the drive pilot diameter III, drive bolt circle diameter IV, fan pilot diameter V, and fan bolt circle diameter VI. The length II measured in step 106 may correspond to the distance between the clutch head base and the clutch head drive component, as shown in FIG. 10. To replace a defective viscous clutch head and install an associated mounting system, an exemplary embodiment proposes several steps for identifying a set of compatible components.

Figure 11:
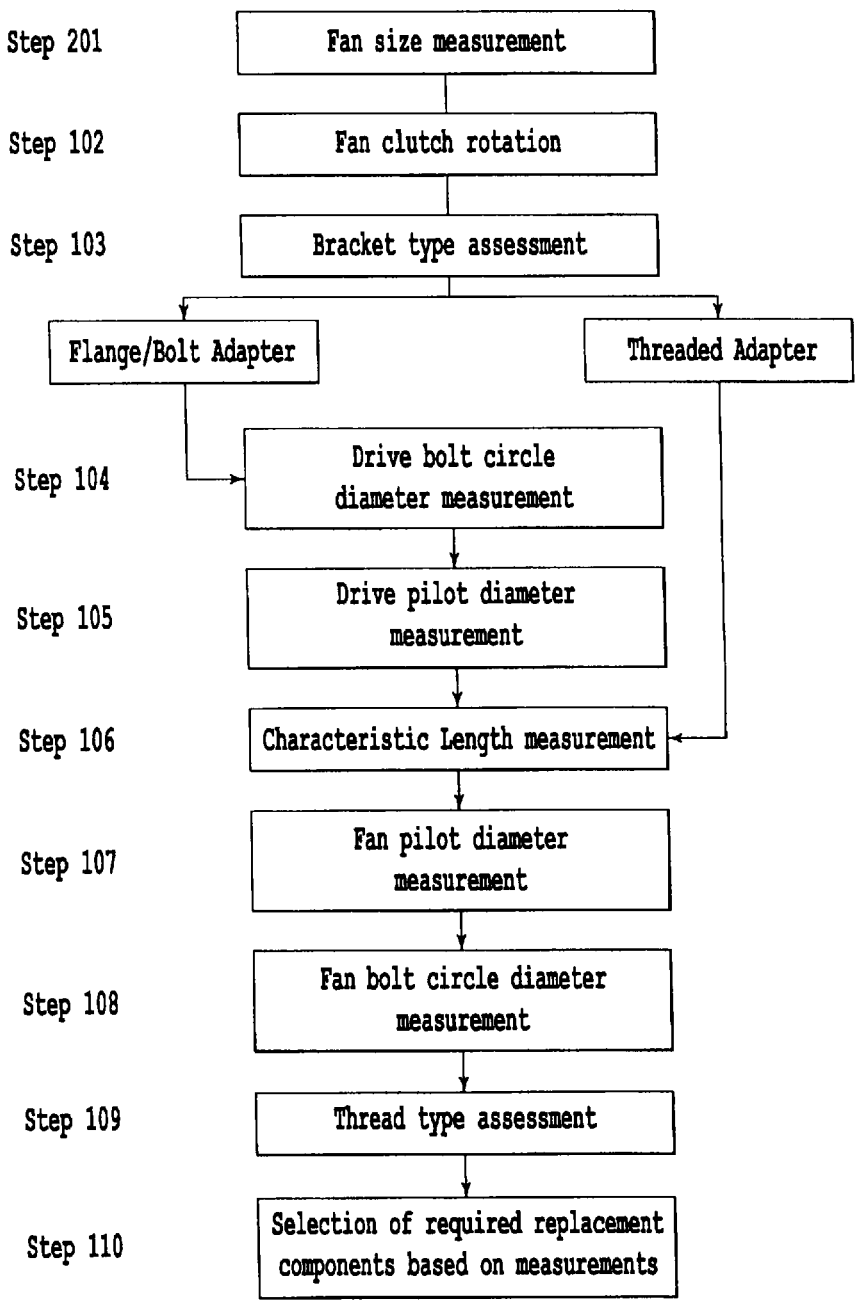
FIG. 11 depicts a flow chart for measuring an existing viscous clutch head in order to identify the required UMFD and associated adapters for replacement.

Referring to FIG. 11, step 101 measures fan size. Step 102 determines whether the rotation direction of the fan is clockwise or counter clockwise. Step 103 is an assessment of the bracket type as bolt-on or screw-on, determining whether the customer moves to step 104 (using a flange and bolt type mount adapter) or step 106 (using a threaded type mount adapter). Steps 104-108 are measurements of the drive bolt circle diameter IV, the drive pilot diameter III, the length II, the fan pilot diameter V and the fan bolt circle diameter VI, respectively. These measurements are shown in FIG. 10. Step 109 identifies the thread type using thread gauges. Non-limiting examples of the thread gauges are shown in FIGS. 83A-83B, 84A-84B, and 85A-85C. Step 110 selects necessary components based on the measurements taken.

Through holes are defined as holes which begin on one end of the work piece, and ends on the other end of the work piece, traversing it in its entirety. In contrast, a hole may begin at one end of the work piece, but be machined only to a certain depth which is less than the work piece thickness. Similarly a hole may be bored into a piece, but the hole only threaded along part of its length. All figures are shown to scale.

When connecting a UMFD with a fan, an adjustment may be required between the diameter of the fan and the diameter of the UMFD. In this case, a fan adapter may be required. In an exemplary embodiment, a fan adapter may be designed to adapt the pilot and bolt pattern of the selected UMFD to a fan blade hub. Referring to FIG. 2A-2C, a fan adapter FA may be an annulus shaped component with an outermost diameter D3a and an innermost diameter D0a. Each fan adapter may have a male lip with diameter D4a, and a female lip with the innermost diameter D0a, where the lips may be on either side of a section with thickness t1a. At the transition between the male lip and the main section of the fan adapter, a radius between 0.01" and 0.02" may be allowed. The total fan adapter thickness may be t2a. Two types of holes may be evenly positioned around the circumference of the fan spacer, the first set of holes located at a diameter D1a, and spaced with an angle θ1a between each hole and its neighboring holes. The second set of holes may be located at a diameter D2a, spaced with an angle θ2a between each hole and its neighboring holes. The part number may be engraved at a diameter greater than D1a.

Figure 12A:
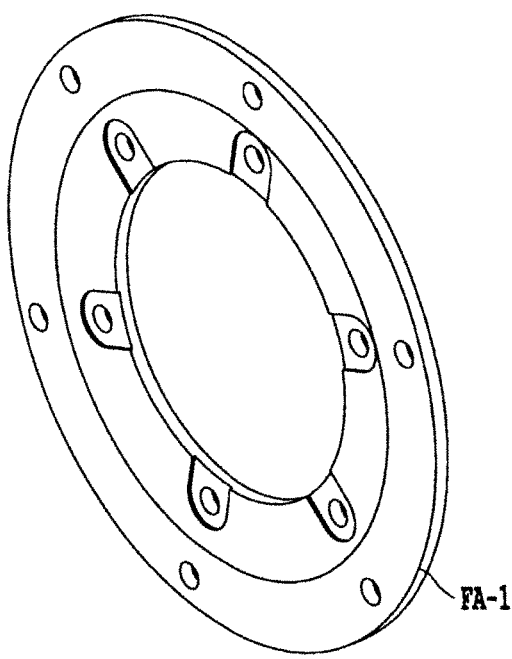

Referring to FIGS. 12A-12C, an exemplary embodiment may comprise a fan adapter FA-1 which may adapt a fan with a larger pilot diameter to fit on a UMFD with a smaller pilot diameter. The fan adapter may be made out of 1045 Steel, and may be provided with a black oxide finish. The fan adapter outermost diameter D3a-1 may be between 1 and 1.6 of the diameter D4a-1, more preferably between 1.1 and 1.5 of the diameter D4a-1, still more preferably between 1.3 and 1.4 of the diameter D4a-1. The fan adapter diameter D0a-1 may be between 0.3 and 0.8 of the diameter D3a-1, more preferably between 0.4 and 0.7 of the diameter D3a-1, still more preferably between 0.5 and 0.6 of the diameter D3a-1. The fan adapter may comprise a series of six evenly spaced through holes H1-F1-1 at a diameter D1a-1, and a second outermost series of six through holes H2-F1-1 aligned radially with the first series of holes H1-F1-1 but at a diameter D2a-1. The outermost series of holes H2-F1-1 may have a smaller diameter, while the inner most series of holes H1-F1-1 may have a larger diameter. The outermost series of holes H2-F1-1 may be machined with a chamfer feature. A first width t1a-1 may be between 0.6 and 0.7 the total width of the adapter t2a-1. Six dowel pins may be inserted in the outermost holes at diameter D2a-1 while the inner circle of holes H1-F1-1 located at D1a-1 on the fan adapter may receive protrusions located on the UMFD.

Figure 13:
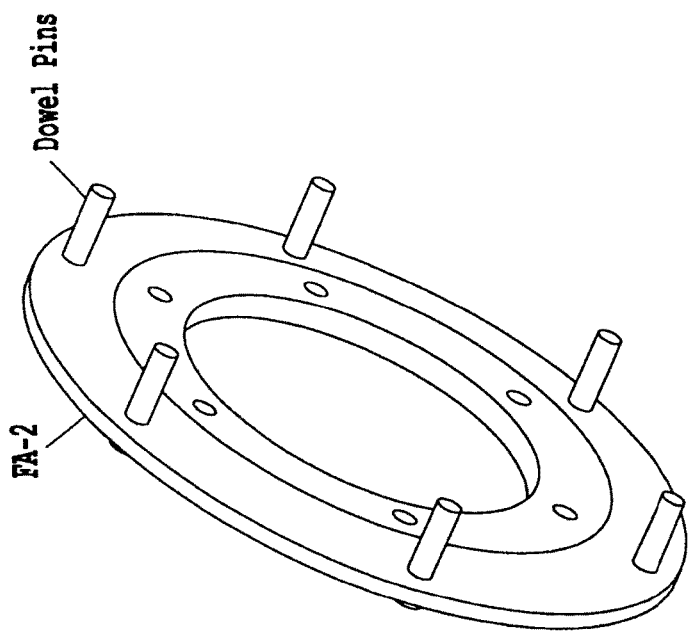
FIG. 13 depicts a fan adapter with dowels.
Figure 16B:
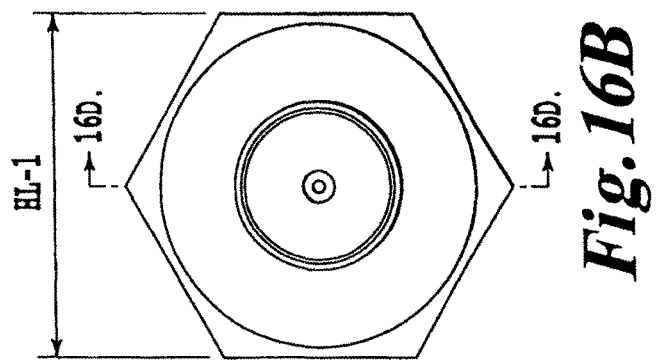
FIGS. 16A-D depict respectively a schematic isometric, front, side, and cross-sectional view of a first threaded mount adapter.
Figure 16A:
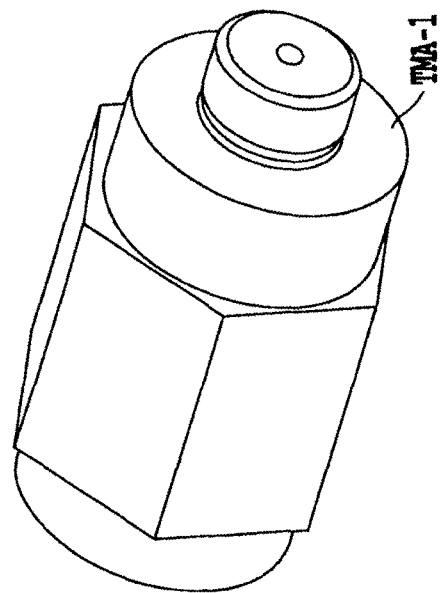
Figures 16C, 16D:
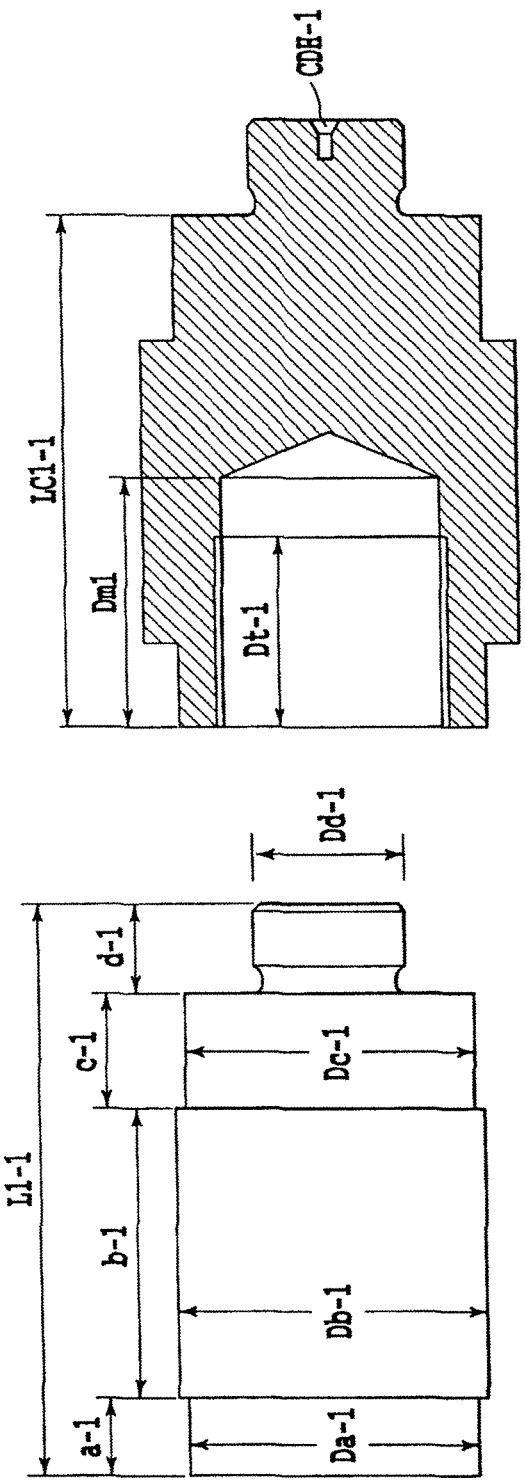
Figure 17A:
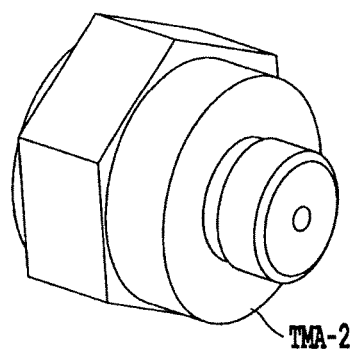
FIGS. 17A-D depict respectively a schematic isometric, front, side, and cross-sectional, view of a second threaded mount adapter.
Figure 17B:
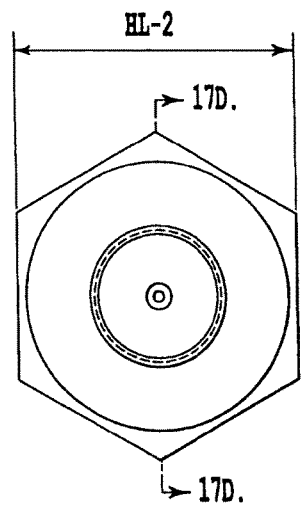
Figure 17C:
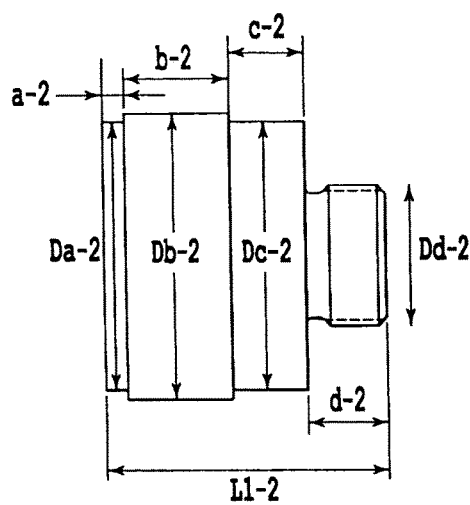
Figure 17D:
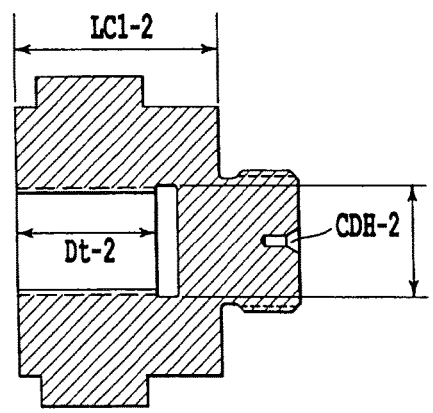
Figure 18A:
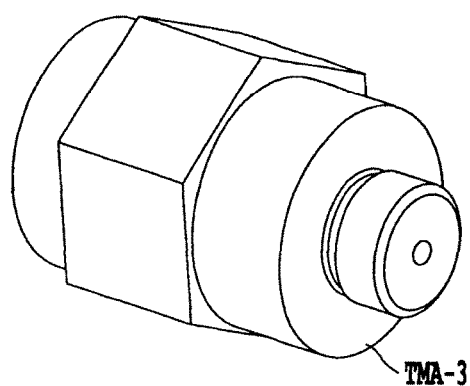
Figure 18B:
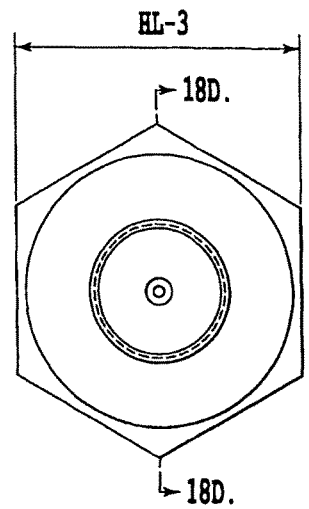
Figure 18C:
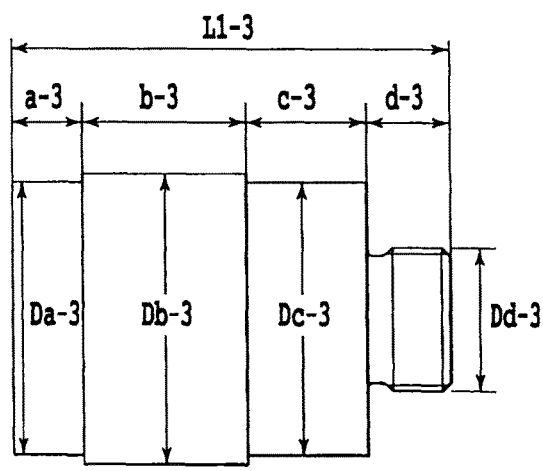
Figure 19C:
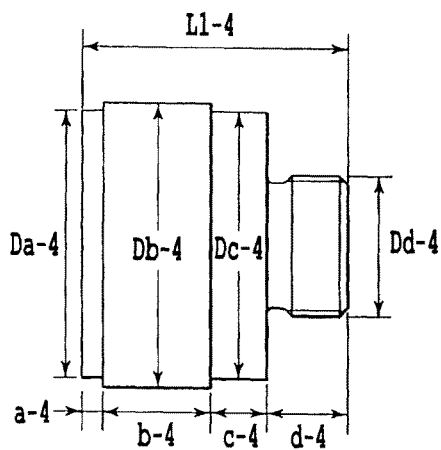
Figure 19D:
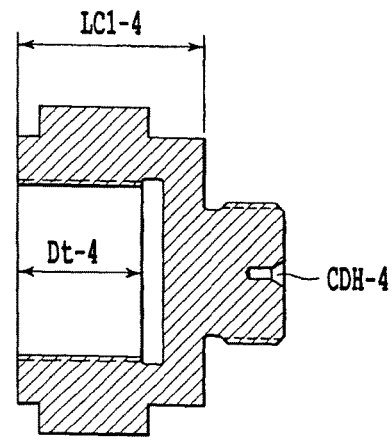
Figure 20A:
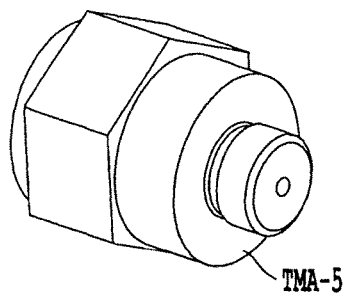
FIGS. 20A-D depict respectively a schematic isometric, front, side, and cross-sectional view of a fifth threaded mount adapter.
Figure 20B:
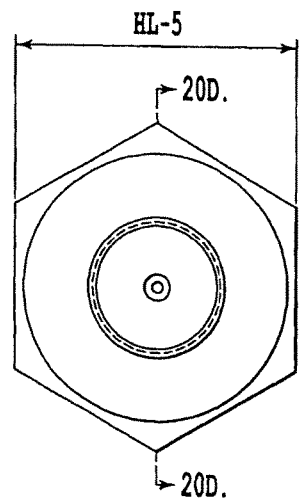
Figure 20D:
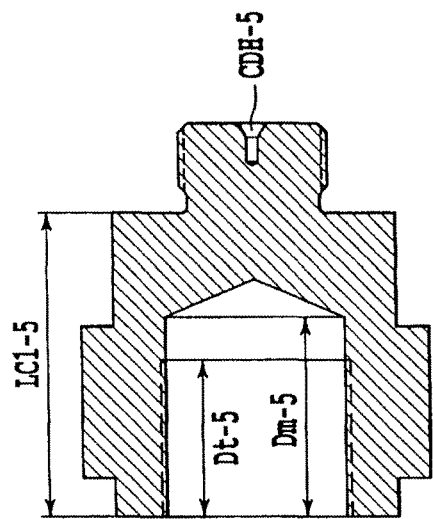
Figure 20C:
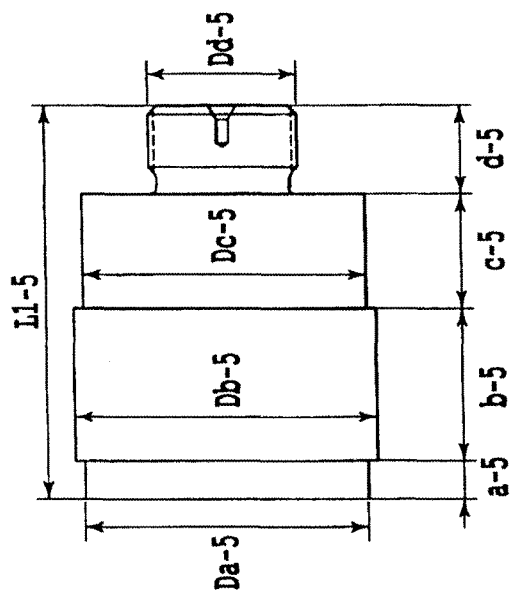
Figure 21D:
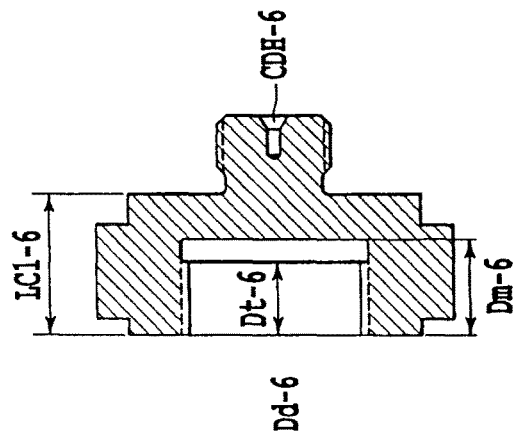
FIGS. 21A-D depict respectively a schematic isometric, front, side, and cross-sectional view of a sixth threaded mount adapter.
Figure 21C:
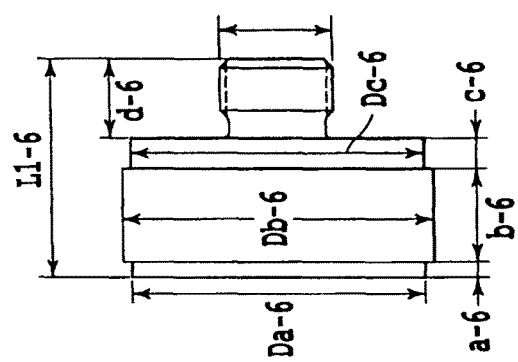
Figure 21B:
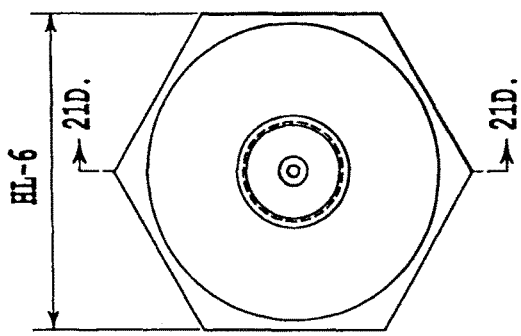
Figure 21A:
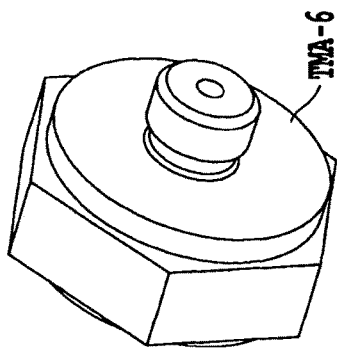
Figure 22B:
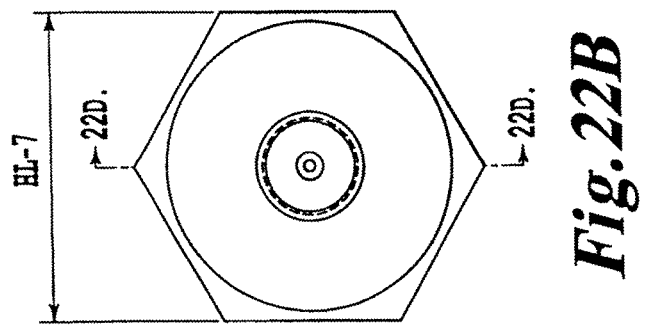
FIGS. 22A-D depict respectively a schematic isometric, front, side, and cross-sectional view of a seventh threaded mount adapter.
Figure 22A:
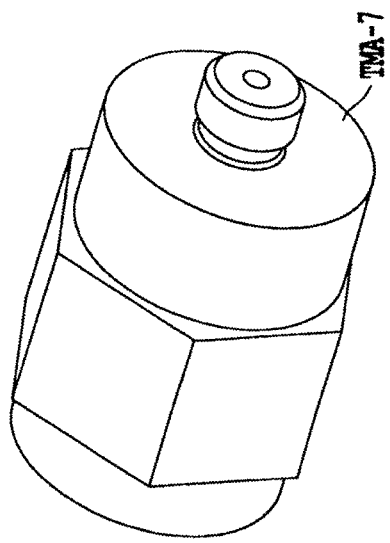
Figure 22D:
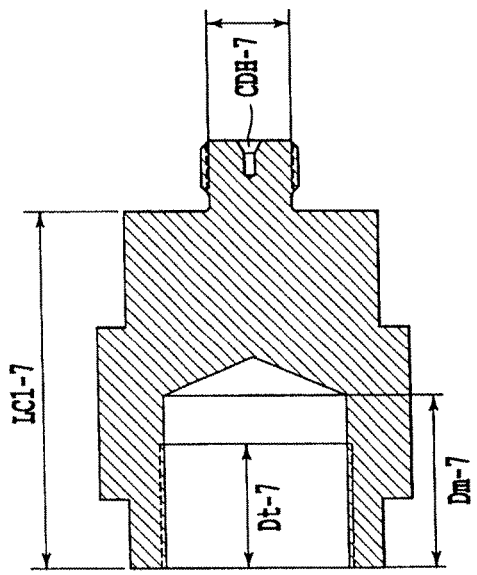
Figure 22C:
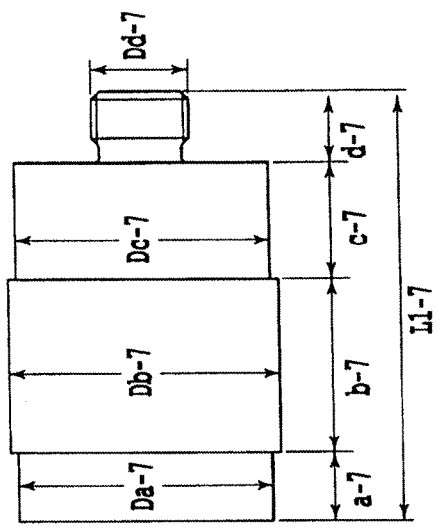
Figure 23A:
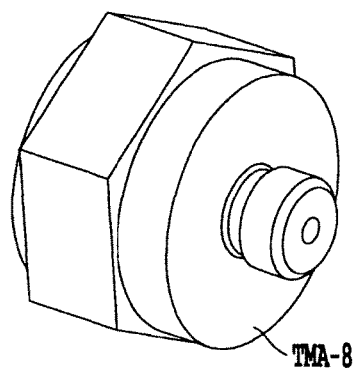
FIGS. 23A-D depict respectively a schematic isometric, front, side, and cross-sectional view of an eighth threaded mount adapter.
Figure 23B:
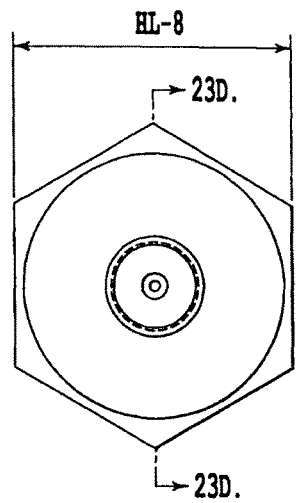
Figure 23C:
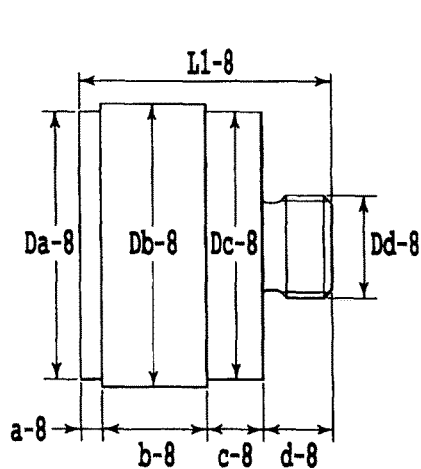
Figure 23D:
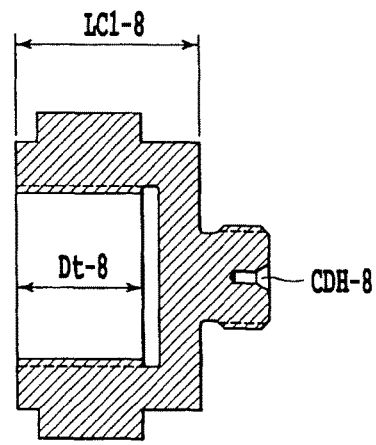
Figure 24A:
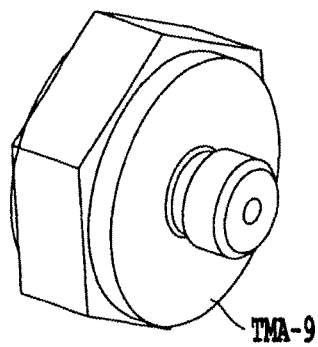
FIGS. 24A-D depict respectively a schematic isometric, front, side, and cross-sectional view of a ninth threaded mount adapter.
Figure 24B:
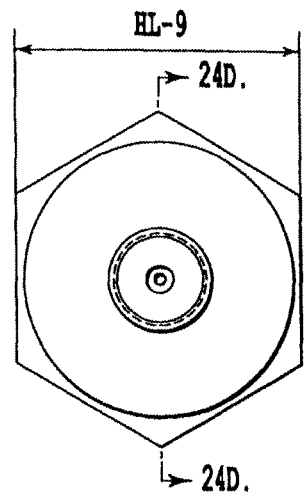
Figure 24C:
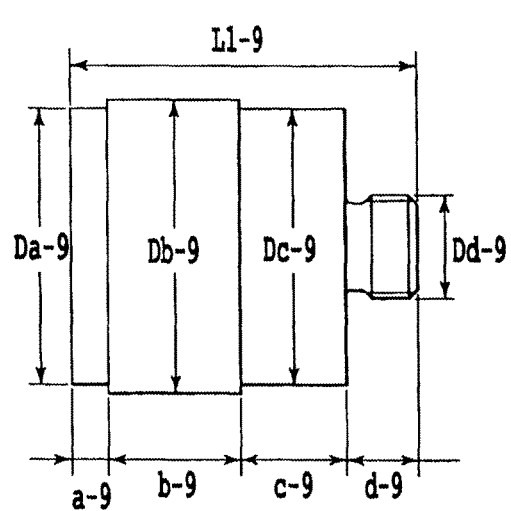
Figure 24D:
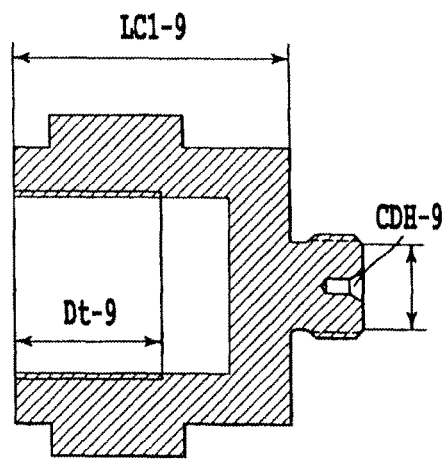
Figure 25A:
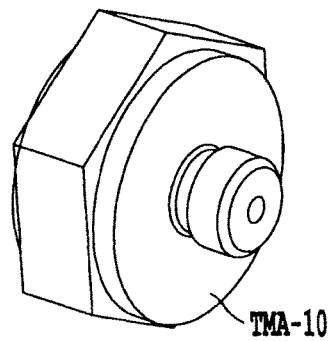
FIGS. 25A-D depict respectively a schematic isometric, front, side, and cross-sectional view of a tenth threaded mount adapter.
Figure 25B:
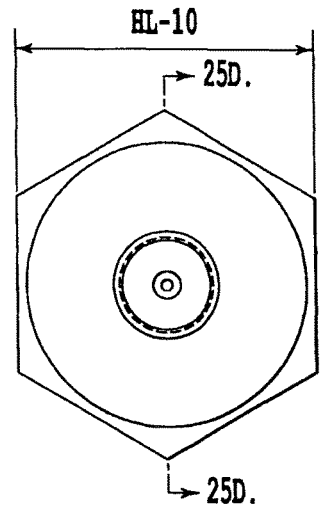
Figure 25C:
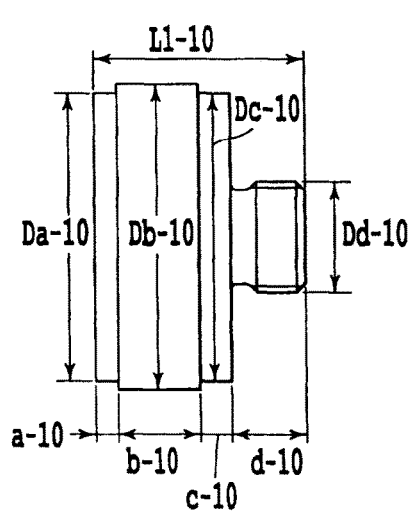
Figure 25D:
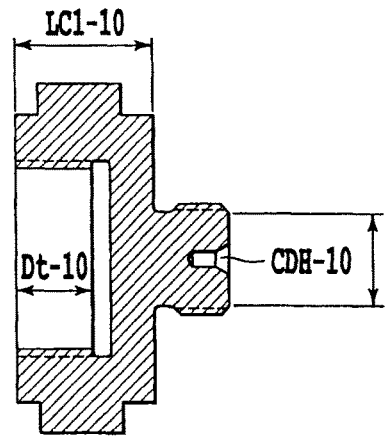
Figure 26A:
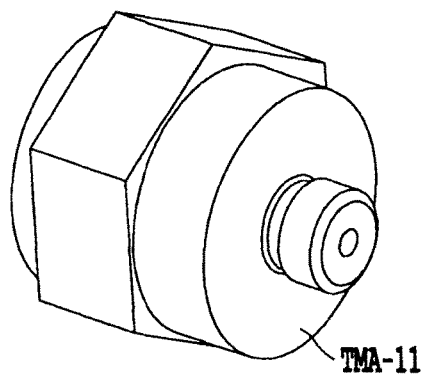
FIGS. 26A-D depict respectively a schematic isometric, front, side, and cross-sectional view of an eleventh threaded mount adapter.
Figure 26B:
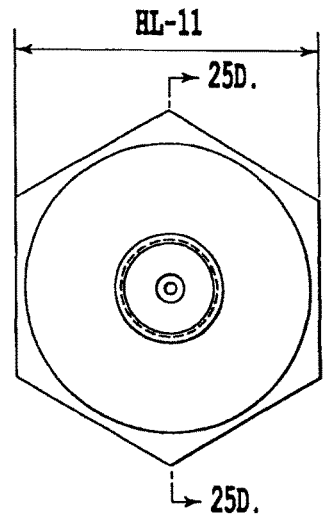
Figure 26C:
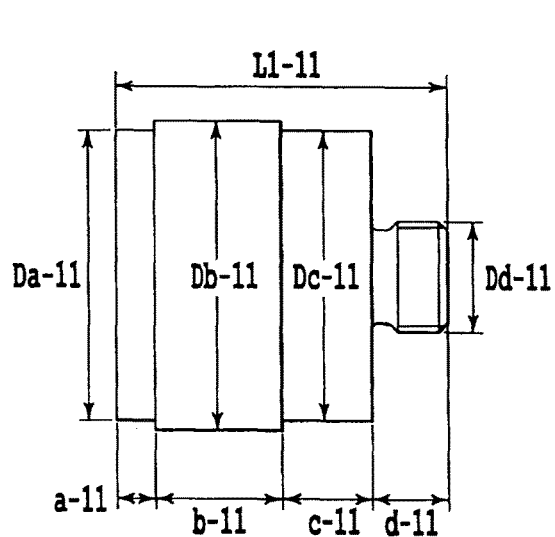
Figure 26D:
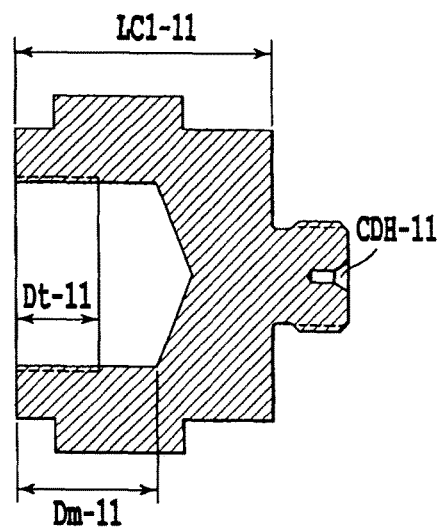
Figure 27A:
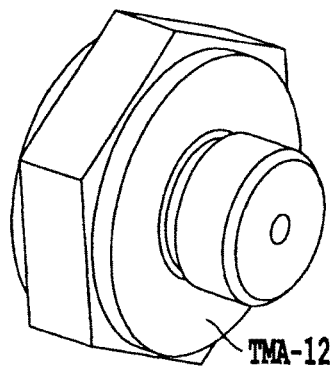
FIG. 27A-D depict respectively a schematic isometric, front, side, and cross-sectional view of a twelfth threaded mount adapter.
Figure 27B:
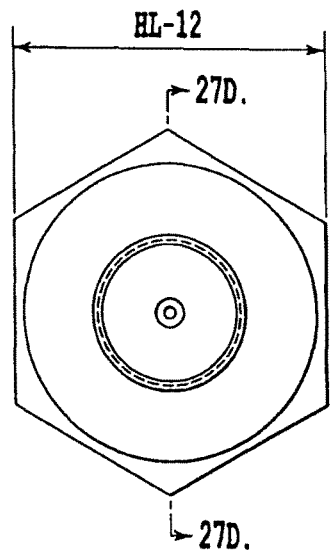
Figure 27C:
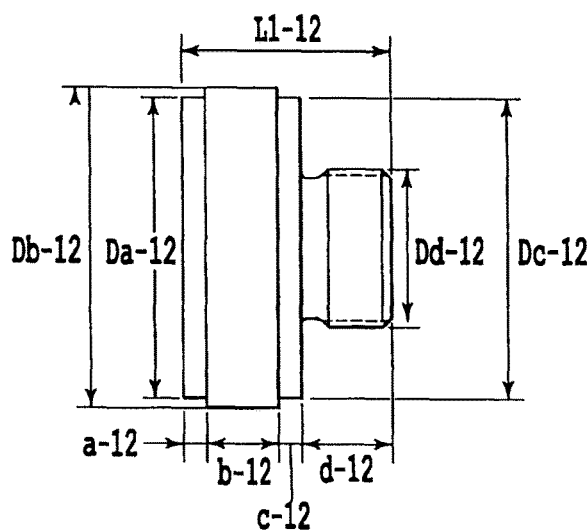
Figure 27D:
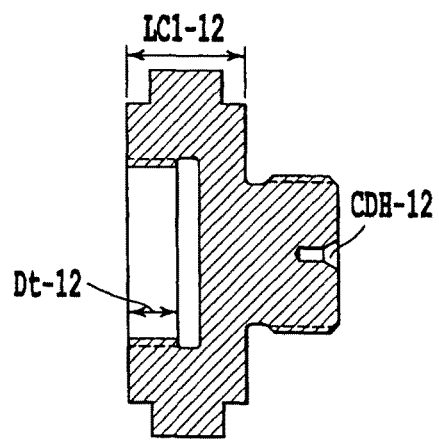
Figure 28A:
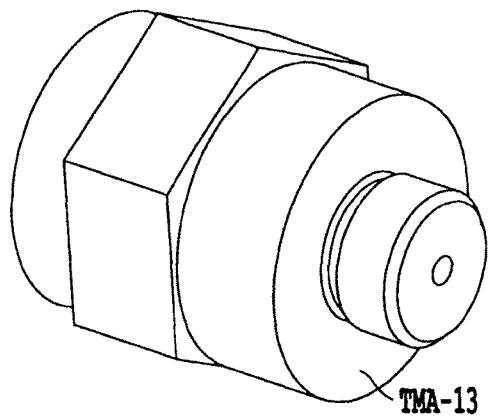
FIG. 28A-D depict respectively a schematic isometric, front, side, and cross-sectional view of a thirteenth threaded mount adapter.
Figure 28B:
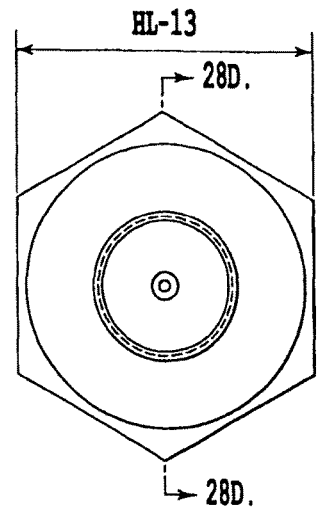
Figure 28C:
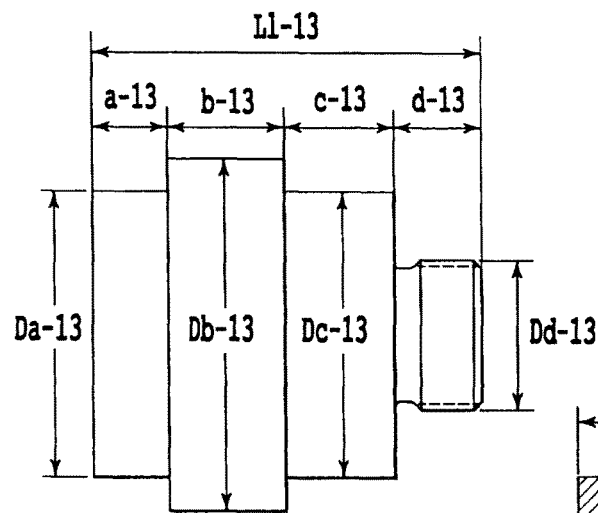
Figure 28D:
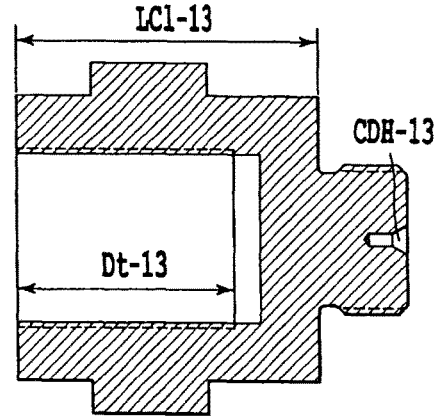
Figure 29A:
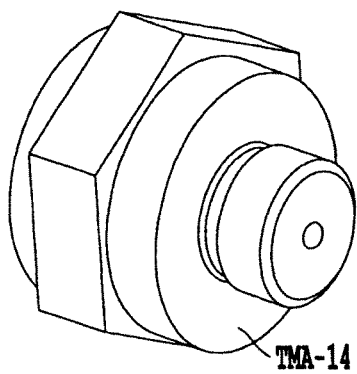
FIG. 29A-D depict respectively a schematic isometric, front, side, and cross-sectional view of a fourteenth threaded mount adapter.
Figure 29B:
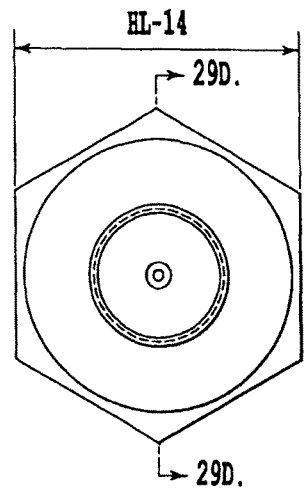
Figure 29C:
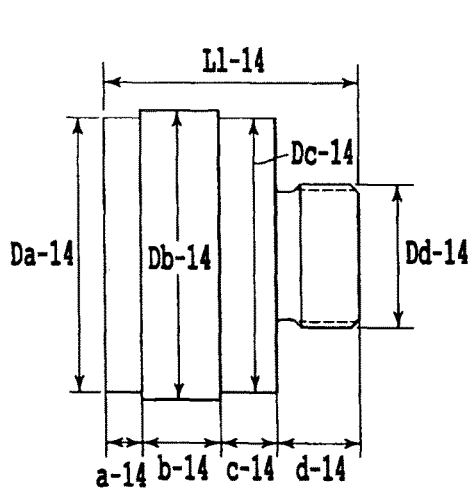
Figure 29D:
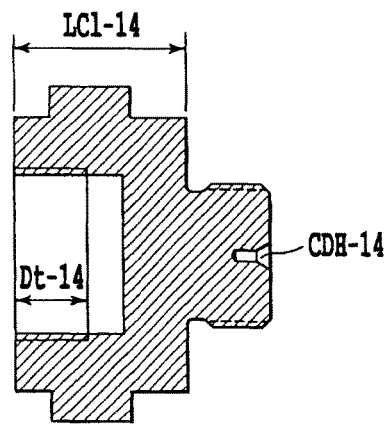
Figure 30A:
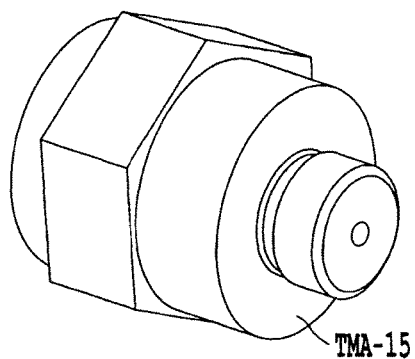
FIG. 30A-D depict respectively a schematic isometric, front, side, and cross-sectional view of a fifteenth threaded mount adapter.
Figure 30B:
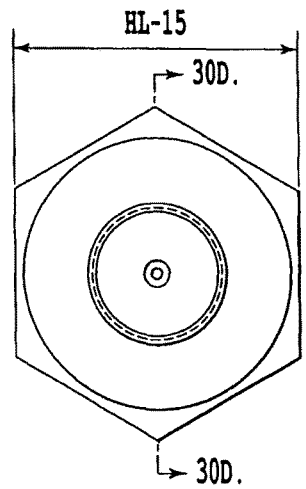
Figure 30C:
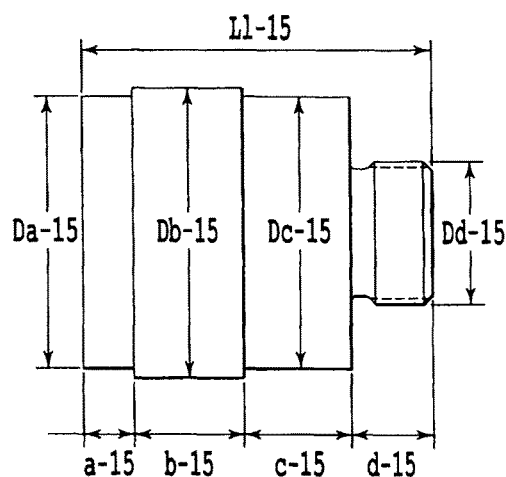
Figure 30D:
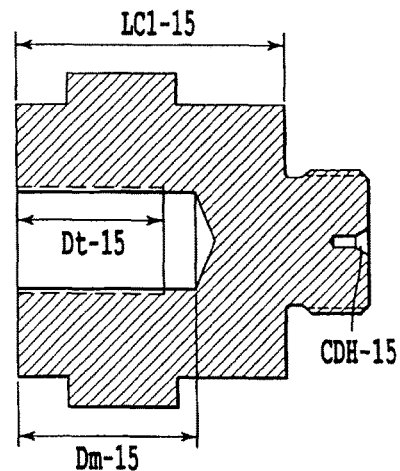
Figure 31A:
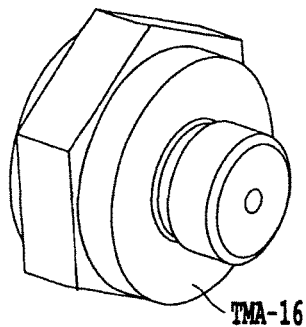
FIG. 31A-D depict respectively a schematic isometric, front, side, and cross-sectional view of a sixteenth threaded mount adapter.
Figure 31B:
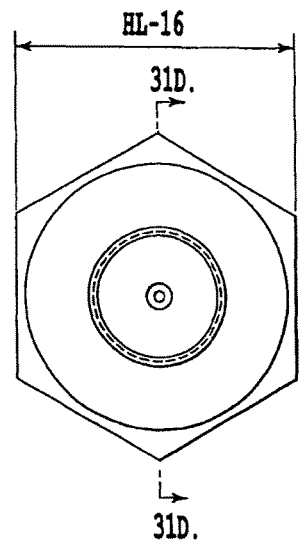
Figure 31C:
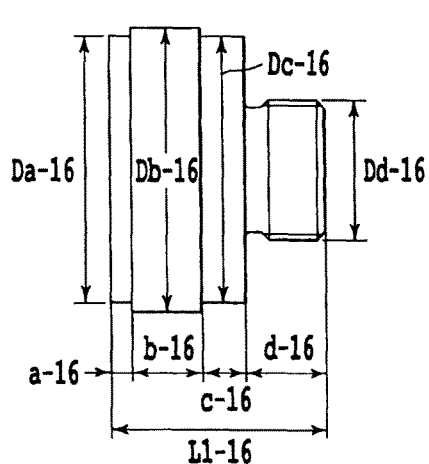
Figure 31D:
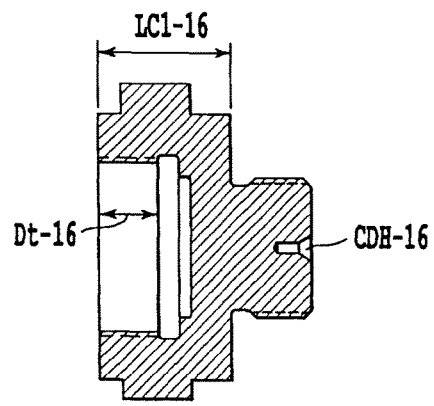
Figure 32A:
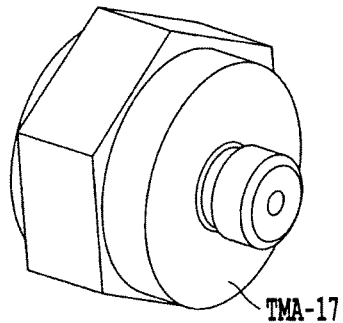
FIGS. 32A-D depict respectively a schematic isometric, front, side, and cross-sectional view of a seventeenth threaded mount adapter.
Figure 32B:
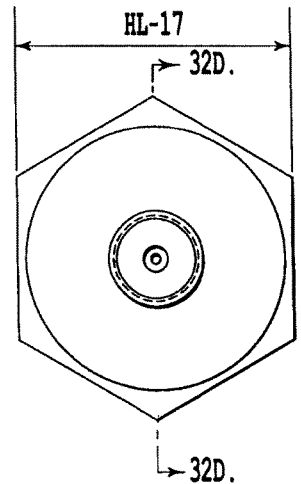
Figure 32C:
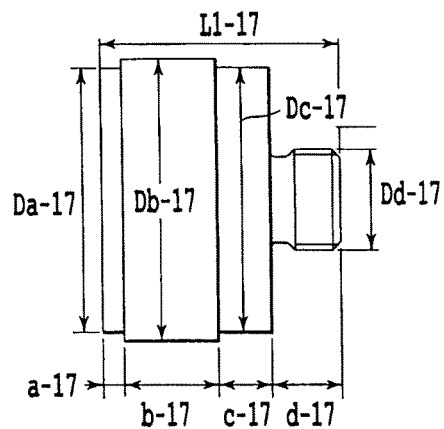
Figure 32D:
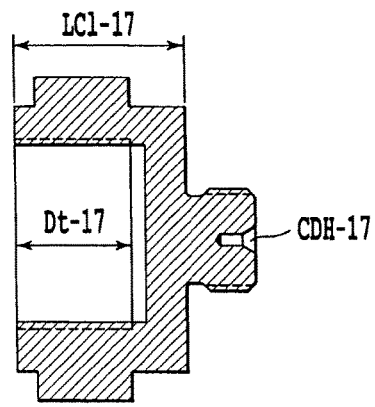
Figure 33A:
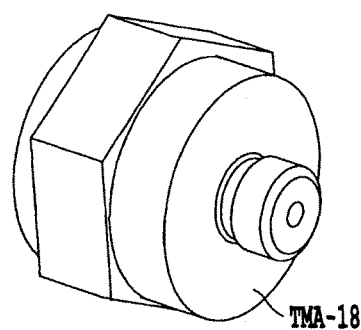
FIGS. 33A-D depict respectively a schematic isometric, front, side, and cross-sectional view of an eighteenth threaded mount adapter.
Figure 33B:
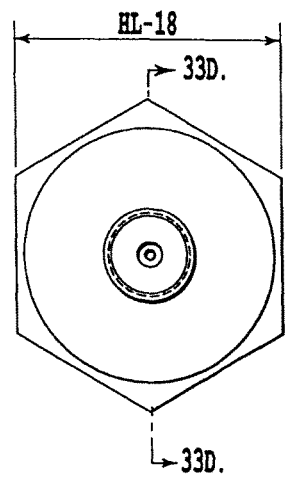
Figure 33C:
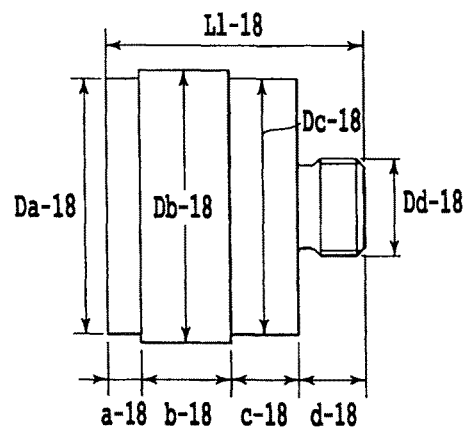
Figure 33D:
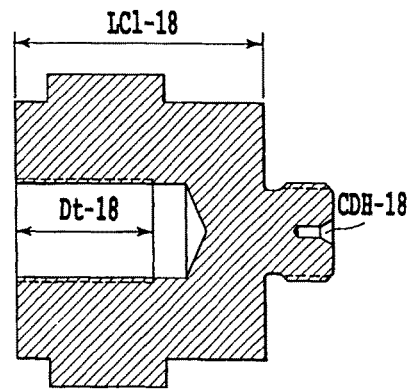
Figure 34A:
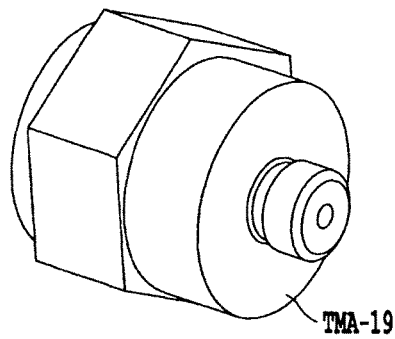
FIGS. 34A-D depict respectively a schematic isometric, front, side, and cross-sectional view of a nineteenth threaded mount adapter.
Figure 34B:
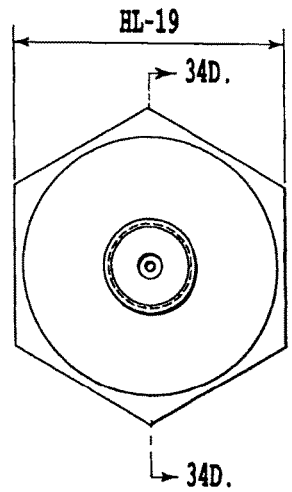
Figure 34C:
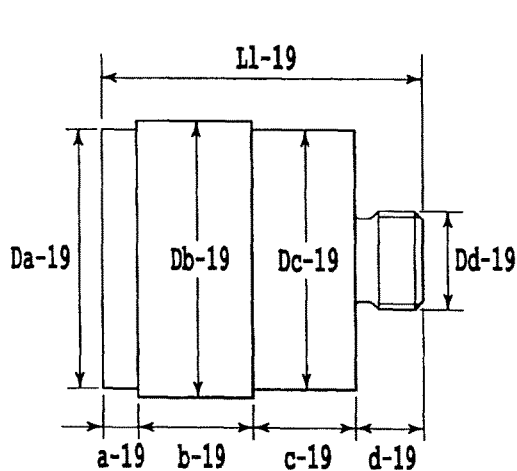
Figure 34D:
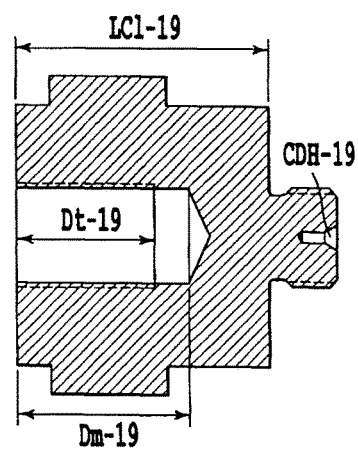
Figure 35A:
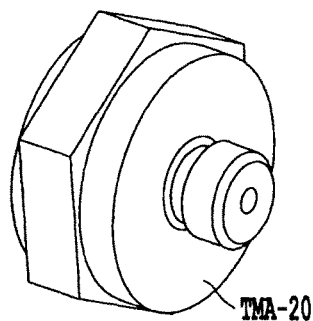
FIGS. 35A-D depict respectively a schematic isometric, front, side, and cross-sectional view of a twentieth threaded mount adapter.
Figure 35B:
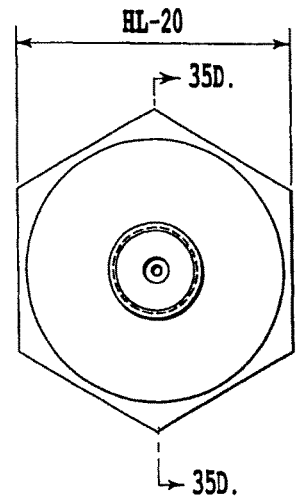
Figure 35C:
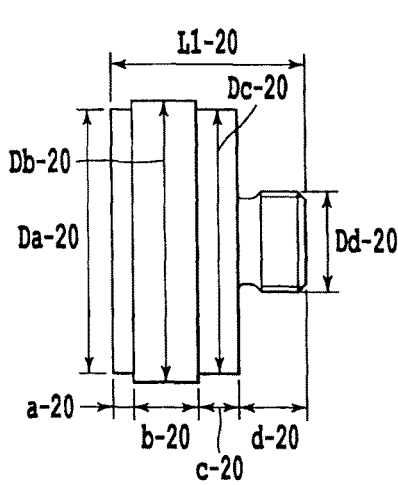
Figure 35D:
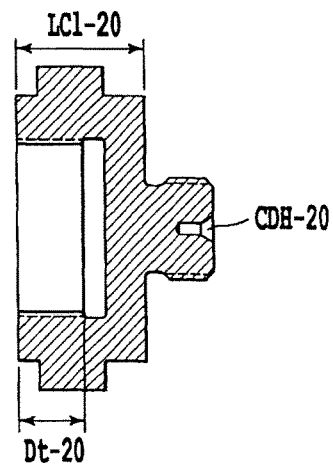
Figure 36A:
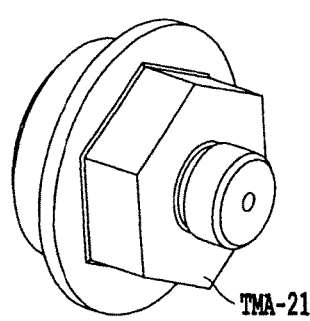
FIGS. 36A-E depict respectively a schematic isometric, front, side, cross-sectional, and detail view of a twenty-first threaded mount adapter.
Figure 36B:
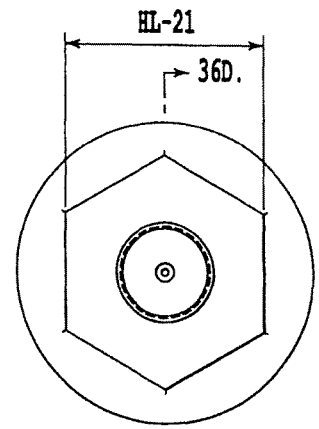
Figure 36C:
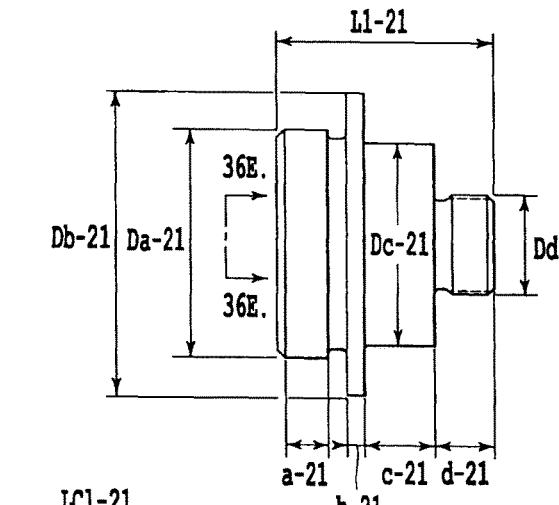
Figure 36D:
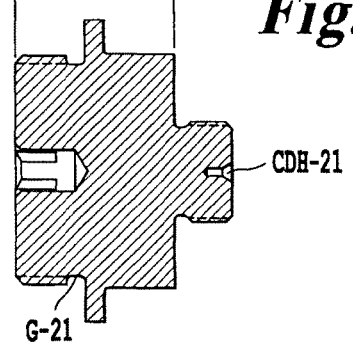
Figure 36E:
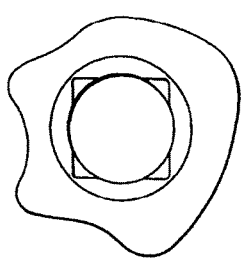
Figure 37A:
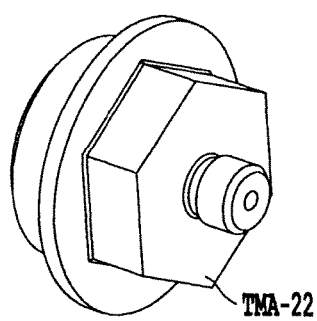
FIGS. 37A-E depict respectively a schematic isometric, front, side, cross-sectional, and detail view of a twenty-second threaded mount adapter.
Figure 37B:
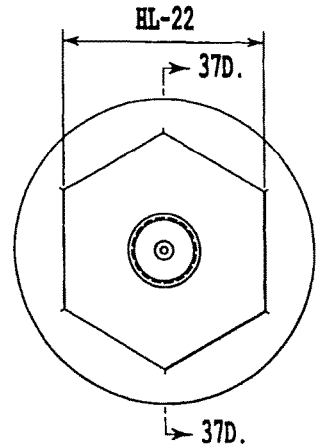
Figure 37C:
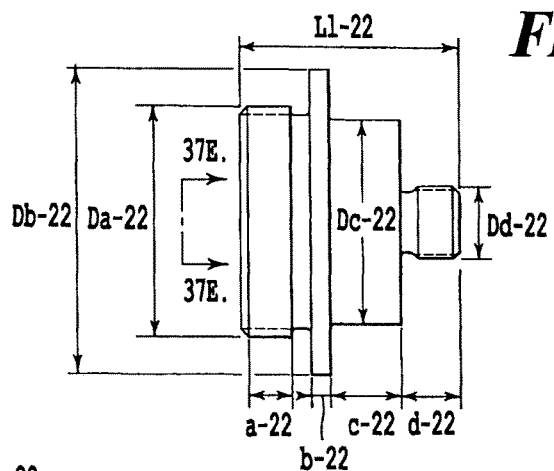
Figure 37D:
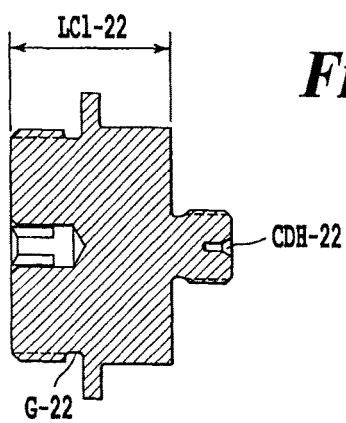
Figure 37E:
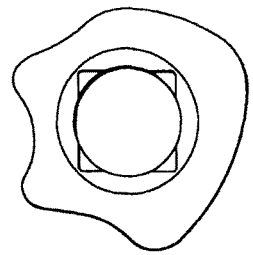
Figure 38A:
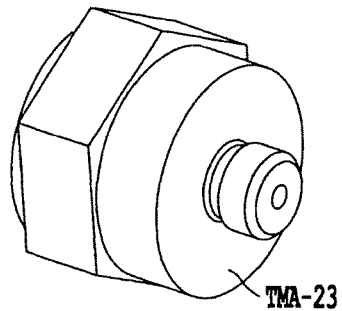
FIGS. 38A-D depict respectively a schematic isometric, front, side, and cross-sectional view of a twenty-third threaded mount adapter.
Figure 38B:
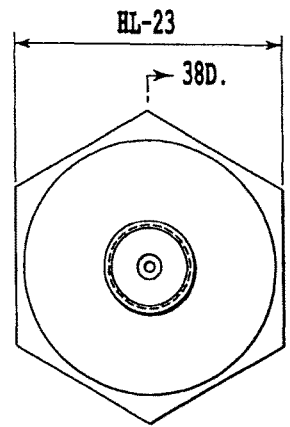
Figure 38C:
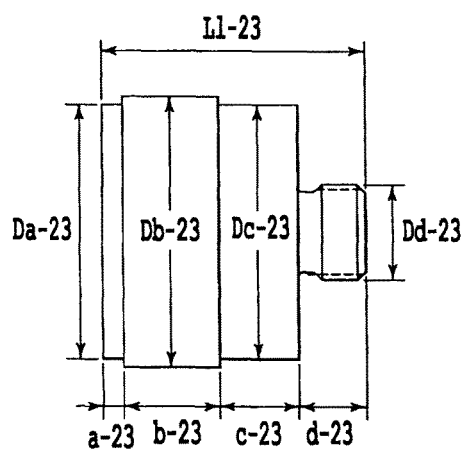
Figure 38D:
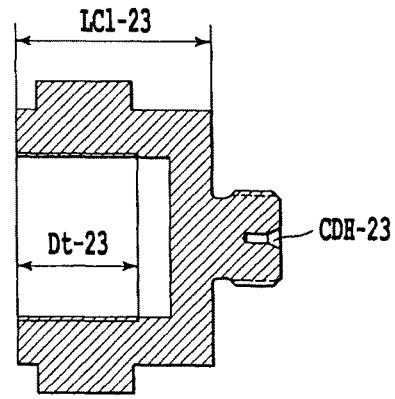
Figure 39A:
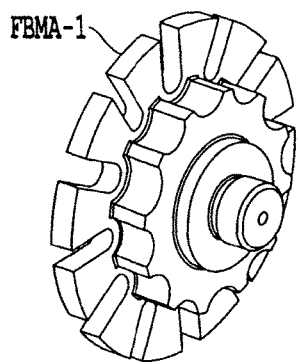
FIGS. 39A-D depict respectively a schematic isometric, front, side, and cross-sectional view of a first flange and bolt mount adapter.
Figure 39B:
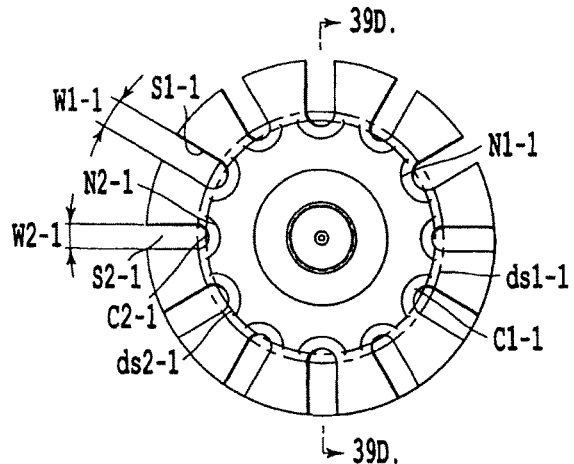
Figure 39C:
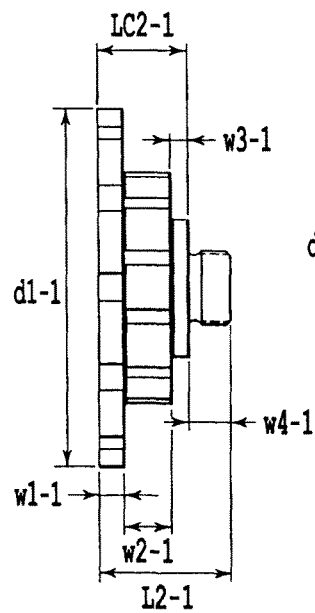
Figure 39D:
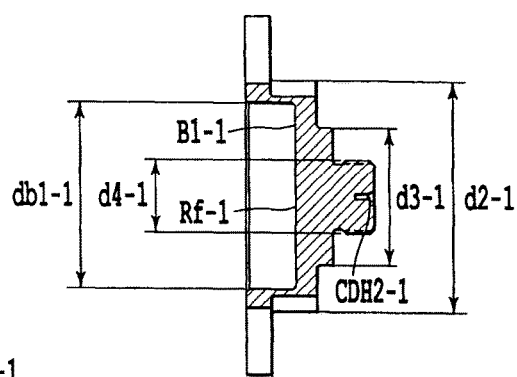
Figure 41A:
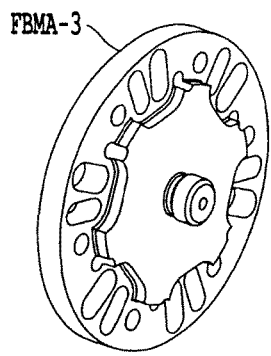
FIGS. 41A-E depict respectively a schematic isometric, front, side, cross-sectional and detail view of a third flange and bolt mount adapter.
Figure 41B:
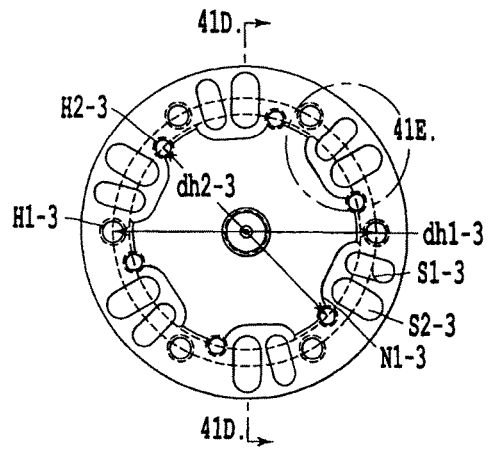
Figure 41C:
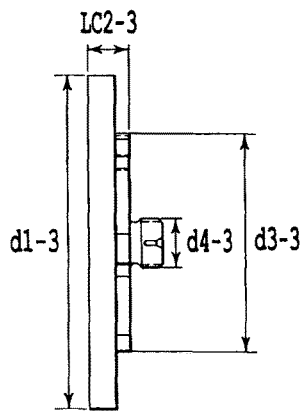
Figure 41D:
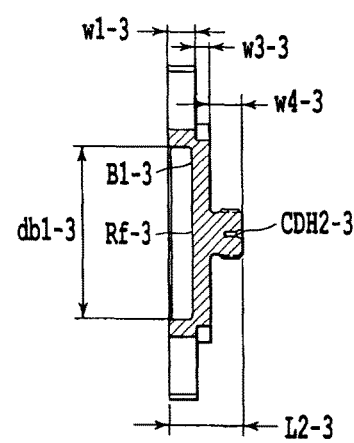
Figure 41E:
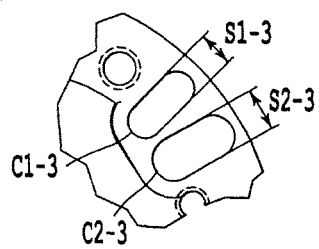
Figure 42A:
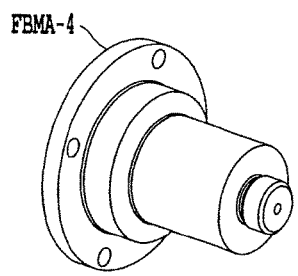
FIGS. 42A-F depict respectively a schematic isometric, front, side, cross-sectional back and detail view of a fourth flange and bolt mount adapter.
Figure 42B:
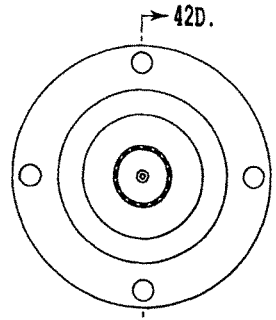
Figure 42C:
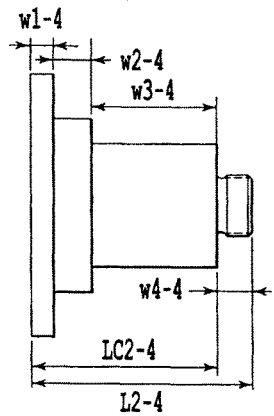
Figure 42D:
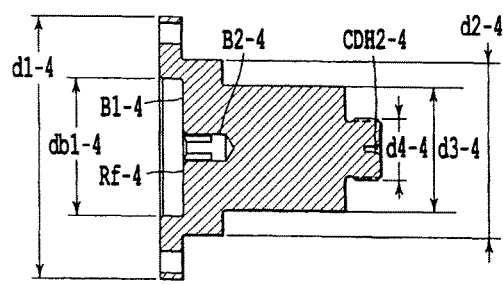
Figure 42E:
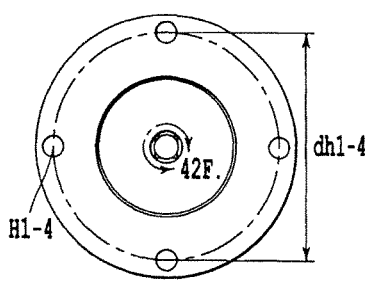
Figure 42F:
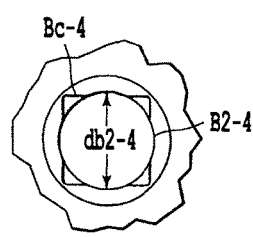
Figure 43A:
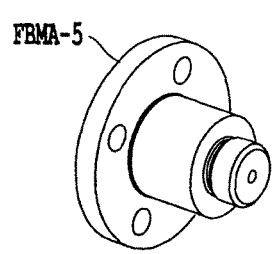
FIGS. 43A-F depict respectively a schematic isometric front side cross-sectional rear and detail view of a fifth flange and bolt mount adapter.
Figure 43B:
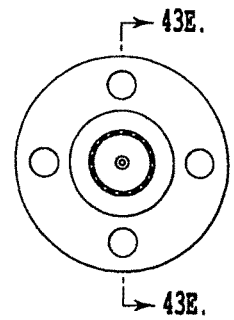
Figure 43C:
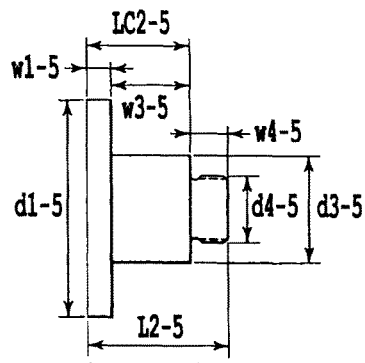
Figure 43D:
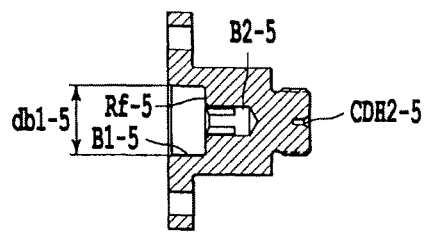
Figure 43E:
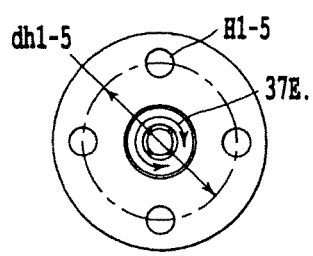
Figure 43F:
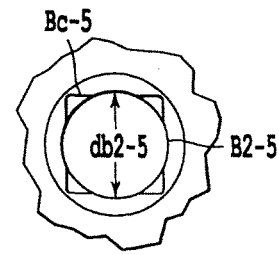
Figure 44A:
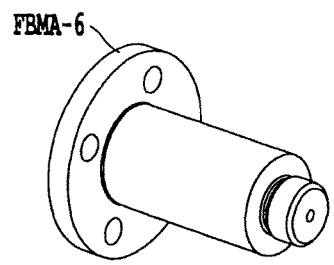
FIGS. 44A-F depict respectively a schematic isometric, front, side, cross-sectional, rear, and detail view of a sixth flange and bolt mount adapter.
Figure 44B:
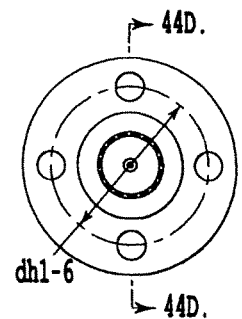
Figure 44C:
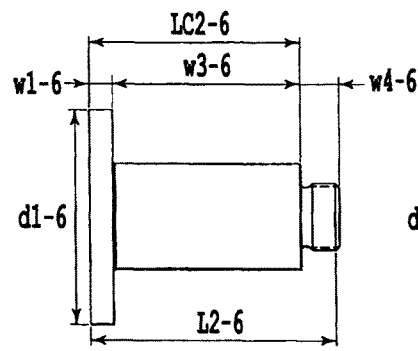
Figure 44D:
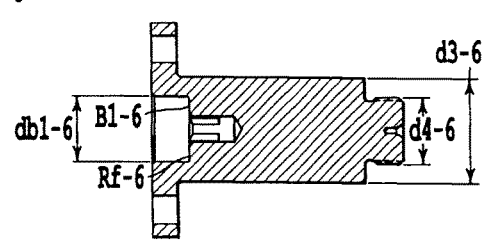
Figure 44E:
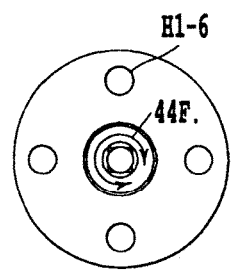
Figure 44F:
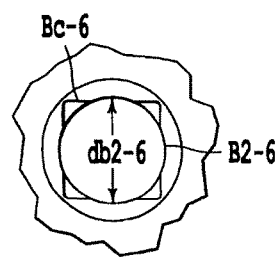
Figure 45A:
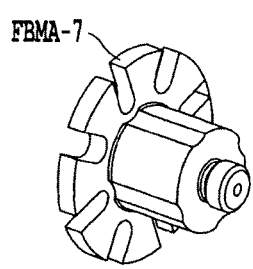
FIGS. 45A-F depict respectively a schematic isometric, front, side, cross-sectional rear and detail view of a seventh flange and bolt mount adapter.
Figure 45B:
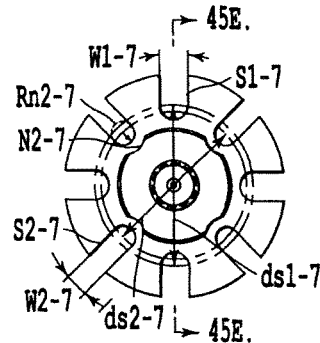
Figure 45C:
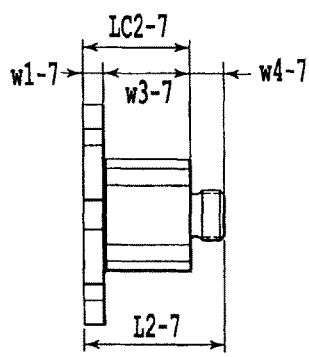
Figure 45D:
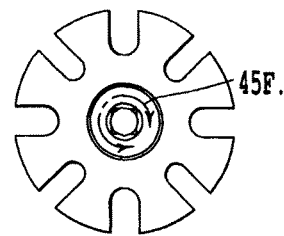
Figure 45E:
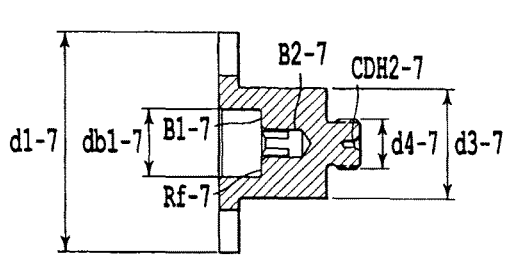
Figure 45F:
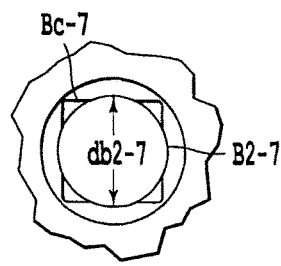
Figure 46A:
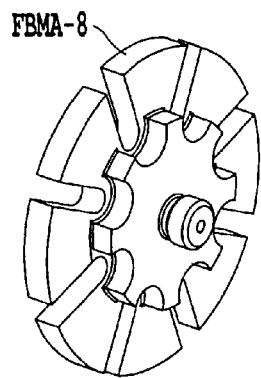
FIGS. 46A-D depict respectively a schematic isometric, front, side, and cross-sectional view of an eighth flange and bolt mount adapter.
Figure 46B:
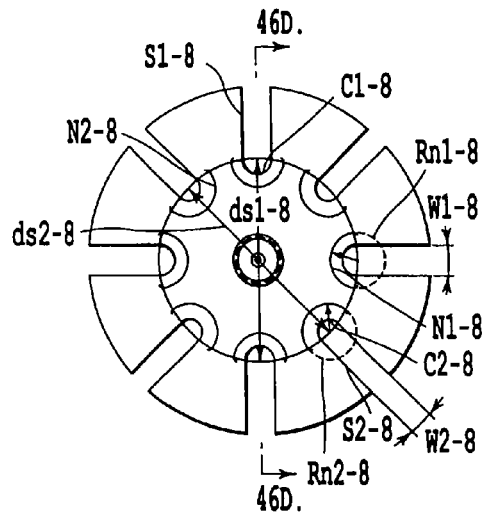
Figure 46C:
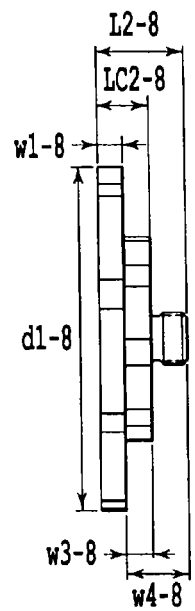
Figure 46D:
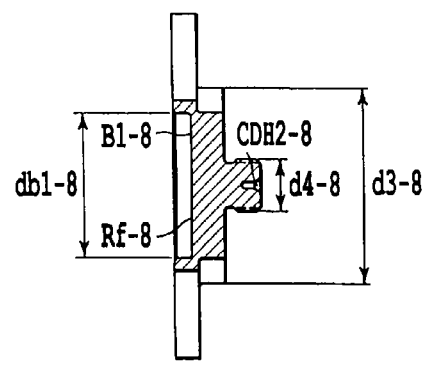
Figure 47A:
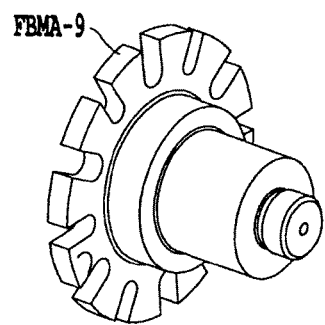
FIGS. 47A-D depict respectively a schematic isometric, front, side, and cross-sectional view of a ninth flange and bolt mount adapter.
Figure 47B:
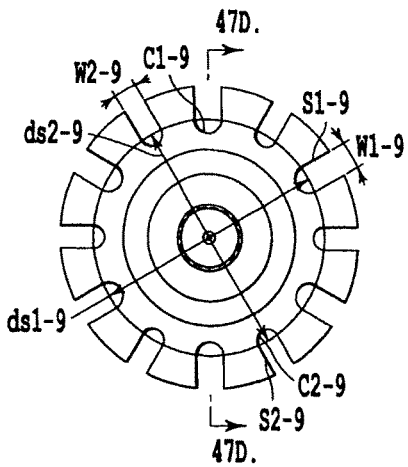
Figure 47C:
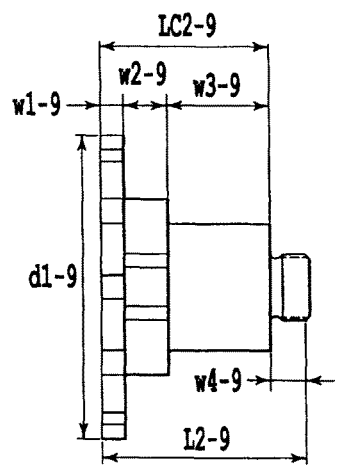
Figure 47D:
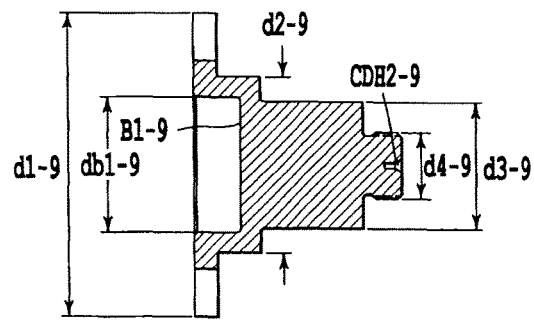
Figure 48A:
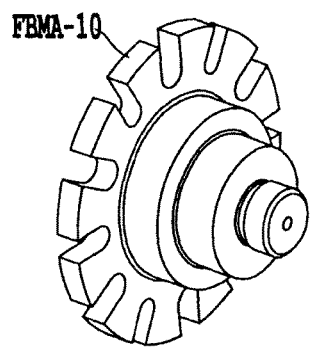
FIGS. 48A-D depict respectively a schematic isometric, front, side, and cross-sectional view of a tenth flange and bolt mount adapter.
Figure 48B:
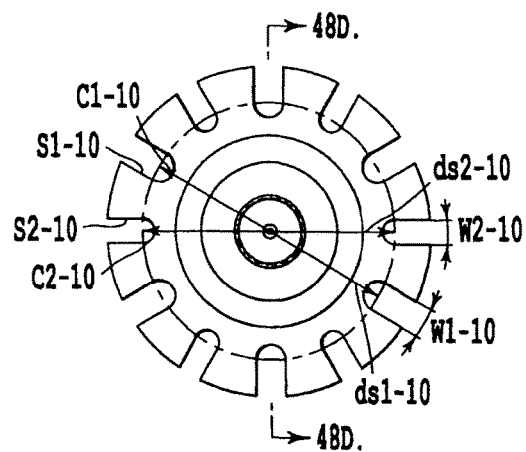
Figure 48C:
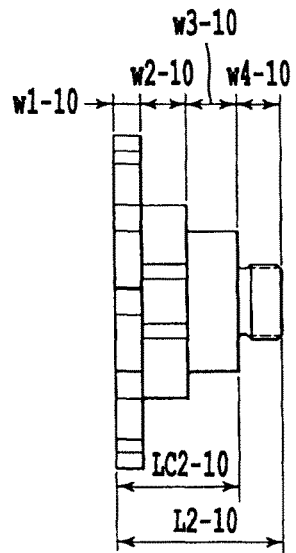
Figure 48D:
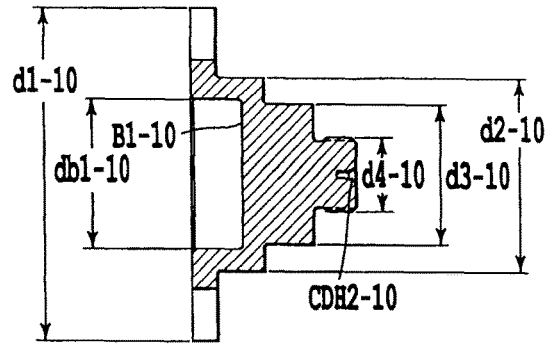
Figure 49A:
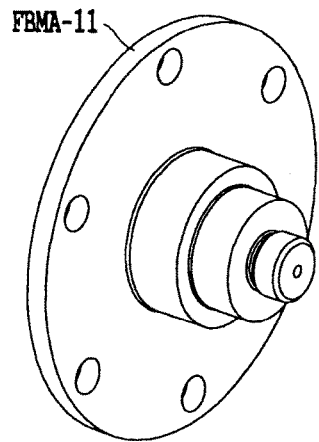
FIGS. 49A-E depict respectively a schematic isometric, front, side, cross-sectional, and detail view of an eleventh flange and bolt mount adapter.
Figure 49B:
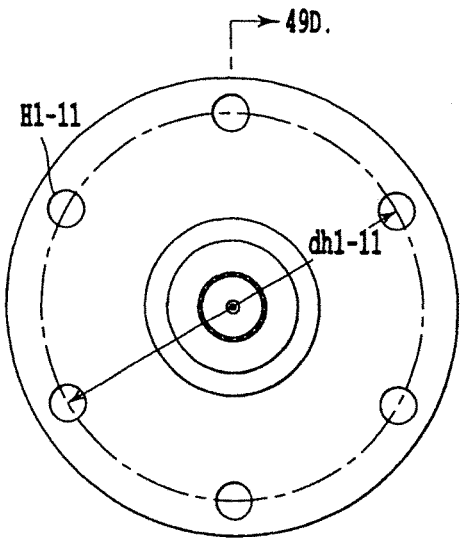
Figure 49C:
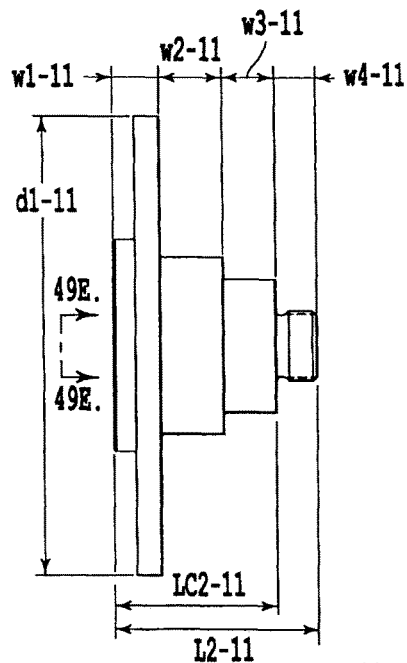
Figure 49D:
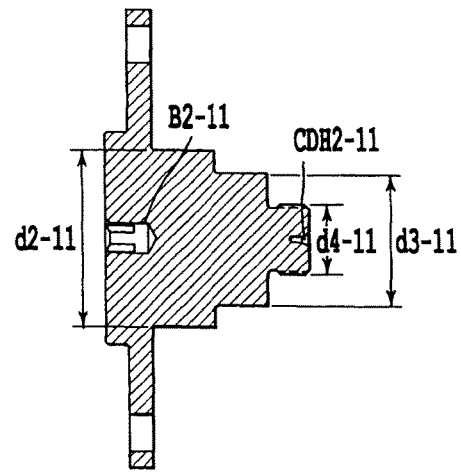
Figure 49E:
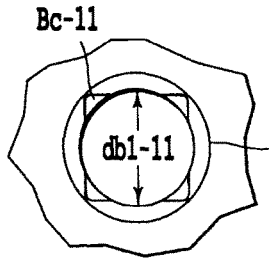
Figure 50A:
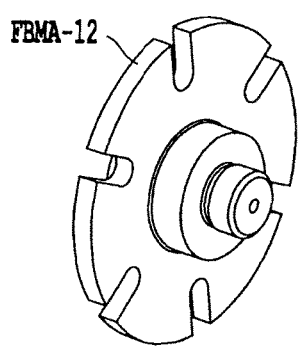
FIGS. 50A-E depict respectively a schematic isometric, front, side, cross-sectional, and detail view of a twelfth flange and bolt mount adapter.
Figure 50B:
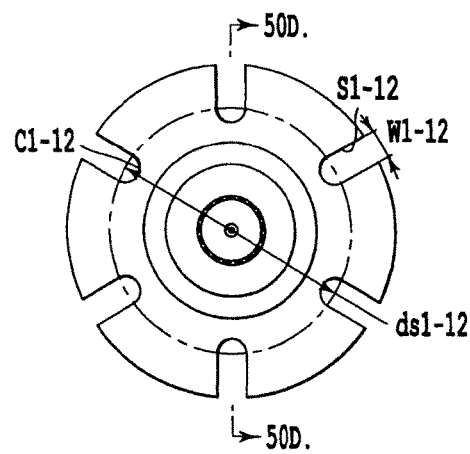
Figure 50C:
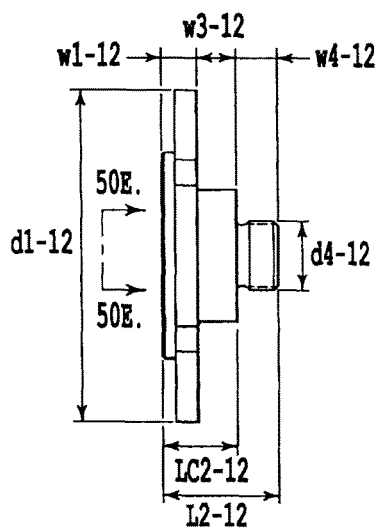
Figure 50D:
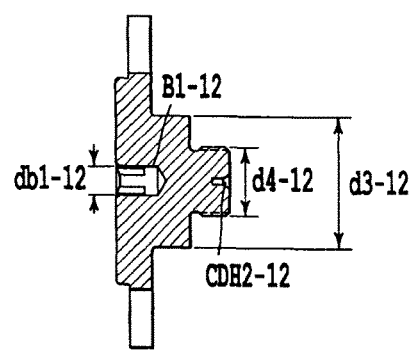
Figure 50E:
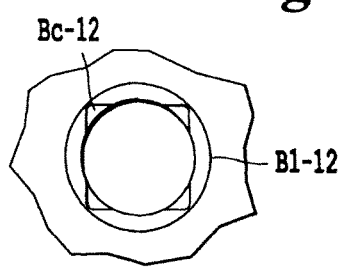
Figure 51A:
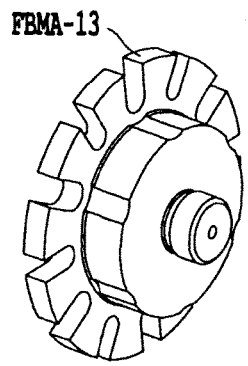
FIGS. 51A-D depict respectively a schematic isometric, front, side, and cross-sectional view of a thirteenth flange and bolt mount adapter.
Figure 51B:
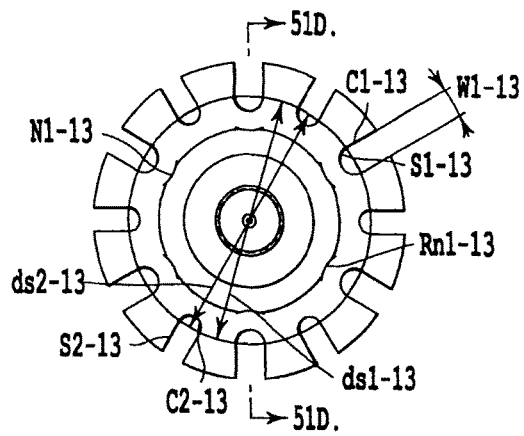
Figure 51C:
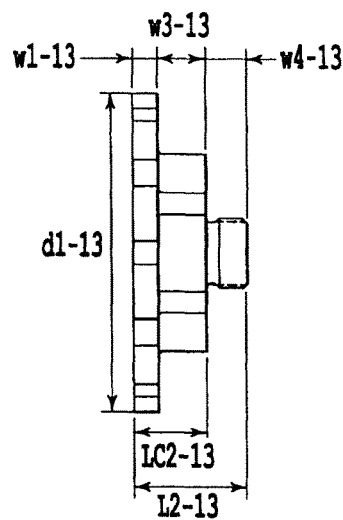
Figure 51D:
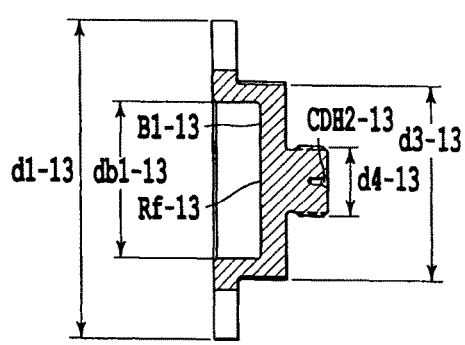
Figure 52A:
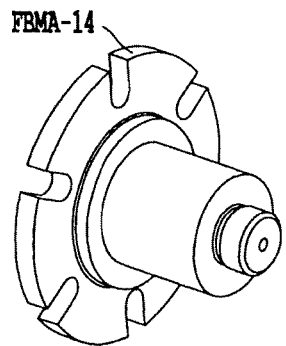
FIGS. 52A-D depict respectively a schematic isometric, front, side, and cross-sectional view of a fourteenth flange and bolt mount adapter.
Figure 52B:
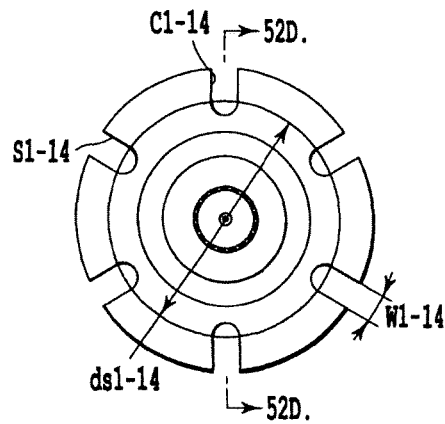
Figure 52C:
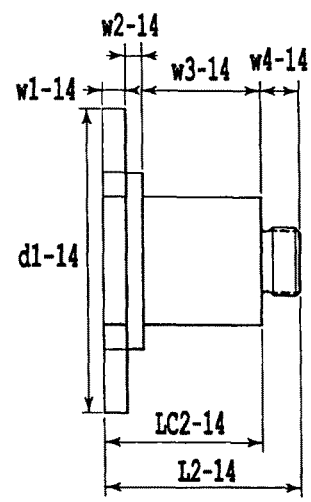
Figure 52D:
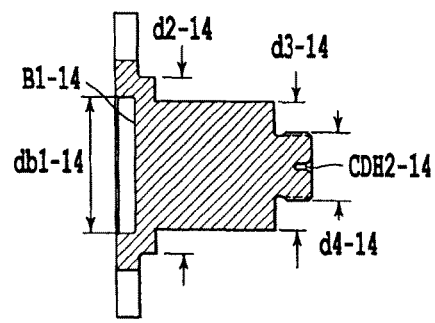
Figure 53A:
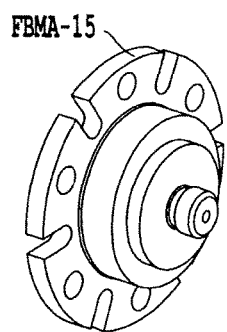
FIGS. 53A-D depict respectively a schematic isometric, front, side, and cross-sectional view of a fifteenth flange and bolt mount adapter.
Figure 53B:
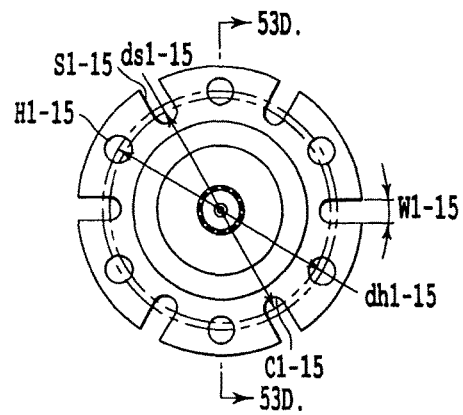
Figure 53C:
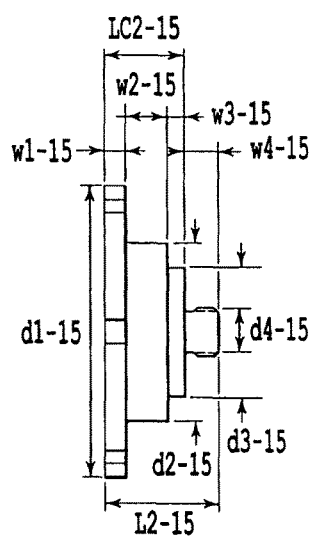
Figure 53D:
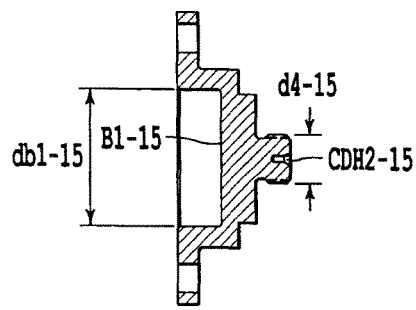
Figure 54A:
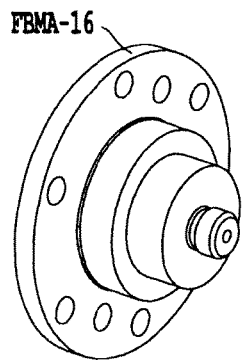
FIGS. 54A-D depict respectively a schematic isometric, front, side, and cross-sectional view of a sixteenth flange and bolt mount adapter.
Figure 54B:
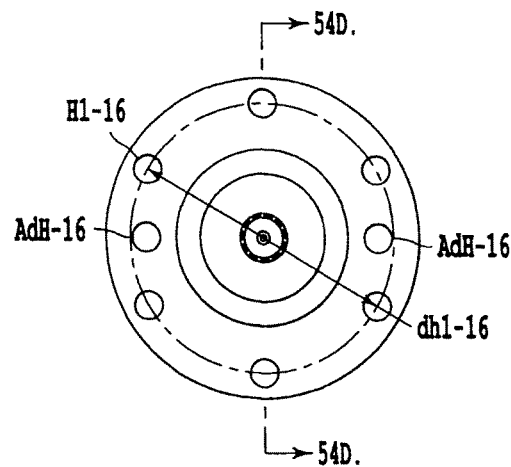
Figure 54C:
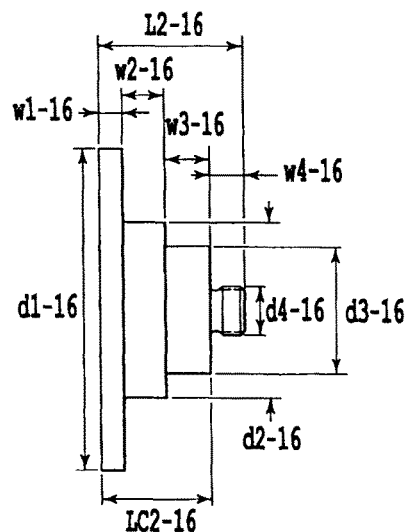
Figure 54D:
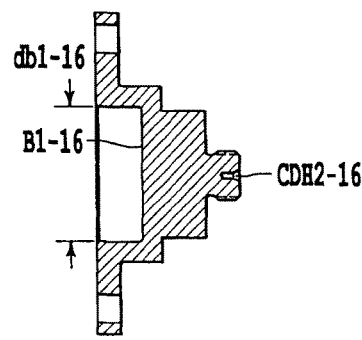
Figure 56A:
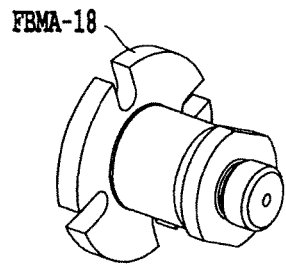
FIGS. 56A-F depict respectively a schematic isometric, front, side, cross-sectional, rear, and detail view of an eighteenth flange and bolt mount adapter.
Figure 56B:
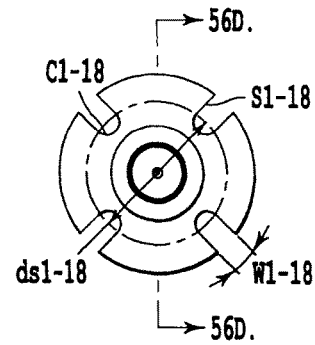
Figure 56C:
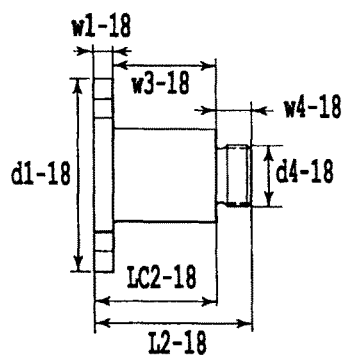
Figure 56D:
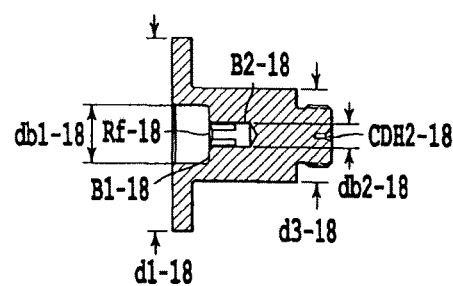
Figure 56E:
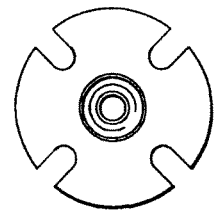
Figure 56F:
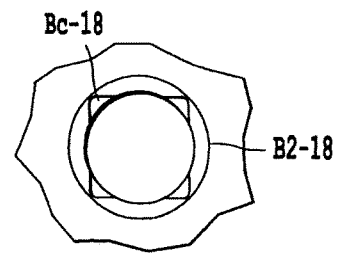
Figure 57A:
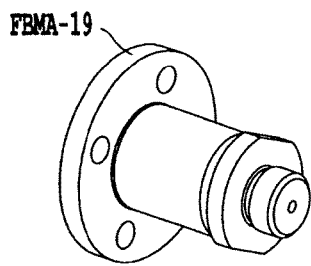
FIGS. 57A-D depict respectively a schematic isometric, front, side, and cross-sectional view of a nineteenth flange and bolt mount adapter.
Figure 57B:
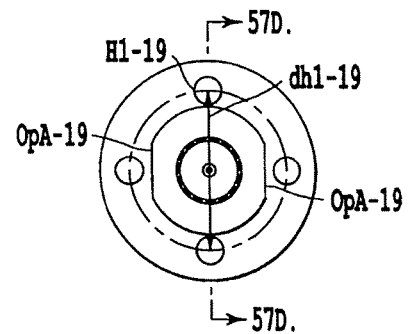
Figure 57C:
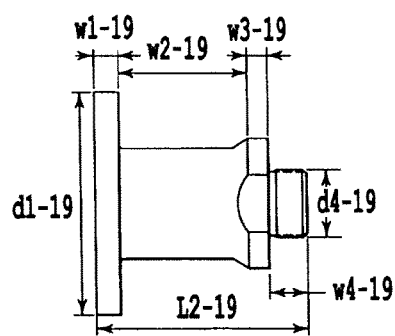
Figure 57D:
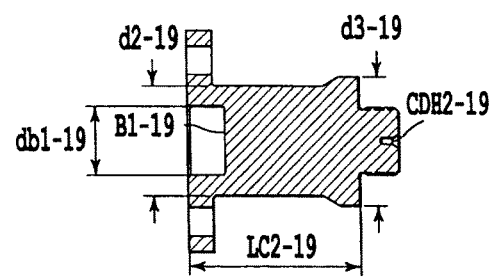
Figure 58A:
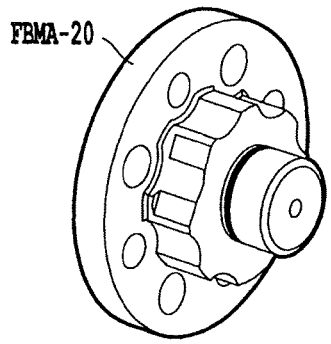
FIGS. 58A-F depict respectively a schematic isometric, front, side, back, detail, and cross-sectional view of a twentieth flange and bolt mount adapter.
Figure 58B:
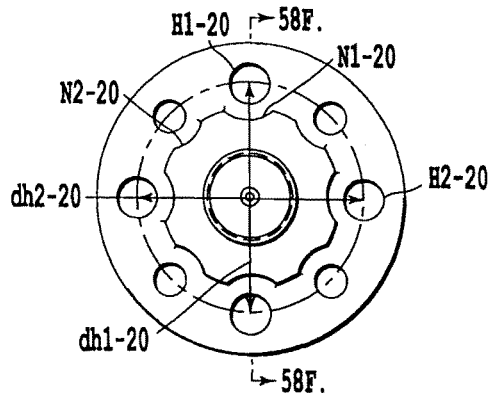
Figure 58C:
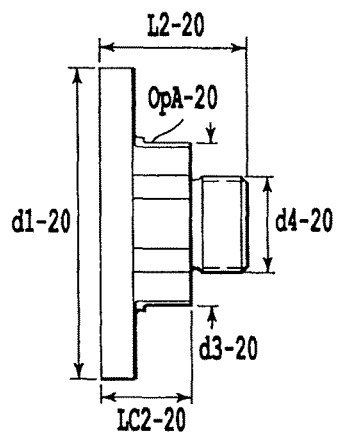
Figure 58D:
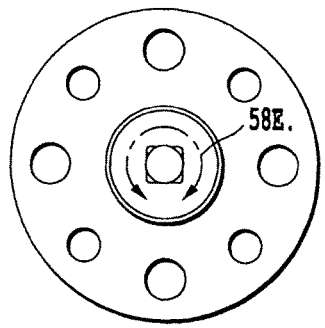
Figure 58E:
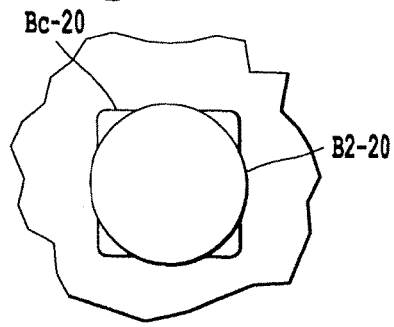
Figure 58F:
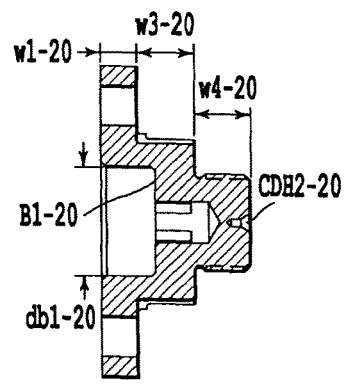
Figure 59A:
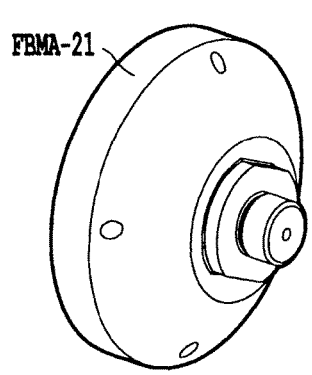
FIGS. 59A-E depict respectively a schematic isometric, front, rear, side, and cross-sectional view of a twenty-first flange and bolt mount adapter.
Figure 59B:
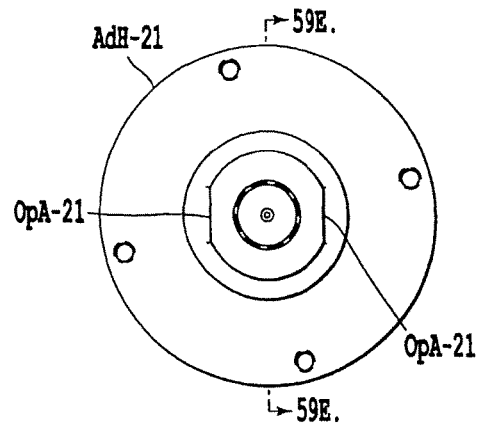
Figure 59C:
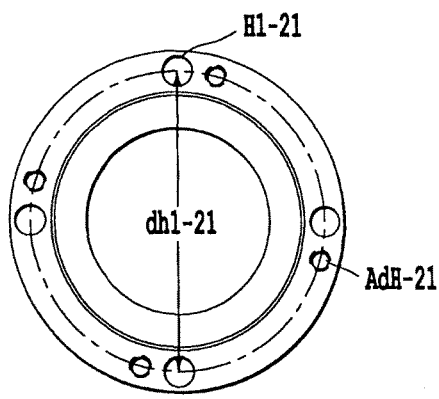
Figure 59D:
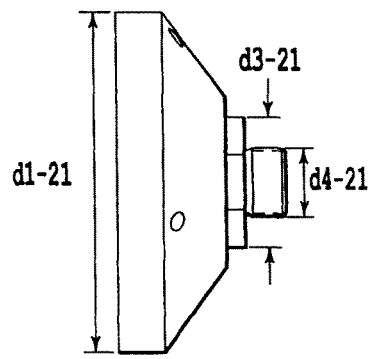
Figure 59E:
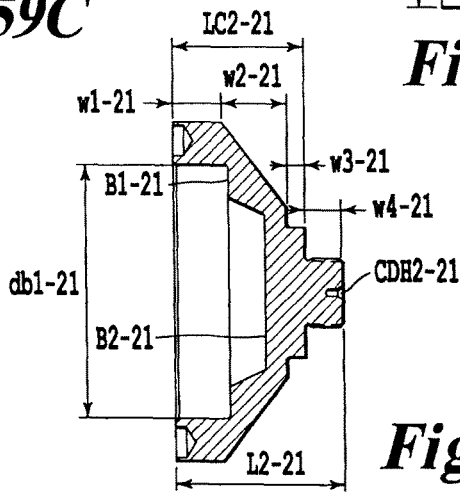
Figure 60A:
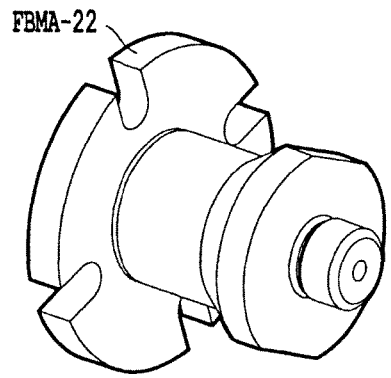
FIGS. 60A-E depict respectively a schematic isometric, front, side, rear and cross-sectional view of a twenty-second flange and bolt mount adapter.
Figure 60B:
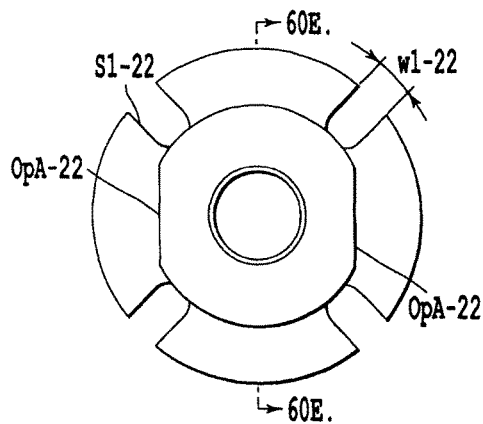
Figure 60C:
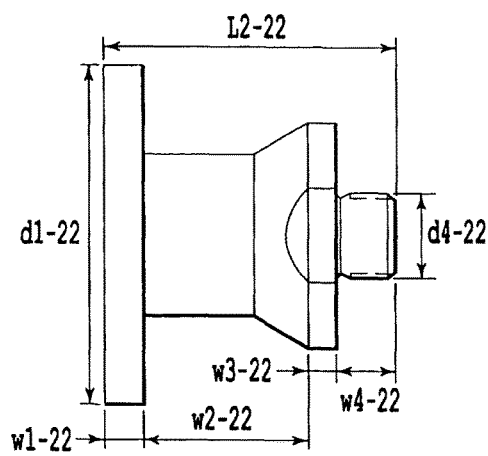
Figure 60D:
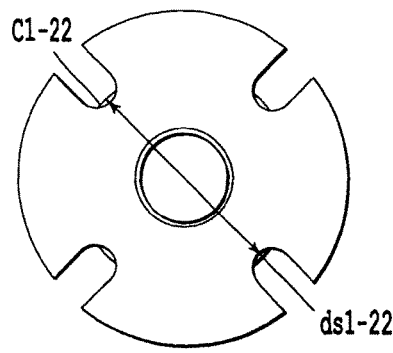
Figure 60E:
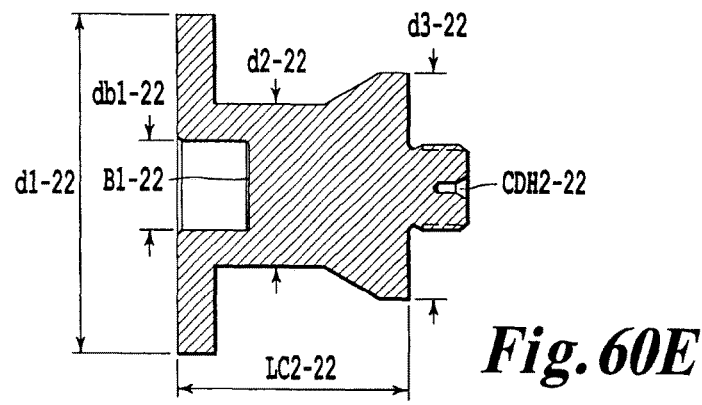
Figure 61A:
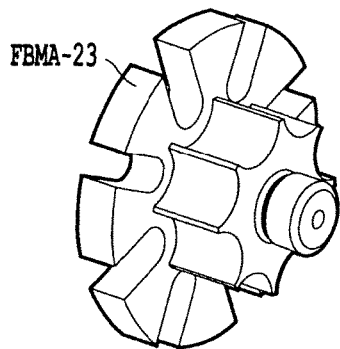
FIGS. 61A-F depict respectively a schematic isometric, front, side, rear, detail, and cross-sectional view of a twenty-third flange and bolt mount adapter.
Figure 61B:
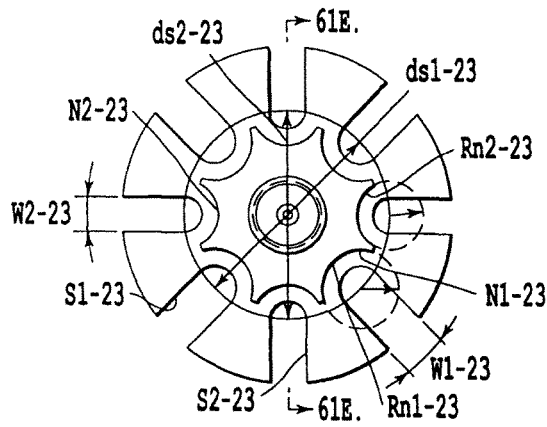
Figure 61C:
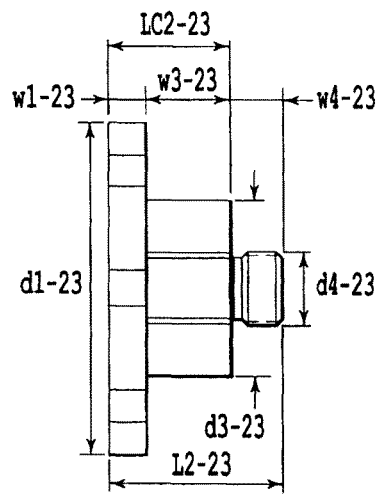
Figure 61D:
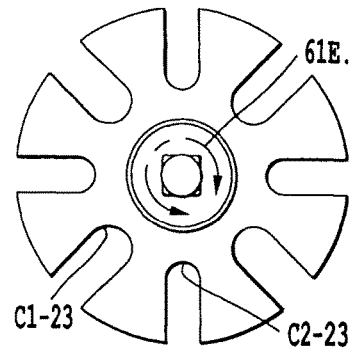
Figure 61E:
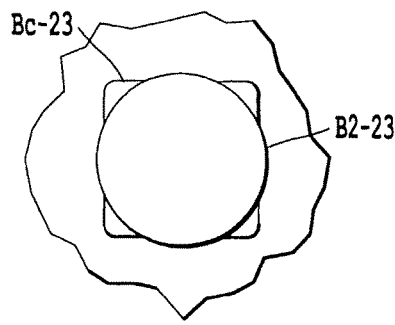
Figure 61F:
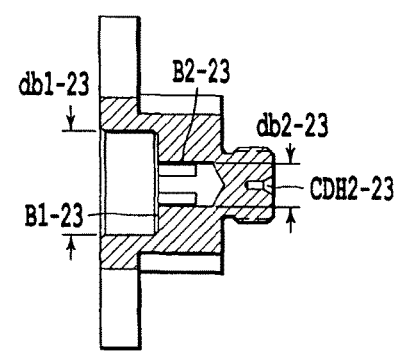
Figure 62A:
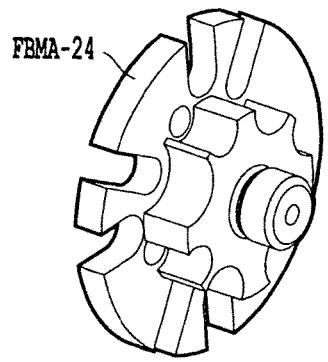
FIGS. 62A-E depict respectively a schematic isometric, front, side, rear, and cross-sectional view of a twenty-fourth flange and bolt mount adapter.
Figure 62B:
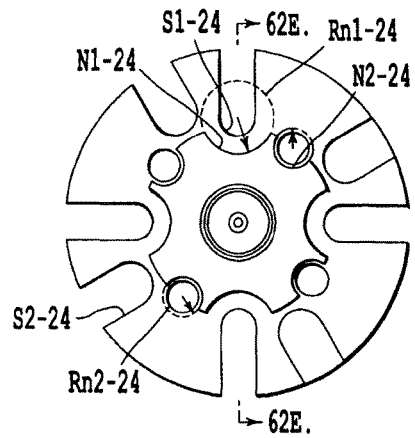
Figure 62C:
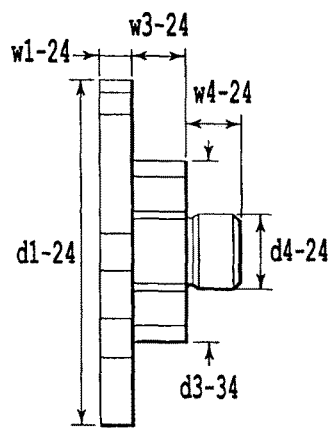
Figure 62D:
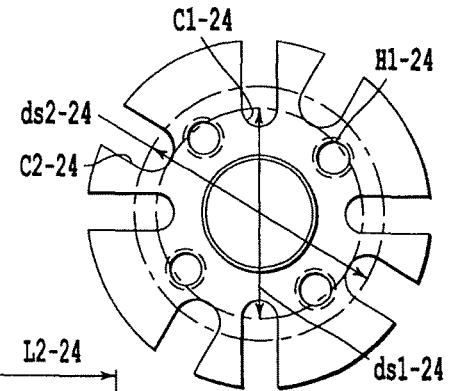
Figure 62E:
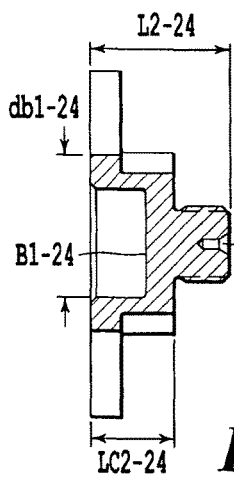
Figure 63A:
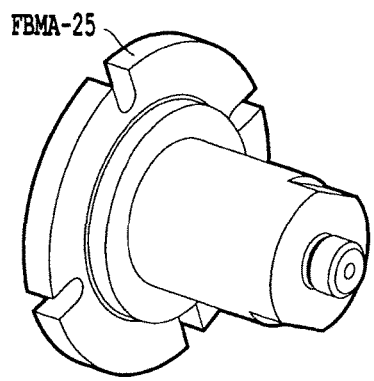
FIGS. 63A-D depict respectively a schematic isometric, front, side, and cross-sectional view of a twenty-fifth flange and bolt mount adapter.
Figure 63B:
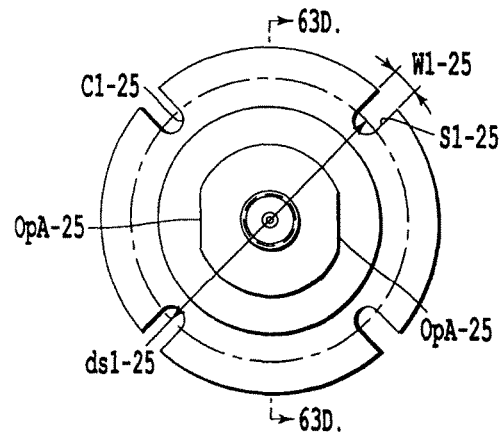
Figure 63C:
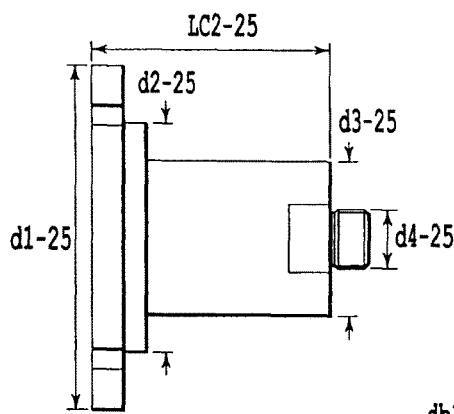
Figure 63D:
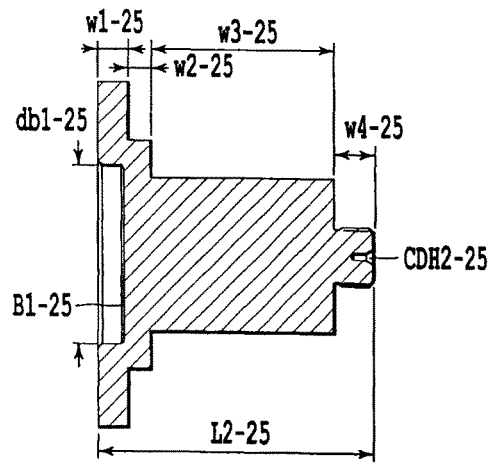
Figure 64A:
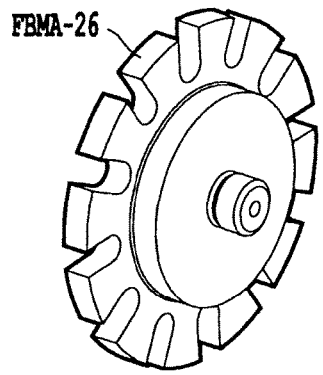
FIGS. 64A-D depict respectively a schematic isometric, front, side, and cross-sectional view of a twenty-sixth flange and bolt mount adapter.
Figure 64B:
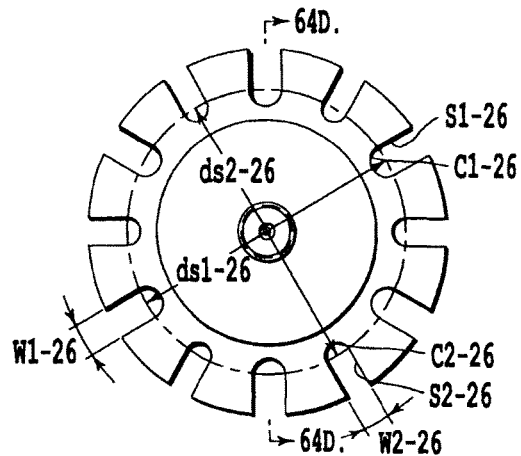
Figure 64C:
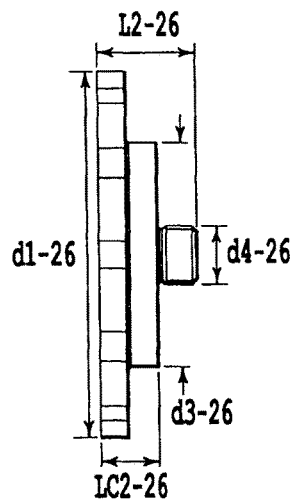
Figure 64D:
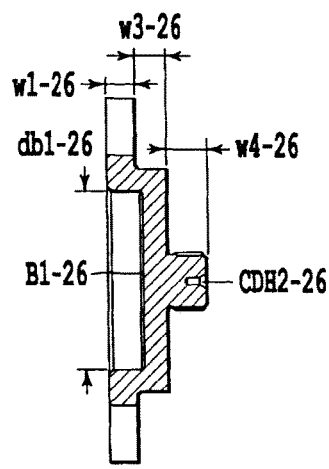
Figure 65A:
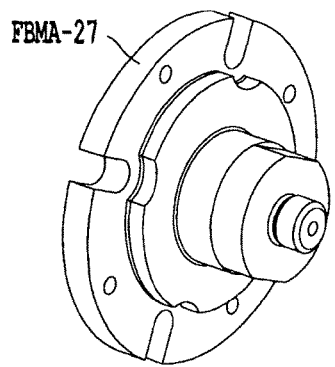
FIGS. 65A-D depict respectively a schematic isometric, front, side, and cross-sectional view of a twenty-seventh flange and bolt mount adapter.
Figure 65B:
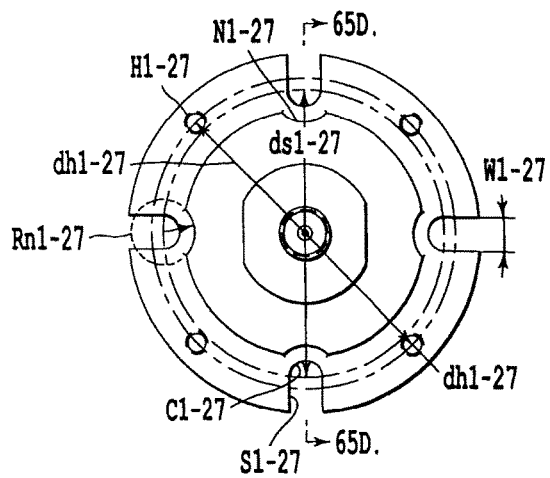
Figure 65C:
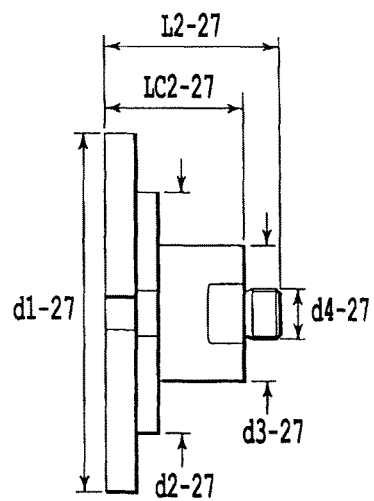
Figure 65D:
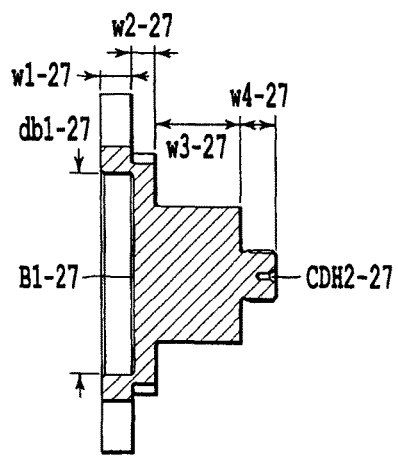
Figure 66A:
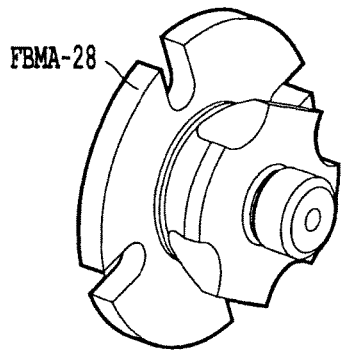
FIGS. 66A-E depict respectively a schematic isometric, front, side, rear, and cross-sectional view of a twenty-eighth flange and bolt mount adapter.
Figure 66B:
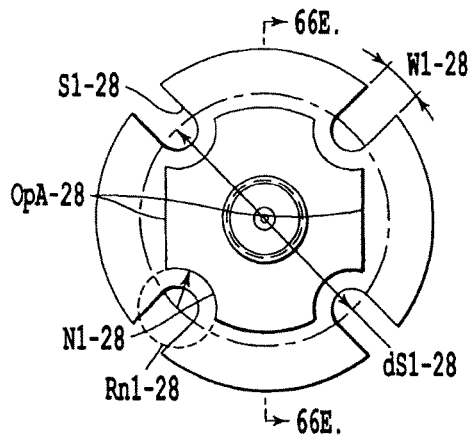
Figure 66C:
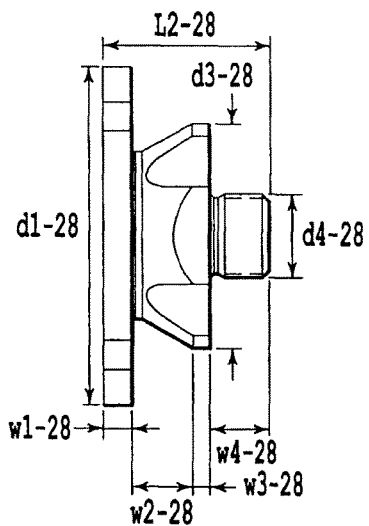
Figure 66D:
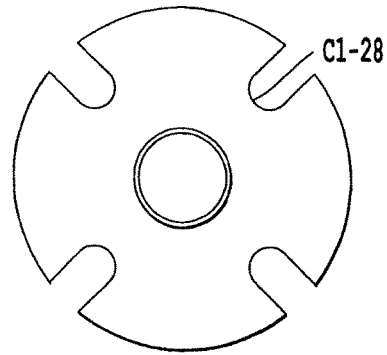
Figure 66E:
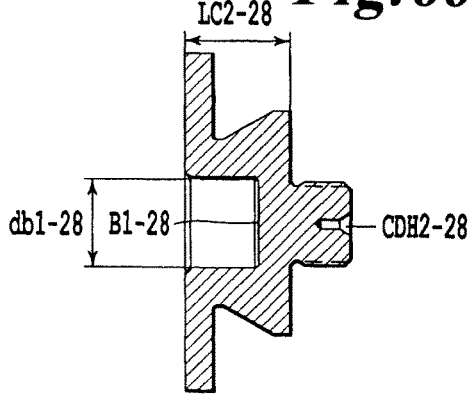

Referring to FIG. 13, an exemplary embodiment of a fan adapter FA-2 is shown with dowel pins. The dowel pins may be inserted into holes on the fan during the assembly process.

In addition to an adjustment in pilot diameter when connecting a UMFD with a fan, a specific spacing between the fan and the clutch head radiator may need to be achieved. To obtain the necessary spacing when connecting the UMFD with the fan, a fan spacer may be used to achieve the required spacing.

In an exemplary embodiment, fan spacers may be machined out of 1018 steel, with a black oxide finish. All sharp edges may be broken and all burrs removed. Referring to FIG. 3A-3C, a fan spacer FS may be an annulus shaped component with an outermost diameter D3 which may be between 1.2 and 1.7 of an innermost diameter D0, more preferably between 1.3 and 1.6 of an innermost diameter D0, still more preferably between 1.4 and 1.5 of an innermost diameter D0. Each fan spacer may have a female lip with diameter D4, and a male lip with diameter D0, where the lips may be on either side of a section which determines the fan spacing amount with thickness t1. At the transition between the male lip and the main section of the fan spacer, a maximum radius may be allowed. The total fan spacer thickness may be t2. Two types of holes may be evenly positioned around the circumference of the fan spacer, the first set of holes H1 located at a diameter D1, and spaced with an angle θ1 between each hole and its neighboring holes. The second set of holes H2 may be located at a diameter D2, spaced with an angle θ2 between each hole and its neighboring holes. For each exemplary embodiment, reference characters may be further distinguished by a numeric suffix, i.e., D0-1 for diameter D0 in a first embodiment of a fan spacer.

Figure 14A:
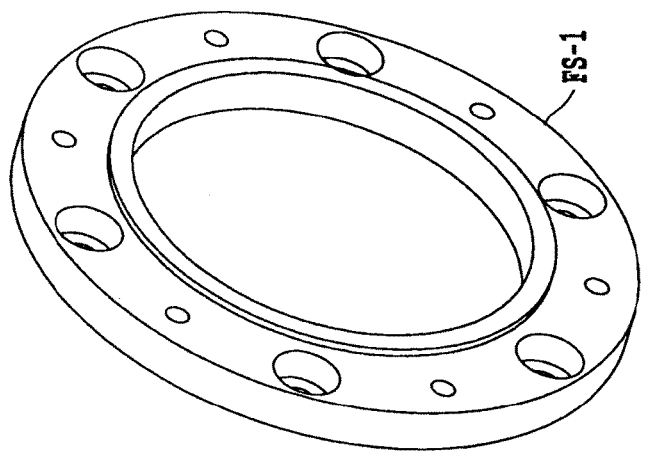

Referring to FIGS. 14A-14C, an exemplary embodiment of a first fan spacer FS-1 may comprise a female lip with a diameter D4-1 may be between 0.8 and 1.6 of a male lip diameter D0-1, more preferably between 0.9 and 1.5 of a male lip diameter D0-1, still more preferably between 1 and 1.2 of the male lip diameter D0-1, with a maximum thickness to maximum diameter ratio between 0.05 and 0.15, more preferably between 0.06 and 0.1, and still more preferably between 0.07 and 0.09. The fan spacing amount may be determined by thickness t1-1 which may be between 0.5 and 1 of the total fan space thickness t2-1, more preferably between 0.6 and 0.9 of the total fan space thickness t2-1, still more preferably between 0.7 and 0.8 of the total fan spacer thickness t2-1. The male lip may protrude by t2-1 minus t1-1. The first set of holes H1-S1 may be located at a diameter D1-1, which may be the same as the diameter D2-1 of the second set of holes H2-S1, spaced with an angle θ1-1, identical to the angle θ2-1. Six of the holes H1-S1 may have a diameter going through the part, with a wider diameter circular hole with a depth. The six remaining holes H2-S1 may be threaded. A part number may be engraved at a diameter greater than D1-1.

Referring to FIGS. 15A-15C, an exemplary embodiment of a second fan spacer FS-2 may comprise a female lip with a diameter D4-2 between 0.8 and 1.4 of the male lip diameter D0-2, more preferably between 0.9 and 1.3 of the diameter D0-2, still more preferably between 1 and 1.2 of the diameter D0-2, while the fan spacing amount may be determined by thickness t1-2, with a maximum thickness to maximum diameter ratio between 0.01 and 0.09, more preferably between 0.02 and 0.08, and still more preferably between 0.04 and 0.06. The male lip may protrude by t2-2 minus t1-2. The second fan spacer FS-2 may comprise a single series of six holes H1-S2 spaced evenly around its circumference, all located at a same diameter D1-2. Holes may have a diameter going through the part. A part number may be engraved at a diameter greater than D1-2.

Mount adapters serve to connect a selected UMFD to a variety of engine block mounts. Engine block mounts may be of two types determined by the engine block attachment mode: flange and bolt type or threaded type. Two mount adapter types correspond to these engine block attachment modes. There may be threaded adapters for both the large and small UMFD models, and there may be flange and bolt type adapters for both the large and small UMFD models. The mount adapters may be manufactured out of 1215 steel, and may be may be provided with a black oxide finish.

Referring to FIGS. 4A-4D, a threaded type mount adapter TMA may have an overall cylindrical shape with a hexagonal section. The adapter may have overall length L1, with four longitudinal sections, the first section may have length a and diameter Da, the second section may have a hexagonal profile with length b and diameter Db, the third section may have length c and diameter Dc, and the fourth section may have length d and end diameter Dd. The threaded mount adapter may be characterized by a characteristic length LC1, which is the combined length of the first through third sections. The second section may be further referenced by the width of its hexagonal section HL. The transition between the third and fourth sections may use a bevel with a width between 0.1" and 0.15", followed by a slope measured from the longitudinal direction which leads to the fourth section diameter. The end of the mount adapter opposed to the fourth section may be bored out to a maximum depth Dm, and threaded to a depth Dt. An optional center drill hole CDH may be present in the fourth section. In an exemplary embodiment of the present invention, the part number may be written on a face of the second section. For each exemplary embodiment, reference characters may be further distinguished by a numeric suffix, i.e., L1-1 for length L1 in a first embodiment of a threaded type mount adapter.

Referring to FIGS. 16A-16D, a first threaded mount adapter TMA-1 may have characteristic length LC1-1, which is the combined length of the first section through the third section, with LC1-1 between 0.7 and 0.95 more preferably between 0.75 and 0.9, still more preferably between 0.8 and 0.85 of the total adapter length L1-1, with a maximum diameter to characteristic length ratio between 0.65 and 0.95, more preferably between 0.7 and 0.9, and still more preferably between 0.75 and 0.85. The threaded mount adapter TMA-1 may be used in combination with the large UMFD. The first section may have a length a-1 and diameter Da-1, the second section with a length b-1 and a diameter Db-1, the third section with a length c-1 and a diameter Dc-1 equal to Da-1, and the fourth section with a length d-1 with an end diameter Dd-1 between 0.1 and 0.4, more preferably between 0.2 and 0.3, still more preferably between 0.22 and 0.27 of L1-1. HL-1 may be between 0.5 and 0.625 of L1-1. Dt-1 may be threaded with a female thread. The fourth section may be threaded with a male thread and end chamfers. The center drill hole CDH-1 may have a maximum diameter and a maximum depth. The depth Dm-1 of the bore may be followed by a conical countersink.

Referring to FIGS. 17A-17D, a second threaded mount adapter TMA-2 may have characteristic length LC1-2, which is the combined length of the first through third sections with LC1-2 between 0.5 and 0.8, more preferably between 0.6 and 0.7, still more preferably between 0.65 and 0.75 of the total adapter length L1-2, with a maximum diameter to characteristic length ratio between 1.6 and 1.9, more preferably between 1.65 and 1.85, and still more preferably between 1.7 and 1.8. The threaded mount adapter TMA-2 may be used in combination with the large UMFDs. The first section may have a length a-2 and diameter Da-2, the second section with a length b-2 and a diameter Db-2, the third section with a length c-2 and a diameter Dc-2 equal to Da-2, and the fourth section with a length d-2 and an end diameter Dd-2. HL-2 may be between 0.6 and 1.35, more preferably between 0.7 and 1.25, still more preferably between 0.8 and 1.15 of L1-2. Dt-2 may be threaded with a female thread. The fourth section may be threaded with a male thread, and end chamfers. The center drill hole CDH-2 may have a maximum diameter and a maximum depth. The depth Dt-2 of the female threaded portion may be followed by a cylindrical countersink, with corners rounded to a maximum radius.

Referring to FIGS. 18A-18D, a third threaded mount adapter TMA-3 may have characteristic length LC1-3, which is the combined length of the first through third sections, between 0.65 and 1, more preferably between 0.7 and 0.95, still more preferably between 0.74 and 0.92 of the total length L1-3, with a maximum diameter to characteristic length ratio between 0.85 and 1.15, more preferably between 0.9 and 1.1, and still more preferably between 0.95 and 0.99. The threaded mount adapter TMA-3 may be used in combination with the large UMFDs. The first section may have a length a-3 and diameter Da-3, the second section with a length b-3 and a diameter Db-3, the third section with a length c-3 and a diameter Dc-3 equal to Da-3, and the fourth section with a length d-3 and an end diameter Dd-3. HL-3 may be between 0.4 and 0.91, more preferably between 0.5 and 0.81, still more preferably between 0.6 and 0.71 of L1-3. Dt-3 may be threaded with a female thread. The fourth section may be threaded with a male thread, and end chamfers. The center drill hole CDH-3 may have a maximum diameter and a maximum depth. The depth Dm-3 of the bore may be followed by a conical countersink.

Referring to FIGS. 19A-19D, a fourth threaded mount adapter TMA-4 may have characteristic length LC1-4, which is the combined length of the first through third sections, between 0.4 and 0.8, more preferably between 0.5 and 0.75, still more preferably between 0.55 and 0.71 of the total length L1-4, with a maximum diameter to characteristic length ratio between 1.75 and 2.05, more preferably between 1.8 and 2, and still more preferably between 1.85 and 1.95. The threaded mount adapter TMA-4 may be used in combination with the large UMFDs. The first section may have a length a-4 and diameter Da-4, the second section with a length b-4 and a diameter Db-4, the third section with a length c-4 and a diameter Dc-4 equal to Da-4, and the fourth section with a length d-4 and an end diameter Dd-4. HL-4 may be between 0.75 and 1.55, more preferably between 0.8 and 1.5, still more preferably between 0.83 and 1.2 of L1-4. Dt-4 may be threaded with a female thread. The fourth section may be threaded with a male thread, and end chamfers. The center drill hole CDH-4 may have a maximum diameter to a maximum depth. The depth Dt-4 of the female threaded portion may be followed by a cylindrical countersink, with corners rounded to a maximum radius.

Referring to FIGS. 20A-20D, a fifth threaded mount adapter TMA-5 may have characteristic length LC1-5 which is the combined length of the first through third sections, between 0.7 and 0.9, more preferably between 0.75 and 0.83, still more preferably between 0.78 and 0.8 of the total length L1-5, with a maximum diameter to characteristic length ratio between 1.2 and 1.35, more preferably between 1.22 and 1.3, and still more preferably between 1.25 and 1.27. The threaded mount adapter TMA-5 may be used in combination with the large UMFDs. The first section may have a length a-5 and diameter Da-5, the second section with a length b-5 and a diameter Db-5, the third section with a length c-5 and a diameter Dc-5 equal to Da-5, and the fourth section with a length d-5 and an end diameter Dd-5. HL-5 may be between 0.55 and 1, more preferably between 0.6 and 0.94, still more preferably between 0.625 and 0.93 of L1-5. Dt-5 may be threaded with a female thread. The fourth section may be threaded with a male thread, and end chamfers. The center drill hole CDH-5 may have a maximum diameter to a maximum depth. The depth Dm-5 of the bore may be followed by a conical countersink.

Referring to FIGS. 21A-21D, a sixth threaded mount adapter TMA-6 may have characteristic length LC1-6 which is the combined length of the first through third sections, between 0.5 and 0.78, more preferably between 0.55 and 0.73, still more preferably between 0.61 and 0.68 of the total length L1-6, with a maximum diameter to characteristic length ratio between 2.65 and 2.95, more preferably between 2.7 and 2.9, and still more preferably between 2.75 and 2.85. The threaded mount adapter TMA-6 may be used in combination with the small UMFDs. The first section may have a length a-6 and diameter Da-6, the second section with a length b-6 and a diameter Db-6, the third section with a length c-6 and a diameter Dc-6 equal to Da-6, and the fourth section with a length d-6 and an end diameter Dd-6. HL-6 may be between 1 and 1.9, more preferably between 1.1 and 1.8, still more preferably between 1.15 and 1.78 of L1-6. Dm-6 may be threaded with a female thread. The fourth section may be threaded with a male thread, and end chamfers. The center drill hole CDH-6 may have a maximum diameter to a maximum depth. The depth Dt-6 of the female threaded portion may be followed by a cylindrical countersink, with corners rounded to a maximum radius.

Referring to FIGS. 22A-22D, a seventh threaded mount adapter TMA-7 may have characteristic length LC1-7 which is the combined length of the first through third sections, between 0.75 and 0.95, more preferably between 0.8 and 0.9, still more preferably between 0.83 and 0.86 of the total length L1-7, with a maximum diameter to characteristic length ratio between 0.9 and 1.1, more preferably between 0.92 and 1, and still more preferably between 0.95 and 0.97. The threaded mount adapter TMA-7 may be used in combination with the small UMFDs. The first section may have a length a-7 and diameter Da-7, the second section with a length b-7 and a diameter Db-7, the third section with a length c-7 and a diameter Dc-7 equal to Da-7, and the fourth section with a length d-7 and an end diameter Dd-7. HL-7 may be between 0.3 and 1, more preferably between 0.4 and 0.9, still more preferably between 0.5 and 0.8 of L1-7. Dt-7 may be threaded with a female thread. The fourth section may be threaded with a male thread and end chamfers. The center drill hole CDH-7 may have a maximum diameter to a maximum depth. The depth Dm-7 of the bore may be followed by a conical countersink.

Referring to FIGS. 23A-23D, an eighth threaded mount adapter TMA-8 may have characteristic length LC1-8, which is the combined length of the first through third sections, between 0.65 and 0.85, more preferably between 0.7 and 0.8, still more preferably between 0.73 and 0.76 of the total length L1-8, with a maximum diameter to characteristic length ratio between 1.75 and 2.05, more preferably between 1.8 and 2, and still more preferably between 1.85 and 1.95. The threaded mount adapter TMA-8 may be used in combination with the small UMFDs. The first section may have a length a-8 and diameter Da-8, the second section with a length b-8 and a diameter Db-8, the third section with a length c-8 and a diameter Dc-8 equal to Da-8, and the fourth section with a length d-8 and an end diameter Dd-8. HL-8 may be between 0.8 and 1.4, more preferably between 0.85 and 1.35, still more preferably between 0.88 and 1.32 of the total length L1-8. Dt-8 may be threaded with a female thread. The fourth section may be threaded with a male thread, and end chamfers. The center drill hole CDH-8 may have a maximum diameter to a maximum depth. The depth Dt-8 of the female threaded portion may be followed by a cylindrical countersink, with corners rounded to a maximum radius.

Referring to FIGS. 24A-24D, a ninth threaded mount adapter TMA-9 may have characteristic length LC1-9, which is the combined length of the first through third sections between 0.7 and 0.92, more preferably between 0.75 and 0.87, still more preferably between 0.8 and 0.83 of the total length L1-9, with a maximum diameter to characteristic length ratio between 1.15 and 1.45, more preferably between 1.2 and 1.4, and still more preferably between 1.25 and 1.35. The threaded mount adapter TMA-9 may be used in combination with the small UMFDs. The first section may have a length a-9 and diameter Da-9, the second section with a length b-9 and a diameter Db-9, the third section with a length c-9 and a diameter Dc-9 equal to Da-9, and the fourth section with a length d-9 and an end diameter Dd-9. HL-9 may be between 0.55 and 1.15, more preferably between 0.6 and 1.1, still more preferably between 0.65 and 1 of L1-9. Dt-9 may be threaded with a female thread. The fourth section may be threaded with a male thread, and end chamfers. The center drill hole CDH-9 may have a maximum diameter to a maximum depth.

Referring to FIGS. 25A-25D, a tenth threaded mount adapter TMA-10 may have characteristic length LC1-10, which is the combined length of the first through third sections, between 0.55 and 0.75, more preferably between 0.6 and 0.7, still more preferably between 0.64 and 0.67 of the total length L1-10, with a maximum diameter to characteristic length ratio between 2.55 and 2.85, more preferably between 2.6 and 2.8, and still more preferably between 2.65 and 2.75. The threaded mount adapter TMA-10 may be used in combination with the small UMFDs. The first section may have a length a-10 and diameter Da-10, the second section with a length b-10 and a diameter Db-10, the third section with a length c-10 and a diameter Dc-10 equal to Da-10, and the fourth section with a length d-10 and an end diameter Dd-10. HL-10 may be between 0.9 and 1.8, more preferably between 1 and 1.7, still more preferably between 1.1 and 1.67 of L1-10. Dt-10 may be threaded with a female thread. The fourth section may be threaded, and end chamfers. The center drill hole CDH-10 may have a maximum diameter to a maximum depth. The depth Dt-10 of the female threaded portion may be followed by a cylindrical countersink, with corners rounded to a maximum radius.

Referring to FIGS. 26A-26D, an eleventh threaded mount adapter TMA-11 may have characteristic length LC1-11, which is the combined length of the first through third sections, between 0.65 and 0.85, more preferably between 0.7 and 0.85, still more preferably between 0.77 and 0.8 of the total length L1-11, with a maximum diameter to characteristic length ratio between 1.35 and 1.6, more preferably between 1.4 and 1.55, and still more preferably between 1.45 and 1.5. The threaded mount adapter TMA-11 may be used in combination with the small UMFDs. The first section may have a length a-11 and diameter Da-11, the second section with a length b-11 and a diameter Db-11, the third section with a length c-11 and a diameter Dc-11 equal to Da-11, and the fourth section with a length d-11 and an end diameter Dd-11. HL-11 may be between 0.65 and 1.25, more preferably between 0.7 and 1.2, still more preferably between 0.75 and 1.14 of L1-11. Dt-11 may be threaded with a female thread. The fourth section may be threaded with a male thread, and end chamfers. The center drill hole CDH-11 may have a maximum diameter to a maximum depth. The depth Dm-11 of the bore may be followed by an optional conical countersink.

Referring to FIGS. 27A-27D, a twelfth threaded mount adapter TMA-12 may have characteristic length LC1-12, which is the combined length of the first through third sections, between 0.4 and 0.75, more preferably between 0.45 and 0.7, still more preferably between 0.5 and 0.64 of the total length L1-12, with a maximum diameter to characteristic length ratio between 3 and 3.5, more preferably between 3.1 and 3.4, and still more preferably between 3.2 and 3.3. The threaded mount adapter TMA-12 may be used in combination with the small UMFDs. The first section may have a length a-12 and diameter Da-12, the second section with a length b-12 and a diameter Db-12, the third section with a length c-12 and a diameter Dc-12 equal to Da-12, and the fourth section with a length d-12 and an end diameter Dd-12. HL-12 may be between 1.1 and 1.9, more preferably between 1.2 and 1.85, still more preferably between 1.25 and 1.79 of L1-12. Dt-12 may be threaded with a female thread. The fourth section may be threaded with a male thread, and end chamfers. The center drill hole CDH-12 may have a maximum diameter to a maximum depth. The depth Dt-12 of the female threaded portion may be followed by a cylindrical countersink, with corners rounded to a maximum radius.

Referring to FIGS. 28A-28D, a thirteenth threaded mount adapter TMA-13 may have characteristic length LC1-13, which is the combined length of the first through third sections, between 0.7 and 0.9, more preferably between 0.75 and 0.85, still more preferably between 0.78 and 0.8 of the total length L1-13, with a maximum diameter to characteristic length ratio between 1.15 and 1.3, more preferably between 1.2 and 1.27, and still more preferably between 1.22 and 1.25. The threaded mount adapter TMA-13 may be used in combination with the large UMFDs. The first section may have a length a-13 and diameter Da-13, the second section with a length b-13 and a diameter Db-13, the third section with a length c-13 and a diameter Dc-13 equal to Da-13, and the fourth section with a length d-13 and an end diameter Dd-13. HL-13 may be between 0.4 and 1.1, more preferably between 0.5 and 1, still more preferably between 0.6 and 0.93 of L1-13. Dt-13 may be threaded with a female thread. The fourth section may be threaded with a male thread, and end chamfers. The center drill hole CDH-13 may have a maximum diameter to a maximum depth.

Referring to FIGS. 29A-29D, a fourteenth threaded mount adapter TMA-14 may have characteristic length LC1-14, which is the combined length of the first through third sections, between 0.55 and 0.75, more preferably between 0.6 and 0.7, still more preferably between 0.64 and 0.68 of the total length L1-14, with a maximum diameter to characteristic length ratio between 1.9 and 2.25, more preferably between 2 and 2.15, and still more preferably between 2.05 and 2.1. The threaded mount adapter TMA-14 may be used in combination with the large UMFDs. The first section may have a length a-14 and diameter Da-14, the second section with b-14 and a diameter Db-14, the third section with a length c-14 and a diameter Dc-14 equal to Da-14, and the fourth section with a length d-14 and an end diameter Dd-14. HL-14 may be between 0.75 and 1.45, more preferably between 0.8 and 1.4, still more preferably between 0.88 and 1.31 of L1-14. Dt-14 may be threaded with a female thread. The fourth section may be threaded with a male thread, and end chamfers. The center drill hole CDH-14 may have a maximum diameter of to a maximum depth.

Referring to FIGS. 30A-30D, a fifteenth threaded mount adapter TMA-15 may have characteristic length LC1-15, which is the combined length of the first through third sections, between 0.65 and 0.85, more preferably between 0.7 and 0.8, still more preferably between 0.75 and 0.77 of total length L1-15, with a maximum diameter to characteristic length ratio between 1.2 and 1.45, more preferably between 1.25 and 1.4, and still more preferably between 1.3 and 1.35. The threaded mount adapter TMA-15 may be used in combination with the large UMFDs. The first section may have a length a-15 and diameter Da-15, the second section with a length b-15 and a diameter Db-15, the third section with a length c-15 and a diameter Dc-15 equal to Da-15, and the fourth section with a length d-15 and an end diameter Dd-15 . HL-15 may be between 0.55 and 1.05, more preferably between 0.6 and 1, still more preferably between 0.625 and 0.96 of L1-15 . Dt-15 may be threaded with a female thread. The fourth section may be threaded with a male thread, and end chamfers. The center drill hole CDH-15 may have a maximum diameter to a maximum depth. The depth Dm-15 of the bore may be followed by a conical countersink.

Referring to FIGS. 31A-31D, a sixteenth threaded mount adapter TMA-16 may have characteristic length LC1-16, which is the combined length of the first through third sections, between 0.5 and 0.75, more preferably between 0.55 and 0.7, still more preferably between 0.59 and 0.65 of the total length L1-16, with a maximum diameter to characteristic length ratio between 2.5 and 2.75, more preferably between 2.55 and 2.7, and still more preferably between 2.6 and 2.65. The threaded mount adapter TMA-16 may be used in combination with the large UMFDs. The first section may have a length a-16 and diameter Da-16, the second section with a length b-16 and a diameter Db-16, the third section with a length c-16 and a diameter Dc-16 equal to Da-16, and the fourth section with a length d-16 and an end diameter Dd-16. HL-16 may be between 0.9 and 1.76, more preferably between 1 and 1.66, still more preferably between 1.1 and 1.56 of the total length L1-16. Dt-16 may be threaded with a female thread. The fourth section may be threaded with a male thread, and end chamfers. The center drill hole CDH-16 may have a maximum diameter to a maximum depth. The depth Dt-16 of the female threaded portion may be followed by a first cylindrical countersink. The first cylindrical countersink may be followed by a second cylindrical countersink.

Referring to FIGS. 32A-32D, a seventeenth threaded mount adapter TMA-17 may have characteristic length LC1-17, which is the combined length of the first through third sections, between 0.65 and 0.85, more preferably between 0.7 and 0.8, still more preferably between 0.76 and 0.78 of the total length L1-17, with a maximum diameter to characteristic length ratio between 1.9 and 2.2, more preferably between 1.95 and 2.15, and still more preferably between 2 and 2.1. The threaded mount adapter TMA-17 may be used in combination with the small UMFDs. The first section may have a length a-17 and diameter Da-17, the second section with a length b-17 and a diameter Db-17, the third section with a length c-17 and a diameter Dc-17 equal to Da-17, and the fourth section with a length d-17 and an end diameter Dd-17. HL-17 may be between 0.75 and 1.5, more preferably between 0.8 and 1.45, still more preferably between 0.88 and 1.39 of the total length L1-17. Dt-17 may be threaded with a female thread. The fourth section may be threaded with a male thread, and end chamfers. The center drill hole CDH-17 may have a maximum diameter to a maximum depth.

Referring to FIGS. 33A-33D, an eighteenth threaded mount adapter TMA-18 may have characteristic length LC1-18, which is the combined length of the first through third sections, between 0.6 and 0.9, more preferably between 0.66 and 0.83, still more preferably between 0.71 and 0.78 of the total length L1-18, with a maximum diameter to characteristic length ratio between 1.65 and 1.85, more preferably between 1.7 and 1.8, and still more preferably between 1.72 and 1.76. The threaded mount adapter TMA-18 may be used in combination with the small UMFDs. The first section may have a length a-18 and diameter Da-18, the second section with a length b-18 and a diameter Db-18, the third section with a length c-18 and a diameter Dc-18 equal to Da-18, and the fourth section with a length d-18 and an end diameter Dd-18. HL-18 may be between 0.8 and 1.5, more preferably between 0.82 and 1.3, still more preferably between 0.83 and 1.2 of the total length L1-18. Dt-18 may be threaded with a female thread. The fourth section may be threaded with a male thread, and end chamfers. The center drill hole CDH-18 may have a maximum diameter to a maximum depth.

Referring to FIGS. 34A-34D, a nineteenth threaded mount adapter TMA-19 may have characteristic length LC1-19, which is the combined length of the first through third sections, between 0.7 and 0.9, more preferably between 0.75 and 0.85, still more preferably between 0.78 and 0.8 of the total length L1-19, with a maximum diameter to characteristic length ratio between 1.25 and 1.4, more preferably between 1.3 and 1.38, and still more preferably between 1.32 and 1.36. The threaded mount adapter TMA-19 may be used in combination with the small UMFDs. The first section may have a length a-19 and diameter Da-19, the second section with a length b-19 and a diameter Db-19, the third section with a length c-19 and a diameter Dc-19 equal to Da-19, and the fourth section with a length d-19 and an end diameter Dd-19. HL-19 may be between 0.55 and 1.15, more preferably between 0.6 and 1.1, still more preferably between 0.65 and 1 of the total length L1-19. Dt-19 may be threaded with a female thread. The fourth section may be threaded with a male thread, and end chamfers. The center drill hole CDH-19 may have a maximum diameter to a maximum depth. The depth Dm-19 of the bore may be followed by a conical countersink.

Referring to FIGS. 35A-35D, a twentieth threaded mount adapter TMA-20 may have characteristic length LC1-20, which is the combined length of the first through third sections, between 0.5 and 0.75, more preferably between 0.55 and 0.7, still more preferably between 0.61 and 0.67 of the total length L1-20, with a maximum diameter to characteristic length ratio between 2.55 and 2.85, more preferably between 2.6 and 2.8, and still more preferably between 2.65 and 2.75. The threaded mount adapter TMA-20 may be used in combination with the small UMFDs. The first section may have a length a-20 and diameter Da-20, the second section with a length b-20 and a diameter Db-20, the third section with a length c-20 and a diameter Dc-20 equal to Da-20, and the fourth section with a length d-20 and an end diameter Dd-20. HL-20 may be between 1 and 1.8, more preferably between 1.1 and 1.7, still more preferably between 1.15 and 1.67 of the total length L1-20. The depth Dt-20 may threaded with a female thread of type. The fourth section may be threaded with a male thread, and end chamfers. The optional center drill hole CDH-20 may have a maximum diameter to a maximum depth. The depth Dt-20 of the female threaded portion may be followed by a cylindrical countersink, with corners rounded to a maximum radius.

Referring to FIGS. 36A-36E, a twenty-first threaded mount adapter TMA-21 may have characteristic length LC1-21, which is the combined length of the first through third sections, between 0.65 and 0.85, more preferably between 0.7 and 0.8, still more preferably between 0.75 and 0.77 of the total length L1-21, with a maximum diameter to characteristic length ratio between 1.45 and 1.7, more preferably between 1.5 and 1.65, and still more preferably between 1.55 and 1.6. The threaded mount adapter TMA-21 may be used in combination with the large UMFDs. The first section may have a length a-21 and end diameter Da-21, the second section with a length b-21 and a diameter Db-21, the third section with a length c-21 and a diameter Dc-21, and the fourth section with a length d-21 and an end diameter Dd-21. HL-21 may be between 0.65 and 1.25, more preferably between 0.7 and 1.2, still more preferably between 0.75 and 1.13 the total length L1-21. A groove G-21 may be present in the first section, adjacent to the second section. The first section may be threaded with a male thread and may comprise end chamfers. The fourth section may be threaded with a male thread, and end chamfers. The optional center drill hole CDH-21 may have a maximum diameter to a maximum depth with a conical countersink. The first section may be bored out. In addition, a square bore with side may be made, and the corners may be rounded to a maximum radius. Finally, a countersink may be applied.

Referring to FIGS. 37A-37E, a twenty-second threaded mount adapter TMA-22 may have characteristic length LC1-22, which is the combined length of the first through third sections, between 0.6 and 0.85, more preferably between 0.65 and 0.8, still more preferably between 0.72 and 0.75 of the total length L1-22, with a maximum diameter to characteristic length ratio between 1.45 and 1.7, more preferably between 1.5 and 1.65, and still more preferably between 1.55 and 1.69. The threaded mount adapter TMA-22 may be used in combination with the small UMFDs. The first section may have a length a-22 and end diameter Da-22, the second section with a length b-22 and a diameter Db-22, the third section with a length c-22 and a diameter Dc-22, and the fourth section with a length d-22 and an end diameter Dd-22. HL-22 may be between 0.65 and 1.25, more preferably between 0.7 and 1.2, still more preferably between 0.75 and 1.13 of the total length L1-22. A groove G-22 may be present in the first section, adjacent to the second section. The first section may be threaded with a male thread and may comprise end chamfers. The fourth section may be threaded with a male thread, and end chamfers. The optional center drill hole CDH-22 may have a maximum diameter to a maximum depth with a conical countersink. The first section may be bored out. In addition, a square bore may be made, where the corners may be rounded to a maximum radius. Finally, a countersink may be applied.

Referring to FIGS. 38A-38D, a twenty-third threaded mount adapter TMA-23 may have characteristic length LC1-23, which is the combined length of the first through third sections, between 0.65 and 0.85, more preferably between 0.7 and 0.8, still more preferably between 0.73 and 0.75 of the total length L1-23, with a maximum diameter to characteristic length ratio between 1.55 and 1.85, more preferably between 1.6 and 1.8, and still more preferably between 1.65 and 1.75. The threaded mount adapter TMA-23 may be used in combination with the small UMFDs. The first section may have a length a-23 and diameter Da-23, the second section with a length b-23 and a diameter Db-23, the third section with a length c-23 and a diameter Dc-23 equal to Da-23, and the fourth section with a length d-23 and an end diameter Dd-23. HL-23 may be between 0.65 and 1.35, more preferably between 0.7 and 1.3, still more preferably between 0.78 and 1.25 the total length L1-23. Dt-23 may be threaded with a female thread. The fourth section may be threaded with a male thread, and end chamfers. The center drill hole CDH-23 may have a maximum diameter to a maximum depth.

Referring to FIGS. 5A-5D a flange and bolt type mount adapter FBMA may have an overall circular shape, with total length L2, and at most four longitudinal sections. The mount adapter may have a characteristic length LC2, which is the combined length of the first through the third sections. The first section may have width w1 and end diameter d1, the second section may have width w2 and outer diameter d2, the third section may have width w3 and outer diameter d3, and the fourth section may have width w4 and end diameter d4. The first section may have at least one bore with a chamfer and an inner diameter db1, and may have a second bore with diameter db2. An optional drill relief Rf may be permissible for the first bore. The second bore may end with a conical countersink. Up to two series of holes may be present and located at diameters dh1 and dh2. Up to two series of slots may also be present with a circular portion centered at diameters ds1 and ds2, respectively, with widths W1 and W2, spaced at angle θ3 from each other respectively, the angle θ3 measured from slot centerline to slot centerline. Up to two series of semi-circular notches may also be present at the periphery of a section, with radii Rn1 and Rn2, respectively. The fourth section may be threaded with a male thread. An optional center drill hole CDH2 may be present in the fourth section. The fourth section may comprise a chamfer on its end furthest from the third section. For each exemplary embodiment, reference characters may be further distinguished by a numeric suffix, i.e., dh1-1 for hole diameter dh1 in a first embodiment of a flange and bolt type mount adapter.

FIGS. 39A-D depict a first flange and bolt mount adapter FBMA-1 with characteristic length LC2-1 between 0.45 and 0.8, more preferably between 0.5 and 0.75, still more preferably between 0.58 and 0.68 of the total length L2-1, used in combination with large UMFDs. The first section width w1-1 may have a diameter d1-1, the second section width w2-1 may have a diameter d2-1, the third section width w3-1 may have a diameter d3-1, and the fourth section width w4-1 may have a diameter d4-1, with a maximum diameter to characteristic length ratio between 3.75 and 4.25, more preferably between 3.8 and 4.2, and still more preferably between 3.9 and 4.1. The transition between third and fourth sections may be a wide groove with slope towards the fourth section. The first section may have one bore B1-1 with an external chamfer, a depth and an inner diameter db1-1. An optional drill relief Rf-1 may be permissible for the first bore B1-1 with a maximum diameter and a maximum depth. A first series of six slots S1-1 may be present with a circular portion C1-1 centered at a diameter ds1-1, with a width W1-1, evenly spaced with an angle between each slot centerline. A first series of six notches N1-1 on the second section may correspond to the first series of slots, where each notch may be aligned with a slot from the first series S1-1 and with a radius Rn1-1. A second series of six slots S2-1 may be present with a circular portion C2-1 centered at a diameter ds2-1, with a width W2-1, evenly spaced with an angle between each slot centerline. A second series of six notches N2-1 on the second section may correspond to a series of slots, such that each notch may be aligned with a slot of the second series S2-1, with a radius Rn2-1. The fourth section may be threaded with a male thread. The optional center drill hole CDH2-1 may have a maximum diameter to a maximum depth with a conical countersink.

FIGS. 40A-D depict a second flange and bolt mount adapter FBMA-2 with characteristic length LC2-2 between 0.35 and 0.55, more preferably between 0.4 and 0.5, still more preferably between 0.45 and 0.46 of the total length L2-2, used in combination with large UMFDs. The first section width w1-2 may have a diameter d1-2, the second section width w2-2 may be 0", the third section width w3-2 may have a diameter d3-2, and the fourth section width w4-2a diameter d4-2, with a maximum diameter to characteristic length ratio between 6.5 and 9, more preferably between 7 and 8.5, and still more preferably between 7.7 and 7.8. The transition between third and fourth sections may be a groove with slope towards the fourth section. The first section may have a first bore B1-2 with an external chamfer, a depth and an inner diameter db1-2. A first series of six slots S1-2 may be present with circular portion C1-2 located at an inner diameter ds1-2, with a width W1-2, evenly spaced with an angle of between each slot centerline. A second series of six slots S2-2 may be present with circular portion C2-2 located at an inner diameter ds2-2, with a width W2-2, evenly spaced with an angle of between each slot centerline. A series of six holes H1-2 may be located at a diameter dh1-2, spaced evenly with between each hole. Each hole may be threaded. To slots of the first series S1-2 may correspond notches N1-2 present in the third section, with a radius Rn1-2. Similarly, to slots of the second series S2-2 may correspond notches N2-2 present in the third section, with a radius Rn2-2. The fourth section may be threaded with a male thread. The optional center drill hole CDH2-2 may have a maximum diameter to a maximum depth with a conical countersink.

FIGS. 41A-E depict a third flange and bolt mount adapter FBMA-3 with characteristic length LC2-3 between 0.4 and 0.65, more preferably between 0.45 and 0.6, still more preferably between 0.5 and 0.55 of the total length L2-3, used in combination with small UMFDs. The first section width w1-3 may have a diameter d1-3, the second section width w2-3 may be 0", the third section width w3-3 may have a diameter d3-3, and the fourth section width w4-3a diameter d4-3, with a maximum diameter to characteristic length ratio between 7 and 9, more preferably between 7.5 and 8.5, and still more preferably between 7.8 and 8. The transition between third and fourth sections may be a wide groove with slope towards the fourth section. The first section may have a first bore B1-3 with an external chamfer, a depth and an inner diameter db1-3. A first series of six holes H1-3 may be located at a diameter dh1-3, spaced evenly with between each hole. Each hole may be threaded. A second series of six holes H2-3 may be located at a diameter dh2-3 and threaded. Two series of six slots, a first series S1-3, and a second series S2-3 may be also machined into the first section, as shown in FIGS. 41A-41E. To each pair of slots may correspond a notch N1-3 present in the third section, as shown in FIGS. 41A-41E. The fourth section may be threaded with a male thread. The optional center drill hole CDH2-3 may have a maximum diameter to a maximum depth with a conical countersink.

FIGS. 42A-F depict a fourth flange and bolt mount adapter FBMA-4 with characteristic length LC2-4 between 0.7 and 0.9, more preferably between 0.75 and 0.85, still more preferably between 0.81 and 0.83 of the total length L2-4, used in combination with large UMFDs. The first section width w1-4 with a diameter d1-4, the second section width w2-4 may have a diameter d2-4, the third section width w3-4 may have a diameter d3-4, and the fourth section width w4-4 may have a diameter d4-4, with a maximum diameter to characteristic length ratio between 1 and 1.8, more preferably between 1.2 and 1.6, and still more preferably between 1.3 and 1.5. The transition between third and fourth sections may be a groove with slope towards the fourth section. The first section may have a first bore B1-4 with an external chamfer, a depth and an inner diameter db1-4. A second bore B2-4 may have a diameter db2-4, a depth and a countersink. A square bore Bc-4 may be machined over the second circular bore B2-4, its corners rounded to a maximum radius. An optional drill relief Rf-4 may be permissible for the first bore B1-4. The second bore B2-4 may end with a conical countersink. A series of four holes H1-4 may be located at a diameter dh1-4, spaced evenly with between each hole. The fourth section may be threaded with a male thread.

FIGS. 43A-F depict a fifth flange and bolt mount adapter FBMA-5 with characteristic length LC2-5 between 0.6 and 0.9, more preferably between 0.65 and 0.85, still more preferably between 0.70 and 0.79 of the total length L2-5, used in combination with large UMFDs. The first section width w1-5 may have a diameter d1-5, the second section width w2-5 may be 0", the third section width w3-5 may have a diameter d3-5, and the fourth section width w4-5 may have a diameter d4-5, with a maximum diameter to characteristic length ratio between 1.8 and 2.3, more preferably between 1.95 and 2.15, and still more preferably between 1.99 and 2.1. The transition between third and fourth sections may be a groove with slope towards the fourth section. The first section may have one bore B1-5 with an external chamfer, a depth and an inner diameter db1-5, and a second bore B2-5 with a diameter db2-5, a depth and a countersink. A square bore Bc-5 may be machined over the second circular bore B2-5 to a depth, its corners rounded to a maximum radius. An optional drill relief Rf-5 may be permissible for the first bore B1-5. The second bore B2-5 may end with a conical countersink. A series of holes H1-5 may be located at a diameter dh1-5, spaced evenly between each hole. The fourth section may be threaded with a male thread. The optional center drill hole CDH2-5 may have a maximum diameter to a maximum depth with a conical countersink.

FIGS. 44A-F depict a sixth flange and bolt mount adapter FBMA-6 with characteristic length LC2-6 between 0.75 and 0.95, more preferably between 0.8 and 0.92, still more preferably between 0.83 and 0.89 of the total length L2-6, used in combination with large UMFDs. The first section width w1-6 may have a diameter d1-6, the second section width w2-6 may be 0", the third section width w3-6 may have a diameter d3-6, and the fourth section width w4-6 may have a diameter d4-6, with a maximum diameter to characteristic length ratio between 0.75 and 1.3, more preferably between 0.85 and 1.15, and still more preferably between 0.95 and 1.05. The transition between third and fourth sections may be a groove with slope towards the fourth section. The first section may have one bore B1-6 with an external chamfer, a depth and an inner diameter db1-6, and a second bore B2-6 with a diameter db2-6, a depth and a countersink. A square bore Bc-6 may be machined to a depth over the second circular bore B2-6, its corners rounded to a maximum radius. An optional drill relief Rf-6 may be permissible for the first bore B1-6. The second bore B2-6 may end with a conical countersink. A series of holes H1-6 may be located at a diameter dh1-6, spaced evenly between each hole. The fourth section may be threaded with a male thread. The optional center drill hole CDH2-6 may have a maximum diameter to a maximum depth with a conical countersink.

FIGS. 45A-F depict a seventh flange and bolt mount adapter FBMA-7 with characteristic length LC2-7 between 0.7 and 0.9, more preferably between 0.74 and 0.85, still more preferably between 0.79 and 0.8 the total length L2-7, used in combination with small UMFDs. The first section width w1-7 may have a diameter d1-7, the second section width w2-7 may be 0", the third section width w3-7 may have a diameter d3-7, and the fourth section width w4-7 may have a diameter d4-7, with a maximum diameter to characteristic length ratio between 1.8 and 2.31, more preferably between 1.95 and 2.16, and still more preferably between 2.02 and 2.04. The transition between third and fourth sections may be a groove with slope towards the fourth section. The first section may have one bore B1-7 with an external chamfer, a depth and an inner diameter db1-7. A second bore B2-7 may have a diameter db2-7, a depth and a countersink. A square bore Bc-7 may be machined over the second circular bore B2-7, its corners rounded to a maximum radius. An optional drill relief Rf-7 may be permissible for the first bore B1-7. The second bore B2-7 may end with a conical countersink. A first series of four rectangular slots S1-7 may be present with an inner diameter ds1-7, with a width W1-7, evenly spaced with an angle between each slot centerline. A second series of six rectangular slots S2-7 may be present with an inner diameter ds2-7, with a width W2-7, evenly spaced with an angle between each slot centerline. The innermost face of all rectangular slots may be rounded with a radius. A series of six notches N2-7 on the second section may correspond to the second series of slots S2-7, and each notch may be aligned with a second series slot, with a radius Rn2-7. The fourth section may be threaded with a male thread. The optional center drill hole CDH2-7 may have a maximum diameter to a maximum depth with a conical countersink.

FIGS. 46A-D depict an eighth flange and bolt mount adapter FBMA-8 with characteristic length LC2-8 between 0.4 and 0.7, more preferably between 0.45 and 0.65, still more preferably between 0.5 and 0.6 of the total length L2-8, used in combination with small UMFDs. The first section width w1-8 may have a diameter d1-8, the second section width w2-8 may be 0", the third section width w3-8 may have a diameter d3-8, and the fourth section width w4-8 may have a diameter d4-8, with a maximum diameter to characteristic length ratio between 5 and 7.5, more preferably between 6 and 6.7, and still more preferably between 6.3 and 6.5. The transition between third and fourth sections may be a groove with slope towards the fourth section. The first section may have one bore B1-8 with an external chamfer, a depth and an inner diameter db1-8. An optional drill relief Rf-8 may be permissible for the first bore B1-8 with a maximum diameter and a maximum depth. A first series of four slots S1-8 may be present with a circular portion C1-8 located at a diameter ds1-8, with a width W1-8, evenly spaced with an angle between each slot centerline. A first series of four notches N1-8 may be located on the third section, and each notch may be aligned with a first series slot, with a radius Rn1-8. A second series of four slots S2-8 may be present with a circular portion C2-8 located at an inner diameter ds2-8, with a width W2-8, evenly spaced with an angle between each slot centerline. A second series of four notches N2-8 on the third section may correspond to the second series of slots S2-8, and each notch may be aligned with a second series slot, with a radius Rn2-8. The fourth section may be threaded with a male thread. The optional center drill hole CDH2-8 may have a maximum diameter to a maximum depth with a conical countersink.

FIGS. 47A-D depict a ninth flange and bolt mount adapter FBMA-9 with characteristic length LC2-9 between 0.7 and 0.9, more preferably between 0.75 and 0.85, still more preferably between 0.81 and 0.83 of the total length L2-9, used in combination with large UMFDs. The first section width w1-9 may have a diameter d1-9, the second section width w2-9 may have a diameter d2-9, the third section width w3-9 may have a diameter d3-9, and the fourth section width w4-9 may have a diameter d4-9, with a maximum diameter to characteristic length ratio between 1.5 and 2, more preferably between 1.6 and 1.9, and still more preferably between 1.75 and 1.79. The transition between third and fourth sections may be a groove with slope towards the fourth section. The first section may have one bore B1-9 with an external chamfer, a depth and an inner diameter db1-9. A first series of six slots S1-9 may be present with a circular portion C1-9 at a diameter ds1-9, with a width W1-9, evenly spaced with an angle between each slot centerline. A second series of six slots S2-9 may be present with a circular portion C2-9 diameter ds2-9, with a width W2-9, evenly spaced with an angle between each slot centerline. The fourth section may be threaded with a male thread. The optional center drill hole CDH2-9 may have a maximum diameter to a maximum depth with a conical countersink.

FIGS. 48A-D depict a tenth flange and bolt mount adapter FBMA-10 with characteristic length LC2-10 between 0.6 and 0.8, more preferably between 0.65 and 0.77, still more preferably between 0.72 and 0.72 the total length L2-10, used in combination with large UMFDs. The first section width w1-10 may have a diameter d1-10, the second section width w2-10 may have a diameter d2-10, the third section width w3-10 may have a diameter d3-10, and the fourth section width w4-10 may have a diameter d4-10, with a maximum diameter to characteristic length ratio between 2 and 3, more preferably between 2.55 and 2.8, and still more preferably between 2.65 and 2.69. The transition between third and fourth sections may be a groove with slope towards the fourth section. The first section may have one bore B1-10 with an external chamfer, a depth and an inner diameter db1-10. A first series of six slots S1-10 may be present with a circular portion C1-10 located at a diameter ds1-10, with a width W1-10, evenly spaced with an angle between each slot centerline. A second series of six slots S2-10 may be present with a circular portion C2-10 located at a diameter ds2-10, with a width W2-10, evenly spaced with an angle between each slot centerline. The fourth section may be threaded with a male thread. The optional center drill hole CDH2-10 may have a maximum diameter to a maximum depth with a conical countersink.

FIGS. 49A-E depict an eleventh flange and bolt mount adapter FBMA-11 with characteristic length LC2-11 between 0.55 and 0.8, more preferably between 0.6 and 0.75, still more preferably between 0.67 and 0.7 the total length L2-11, used in combination with large UMFDs. The first section width w1-11 may have a diameter d1-11, the second section width w2-11 may have a diameter d2-11, the third section width w3-11 may have a diameter d3-11, and the fourth section width w4-11 may have a diameter d4-11, with a maximum diameter to characteristic length ratio between 2.5 and 4, more preferably between 3 and 3.5, and still more preferably between 3.2 and 3.25. The transition between third and fourth sections may be a groove with slope towards the fourth section. The first section may have one lip, an external chamfer, and a lip diameter. In addition, the first section may comprise a bore B1-11 with a diameter db1-11, a depth and a countersink. A square bore Bc-11 may be machined over the circular bore B1-11, its corners rounded to a maximum radius. The bore B1-11 may end with a conical countersink. A series of six holes H1-11 may be located at a diameter dh1-11, spaced evenly between each hole. The fourth section may be threaded with a male thread. The optional center drill hole CDH2-11 may have a maximum diameter to a maximum depth with a conical countersink.

FIGS. 50A-E depict a twelfth flange and bolt mount adapter FBMA-12 with characteristic length LC2-12 between 0.4 and 0.65, more preferably between 0.45 and 0.58, still more preferably between 0.5 and 0.53 of the total length L2-12, used in combination with large UMFDs. The first section width w1-12 may have a diameter d1-12, the second section width w2-12 may be 0", the third section width w3-12 may have a diameter d3-12, and the fourth section width w4-12 may have a diameter d4-12, with a maximum diameter to characteristic length ratio between 5 and 6, more preferably between 5.25 and 5.5, and still more preferably between 5.35 and 5.39. The transition between third and fourth sections may be a groove with slope towards the fourth section. The first section may have a lip with an external chamfer. A bore B1-12 in the first section may have a diameter db1-12, and a countersink. A square bore Bc-12 may be machined over the circular bore B1-12, its corners rounded to a maximum radius. The bore B1-12 may end with a conical countersink. A first series of six slots S1-12 may be present with circular portion C1-12 located at an inner diameter ds1-12, with a width W1-12, evenly spaced with an angle between each slot centerline. The fourth section may be threaded with a male thread. The optional center drill hole CDH2-12 may have a maximum diameter to a maximum depth with a conical countersink.

FIGS. 51A-D depict a thirteenth flange and bolt mount adapter FBMA-13 with characteristic length LC2-13 between 0.5 and 0.7, more preferably between 0.55 and 0.65, still more preferably between 0.61 and 0.625 of the total length LC2-13, used in combination with large UMFDs. The first section width w1-13 may have a diameter d1-13, the second section width w2-13 may be 0", the third section width w3-13 may have a diameter d3-13, and the fourth section width w4-13 may have a diameter d4-13, with a maximum diameter to characteristic length ratio between 3.5 and 5, more preferably between 4 and 4.5, and still more preferably between 4.2 and 4.3. The transition between third and fourth sections may be a groove with slope towards the fourth section. The first section may have one bore B1-13 with an external chamfer, a depth and an inner diameter db1-13. An optional drill relief Rf-13 may be permissible for the first bore B1-13. A first series of six slots S1-13 may be present with circular portion C1-13 located at a diameter ds1-13, with a width W1-13, evenly spaced with an angle between each slot centerline. A second series of six slots S2-13 may be present with a circular portion C2-13 located at a diameter ds2-13, with a width W2-13, evenly spaced with an angle between each slot centerline. A series of six notches N1-13 may be located on the third section, and each notch may be aligned with a first series slot S1-13, with a radius Rn1-13. The fourth section may be threaded with a male thread. The optional center drill hole CDH2-13 may have a maximum diameter to a maximum depth with a conical countersink.

FIGS. 52A-D depict a fourteenth flange and bolt mount adapter FBMA-14 with characteristic length LC2-14 between 0.7 and 0.9, more preferably between 0.75 and 0.85, still more preferably between 0.79 and 0.8 of the total length L2-14, used in combination with large UMFDs. The first section width w1-14 may have a diameter d1-14, the second section width w2-14 may have a diameter d2-14, the third section width w3-14 may have a diameter d3-14, and the fourth section width w4-14 may have a diameter d4-14, with a maximum diameter to characteristic length ratio between 1.5 and 2.5, more preferably between 1.75 and 2.1, and still more preferably between 1.85 and 1.95. The transition between third and fourth sections may be a groove with slope towards the fourth section. The first section may have a first bore B1-14 with an external chamfer, a depth and an inner diameter db1-14. A series of six slots S1-14 may be present with circular portion C1-14 located at an inner diameter ds1-14, with a width W1-14, evenly spaced with an angle between each slot centerline. The fourth section may be threaded with a male thread. The optional center drill hole CDH2-14 may have a maximum diameter to a maximum depth with a conical countersink.

FIGS. 53A-D depict a fifteenth flange and bolt mount adapter FBMA-15 with characteristic length LC2-15 between 0.6 and 0.8, more preferably between 0.65 and 0.71, still more preferably between 0.67 and 0.69 the total length L2-15, used in combination with small UMFDs. The first section width w1-15 may have a diameter d1-15, the second section width w2-15 may have a diameter d2-15, the third section width w3-15 may have a diameter d3-15, and the fourth section width w4-15 may have a diameter d4-15, with a maximum diameter to characteristic length ratio between 2.5 and 4.5, more preferably between 3 and 4, and still more preferably between 3.5 and 3.7. The transition between third and fourth sections may be a groove with slope towards the fourth section. The first section may have a first bore B1-15 with an external chamfer, a depth and an inner diameter db1-15 . A series of six slots S1-15 may be present with circular portion C1-15 located at an inner diameter ds1-1, with a width W1-15, evenly spaced with an angle between each slot centerline. A series of six holes H1-15 may be located at a diameter dh1-15, spaced evenly between each hole, and each hole equidistant from two slots.

The fourth section may be threaded with a male thread. The optional center drill hole CDH2-15 may have a maximum diameter to a maximum depth with a conical countersink.

FIGS. 54A-D depict a sixteenth flange and bolt mount adapter FBMA-16 with characteristic length LC2-16 between 0.7 and 0.9, more preferably between 0.75 and 0.87, still more preferably between 0.8 and 0.82 of the total length L2-16, used in combination with small UMFDs. The first section width w1-16 may have a diameter d1-16, the second section width w2-16 may have a diameter d2-16, the third section width w3-16 may have a diameter d3-16, and the fourth section width w4-16 may have a diameter d4-16, with a maximum diameter to characteristic length ratio between 2.65 and 3, more preferably between 2.7 and 2.95, and still more preferably between 2.8 and 2.85. The transition between third and fourth sections may be a groove with slope towards the fourth section. The first section may have one bore B1-16 with an external chamfer, and an inner diameter db1-16. A first series of six holes H1-16 may be located at a diameter dh1-16, spaced evenly between each hole. Two additional holes AdH-16 may be positioned with 180° between each hole. The fourth section may be threaded with a male thread. The optional center drill hole CDH2-16 may have a maximum diameter to a maximum depth with a conical countersink.

FIGS. 55A-D depict a seventeenth flange and bolt mount adapter FBMA-17 with characteristic length LC2-17 between 0.75 and 0.95, more preferably between 0.8 and 0.9, still more preferably between 0.84 and 0.86 the total length L2-17, used in combination with small UMFDs. The first section width w1-17 may have a diameter d1-17, the second section width w2-17 may have a diameter d2-17, the third section width w3-17 may have a diameter d3-17, and the fourth section width w4-17 may have a diameter d4-17, with a maximum diameter to characteristic length ratio between 1.85 and 2.15, more preferably between 1.9 and 2.1, and still more preferably between 1.98 and 2.02. The transition between third and fourth sections may be a groove with slope towards the fourth section. The first section may have a bore B1-17 with an external chamfer, and an inner diameter db1-17. A series of four slots S1-17 may be present with inner circular portion C1-17 located at an inner diameter ds1-17 with outer circular portion C1b-17 located at an outer diameter, evenly spaced between each slot centerline. A first series of four holes H1-17 may be located at a diameter dh1-17, spaced evenly between each hole, with corresponding notches N2-17 with radius Rn2-17. A second series of four holes H2-17 may be located at a diameter dh2-17. To each slot S1-17 may correspond a notch N1-17 present in the second section, with a radius Rn1-17. The fourth section may be threaded with a male thread. The optional center drill hole CDH2-17 may have a maximum diameter to a maximum depth with a conical countersink.

FIGS. 56A-F depict an eighteenth flange and bolt mount adapter FBMA-18 with characteristic length LC2-18 between 0.65 and 0.95, more preferably between 0.7 and 0.88, still more preferably between 0.78 and 0.8 of the total length L2-18, used in combination with large UMFDs. The first section width w1-18 may have a diameter d1-18, the second section width w2-18 may be 0", the third section width w3-18 may have a diameter d3-18, and the fourth section width w4-18 may have a diameter d4-18, with a maximum diameter to characteristic length ratio between 1.3 and 1.8, more preferably between 1.4 and 1.7, and still more preferably between 1.5 and 1.6. The transition between third and fourth sections may be a groove with slope towards the fourth section. The first section may have a first bore B1-18 with an external chamfer, a depth and an inner diameter db1-18. An optional drill relief Rf-18 may be permissible for the first bore B1-18 with a maximum diameter and a maximum depth. A series of four slots S1-18 may be present with circular portion C1-18 located at a diameter ds1-18, with a width W1-18, evenly spaced with an angle between each slot centerline. A second bore B2-18 may be machined with a diameter db2-18, and a depth. A square bore Bc-18 may be machined over the second circular bore B2-18, its corners rounded to a maximum radius. The second bore B2-18 may end with a conical countersink. The fourth section may be threaded with a male thread. The optional center drill hole CDH2-18 may have a maximum diameter to a maximum depth with a conical countersink.

FIGS. 57A-D depict a nineteenth flange and bolt mount adapter FBMA-19 with characteristic length LC2-19 between 0.75 and 0.95, more preferably between 0.8 and 0.9, still more preferably between 0.83 and 0.84 of the total length L2-19, used in combination with large UMFDs. The first section width w1-19 may have a diameter d1-19, the second section width w2-19 may have a diameter d2-19, the third section width w3-19 may have a diameter d3-19, and the fourth section width w4-19 may have a diameter d4-19, with a maximum diameter to characteristic length ratio between 1 and 1.5, more preferably between 1.15 and 1.35, and still more preferably between 1.2 and 1.3. The transition between second and third sections may be a slope. The transition between third and fourth sections may be a groove with slope towards the fourth section. The first section may have one bore B1-19 with an external chamfer, a depth and an inner diameter db1-19. A series of four holes H1-19 may be located at a diameter dh1-19, spaced evenly between each hole. Opposite two holes from the H1-19 series the surface OpA-19 of the third section may be flattened. The fourth section may be threaded with a male thread. The optional center drill hole CDH2-19 may have a maximum diameter to a maximum depth with a conical countersink.

FIGS. 58A-F depict a twentieth flange and bolt mount adapter FBMA-20 with characteristic length LC2-20 between 0.2 and 0.4, more preferably between 0.25 and 0.35, still more preferably between 0.27 and 0.31 the total length L2-20, used in combination with large UMFDs. The first section width w1-20 may have a diameter d1-20, the second section width w2-20 may be 0", the third section width w3-20 may have a diameter d3-20, and the fourth section width w4-20 may have a diameter d4-20, with a maximum diameter to characteristic length ratio between 2.5 and 4.5, more preferably between 3 and 3.7, and still more preferably between 3.3 and 3.4. The transition between third and fourth sections may be a groove with slope towards the fourth section. The first section may have one bore B1-20 with an external chamfer, a depth and an inner diameter db1-20. A second bore B2-20 may be machined with a diameter db2-20, and a depth. A square bore Bc-20 may be machined over the second circular bore B2-20, its corners rounded to a maximum radius. The second bore B2-20 may end with a conical countersink. A first series of four holes H1-20 may be located at a diameter dh1-20, spaced evenly between each hole. A second series of four holes H2-20 may be positioned at a dh2-20 diameter, such that there may be eight evenly spaced holes. To the holes in the first series H1-20 may correspond semi-circular notches N1-20 on the third section outer diameter. To each hole in the second series H2-20 may correspond a semi-circular notch N2-20 on the third section outer diameter. Facing two opposing holes from the first series two faces OpA-20 of the third section may be flattened over a depth. The fourth section may be threaded with a male thread. The optional center drill hole CDH2-20 may have a maximum diameter to a maximum depth with a conical countersink.

FIGS. 59A-E depict a twenty-first flange and bolt mount adapter FBMA-21 with characteristic length LC2-21 between 0.7 and 0.9, more preferably between 0.75 and 0.85, still more preferably between 0.79 and 0.81 of the total length L2-21, used in combination with large UMFDs. The first section width w1-21 may have a diameter d1-21, the second section width w2-21 may have a diameter continuously decreasing between d1-21 and d2-21, the third section width w3-21 may have a diameter d3-21, and the fourth section width w4-21 may have a diameter d4-21. The transition between third and fourth sections may be a groove with slope towards the fourth section. The first section may have one bore B1-21 with an external chamfer, a depth and an inner diameter db1-21, with a maximum diameter to characteristic length ratio between 2 and 3, more preferably between 2.25 and 2.75, and still more preferably between 2.5 and 2.6. A cone-frustum shaped second bore B2-21 may be present. A series of four holes H1-21 may be located in the first section at a diameter dh1-21, spaced evenly between each hole. Four additional holes AdH-21 located on the second section may be threaded and located at the same diameter dh1-21. The third section may be machined with two flat surfaces OpA-21 facing holes from the first series H1-21, and opposite to each other. The fourth section may be threaded with a male thread. The optional center drill hole CDH2-21 may have a maximum diameter to a maximum depth with a conical countersink.

FIGS. 60A-E depict a twenty-second flange and bolt mount adapter FBMA-22 with characteristic length LC2-22 between 0.7 and 0.95, more preferably between 0.75 and 0.9, still more preferably between 0.8 and 0.83 of the total length L2-22, used in combination with small UMFDs. The first section width w1-22 may have a diameter d1-22, the second section width w2-22 may have a diameter d2-22, the third section width w3-22 may have a diameter d3-22, and the fourth section width w4-22 may have a diameter d4-22, with a maximum diameter to characteristic length ratio between 1 and 1.8, more preferably between 1.3 and 1.5, and still more preferably between 1.35 and 1.45. The transition between second and third sections may be a slope. The transition between third and fourth sections may be a groove with slope towards the fourth section. The first section may have one bore B1-22 with an external chamfer, a depth and an inner diameter db1-22. A series of four slots S1-22 may be present with circular portion C1-22 located at a diameter ds1-22, with a width W1-22, evenly spaced with an angle between each slot centerline. The surface of the third section may be flattened to form two faces OpA-22 opposite to each other and facing no slot. The fourth section may be threaded with a male thread. The optional center drill hole CDH2-22 may have a maximum diameter to a maximum depth with a conical countersink.

FIGS. 61A-F depict a twenty-third flange and bolt mount adapter FBMA-23 with characteristic length LC2-23 between 0.55 and 0.85, more preferably between 0.6 and 0.8, still more preferably between 0.65 and 0.73 the total length L2-23, used in combination with small UMFDs. The first section width w1-23 may have a diameter d1-23, the second section width w2-23 may be 0", the third section width w3-23 may have a diameter d3-23, and the fourth section width w4-23 may have a diameter d4-23, with a maximum diameter to characteristic length ratio between 2 and 3, more preferably between 2.6 and 2.8, and still more preferably between 2.65 and 2.75. The transition between third and fourth sections may be a groove with slope towards the fourth section. The first section may have one bore B1-23 with an external chamfer, a depth and an inner diameter db1-23, and a second bore B2-23 with a diameter db2-23, and a depth. A square bore Bc-23 may be machined over the second circular bore B2-23, its corners rounded to a maximum radius. The second bore B2-23 may end with a conical countersink. A first series of four slots S1-23 may be present with a circular portion C1-23 located at a diameter ds1-23, with a width W1-23, evenly spaced with an angle between each slot centerline. A first series of four notches N1-23 may be located on the third section, and each notch N1-23 may be aligned with a slot of the first series, with a radius Rn1-23. A second series of four slots S2-23 may be present with a circular portion C2-23 located at an inner diameter ds2-23, with a width W2-23, evenly spaced with an angle between each slot centerline. A second series of four notches N2-23 on the third section may correspond to the second series of slots S2-23, and each notch N2-23 may be aligned with a slot of the second series, with a radius Rn2-23. The fourth section may be threaded with a male thread. The optional center drill hole CDH2-23 may have a maximum diameter to a maximum depth with a conical countersink.

FIGS. 62A-E depict a twenty-fourth flange and bolt mount adapter FBMA-24 with characteristic length LC2-24 between 0.45 and 0.75, more preferably between 0.5 and 0.7, still more preferably between 0.58 and 0.64 of the total length L2-24, used in combination with small UMFDs. The first section width w1-24 may have a diameter d1-24, the second section width w2-24 may be 0", the third section width w3-24 may have a diameter d3-24, and the fourth section width w4-24 may have a diameter d4-24, with a maximum diameter to characteristic length ratio between 3 and 5, more preferably between 3.5 and 4.5, and still more preferably between 4 and 4.1. The transition between third and fourth sections may be a groove with slope towards the fourth section. The first section may have a bore B1-24 with an external chamfer, a depth and an inner diameter db1-24. A first series of four slots S1-24 may be present with circular portion C1-24 located at an inner diameter ds1-24, with a width W1-24, evenly spaced with an angle between each slot centerline. A second series of four slots S2-24 may be present with circular portion C2-24 located at an inner diameter ds2-24, with a width W2-24, evenly spaced with an angle between each slot centerline. A series of four holes H1-24 may be located at a diameter dh1-24, spaced evenly between each hole. The series of holes H1-24 may be offset from the first slot series S1-24. To each slot of the first series S1-24 may correspond a notch N1-24 present in the third section, with a radius Rn1-24. Similarly, to each hole of the hole series H1-24 may correspond a notch N2-24 present in the third section, with a radius Rn2-24. The fourth section may be threaded with a male thread. The optional center drill hole CDH2-24 may have a maximum diameter to a maximum depth with a conical countersink.

FIGS. 63A-D depict a twenty-fifth flange and bolt mount adapter FBMA-25 with characteristic length LC2-25 between 0.82 and 0.98, more preferably between 0.85 and 0.95, still more preferably between 0.88 and 0.91 of the total length L2-25, used in combination with small UMFDs. The first section width w1-25 may have a diameter d1-25, the second section width w2-25 may have a diameter d2-25, the third section width w3-25 may have a diameter d3-25, and the fourth section width w4-25 may have a diameter d4-25, with a maximum diameter to characteristic length ratio between 1 and 2, more preferably between 1.3 and 1.6, and still more preferably between 1.4 and 1.5. The transition between third and fourth sections may be a groove with slope towards the fourth section. The first section may have a first bore B1-25 with an external chamfer, a depth and an inner diameter db1-25. A series of four slots S1-25 may be present with circular portion C1-25 located at an inner diameter ds1-25, with a width W1-25, evenly spaced with an angle between each slot centerline. The fourth section may be threaded with a male thread. Two surfaces OpA-25 of the third section which may not be opposite to a slot may be flattened over a depth. The optional center drill hole CDH2-25 may have a maximum diameter to a maximum depth with a conical countersink.

FIGS. 64A-D depict a twenty-sixth flange and bolt mount adapter FBMA-26 with characteristic length LC2-26 between 0.45 and 0.7, more preferably between 0.5 and 0.65, still more preferably between 0.58 and 0.62 of the total length L2-26, used in combination with small UMFDs. The first section width w1-26 may have a diameter d1-26, the second section width w2-26 may be 0", the third section width w3-26 may have a diameter d3-26, and the fourth section width w4-26 may have a diameter d4-26, with a maximum diameter to characteristic length ratio between 5 and 7, more preferably between 5.5 and 6.7, and still more preferably between 6.1 and 6.2. The transition between third and fourth sections may be a groove with slope towards the fourth section. The first section may have a first bore B1-26 with an external chamfer, a depth and an inner diameter db1-26. A first series of six slots S1-26 may be present with circular portion C1-26 located at a diameter ds1-26, with a width W1-26, evenly spaced with an angle between each slot centerline. A second series of six slots S2-26 may be present with a circular portion C2-26 located at a diameter ds2-26, with a width W2-26, evenly spaced with an angle between each slot centerline. The fourth section may be threaded with a male thread. The optional center drill hole CDH2-26 may have a maximum diameter to a maximum depth with a conical countersink.

FIGS. 65A-D depict a twenty-seventh flange and bolt mount adapter FBMA-27 with characteristic length LC2-27 between 0.7 and 0.9, more preferably between 0.75 and 0.85, still more preferably between 0.8 and 0.83 of the total length L2-27, used in combination with small UMFDs. The first section width w1-27 may have a diameter d1-27, the second section width w2-27 may have a diameter d2-27, the third section width w3-27 may have a diameter d3-27, and the fourth section width w4-27 may have a diameter d4-27, with a maximum diameter to characteristic length ratio between 1.5 and 3.5, more preferably between 2 and 3, and still more preferably between 2.5 and 2.6. The transition between third and fourth sections may be a groove with slope towards the fourth section. The first section may have one bore B1-27 with an external chamfer, a depth and an inner diameter db1-27. A series of four slots S1-27 may be present with a circular portion C1-27 located at a diameter ds1-27, with a width W1-27, evenly spaced with an angle between each slot centerline. A series of four notches N1-27 on the third section may correspond to the series of slots S1-27, and each notch N1-27 may be aligned with a slot S1-27, with a radius Rn1-27. A series of four holes H1-27 may be located at a diameter dh1-27 and positioned on the first section, such that each hole may be equidistant from two slots S1-27. Each hole may be threaded. The fourth section may be threaded with a male thread. The optional center drill hole CDH2-27 may have a maximum diameter to a maximum depth with a conical countersink.

FIGS. 66A-E depict a twenty-eighth flange and bolt mount adapter FBMA-28 with characteristic length LC2-28 between 0.55 and 0.7, more preferably between 0.6 and 0.65, still more preferably between 0.61 and 0.63 of the total length L2-28, used in combination with small UMFDs. The first section width w1-28 may have a diameter d1-28, the second section width w2-28 may have an increasing diameter, the third section width w3-28 may have a diameter d3-28, and the fourth section width w4-28 may have a diameter d4-28, with a maximum diameter to characteristic length ratio between 2.5 and 4, more preferably between 3 and 3.5, and still more preferably between 3.15 and 3.25. The transition between third and fourth sections may be a groove with slope towards the fourth section. The first section may have a first bore B1-28 with an external chamfer, a depth and an inner diameter db1-28. A series of four slots S1-28 may be present with circular portion C1-28 located at an inner diameter ds1-28, with a width W1-28, evenly spaced with an angle between each slot centerline. To each slot S1-28 may correspond a notch N1-28 present in the third section, with a radius Rn1-28. Two opposing faces OpA-28 of the third section located between slots S1-28 may be flattened. The fourth section may be threaded with a male thread. The optional center drill hole CDH2-28 may have a maximum diameter to a maximum depth with a conical countersink.

A pilot adapter may be used to help align the mount adapter to a post or other mounting position on the engine. Pilot adapters may be used in combination with the flange and bolt type mount adapters. Referring to FIG. 6A-6B, a pilot adapter PA may have an overall annular shape with inner diameter g, outer diameter e, and outer lip diameter f such that g<e<f. The width of the annulus may be h, with thickness e-g. The lip may display an incline, at an angle i from the horizontal annulus surface. There may be sixteen models of pilot adapters with varying thicknesses and cross-sections. In an exemplary embodiment of the present invention, pilot adapters allow a mount adapter with a large outer diameter to assemble onto an engine mount with a smaller diameter. In an alternative embodiment pilot adapters allow a mount adapter with a small outer diameter to assemble onto an engine mount with a larger outer diameter. All pilot adapters may be made of 1018 steel. For each exemplary embodiment, reference characters may be further distinguished by a numeric suffix, i.e., g-1 for diameter g in a first embodiment of a pilot adapter.

FIGS. 67A-B depict a first pilot adapter PA-1. The total width h-1 of this pilot adapter PA-1 may be between 0.025 and 0.125, more preferably between 0.05 and 0.12, still more preferably between 0.07 and 0.1 of diameter e-1, with a maximum diameter to maximum width ratio between 8 and 13, more preferably between 9 and 12, and still more preferably between 10 and 11. This adapter may provide a transition from the larger diameter e-1 to a smaller diameter g-1, and may comprise a lip, and an outer diameter f-1, positioned at an angle i-1. There may be a chamfer on the lip side of the inner rim. The transition between the lip and the outer rim of the adapter may have a maximum radius.

FIGS. 68A-B depict a second pilot adapter PA-2. The total width h-2 of this pilot adapter PA-2 may be between 0.1 and 0.35, more preferably between 0.15 and 0.3, still more preferably between 0.18 and 0.28 of diameter e-2, with a maximum diameter to maximum width ratio between 2.5 and 5.5, more preferably between 3 and 5, and still more preferably between 4 and 4.5. This adapter may provide a transition from the larger diameter e-2 to a smaller diameter g-2, and may comprise a lip, and an outer diameter f-2, positioned at an angle i-2. There may be a chamfer on the lip side of the inner rim. The transition between the lip and the outer rim of the adapter may have a maximum radius.

FIGS. 69A-B depict a third pilot adapter PA-3. The total width h-3 of this pilot adapter PA-3 may be between 0.025 and 0.125, more preferably between 0.05 and 0.12, still more preferably between 0.07 and 0.11 of diameter f-3 positioned at an angle i-3, with a maximum diameter to maximum width ratio between 8 and 13, more preferably between 9 and 12, and still more preferably between 10 and 11. This adapter may provide a transition from the larger diameter e-3 to a smaller diameter g-3, and may comprise a lip with an outer diameter f-3, positioned at an angle i-3. There may be a chamfer on the lip side of the inner rim. The transition between the lip and the outer rim of the adapter may have a maximum radius.

FIGS. 70A-B depict a fourth pilot adapter PA-4. The total width h-4 of this pilot adapter PA-4 may be between 0.2 and 0.4, more preferably between 0.25 and 0.38, still more preferably between 0.27 and 0.36 of diameter e-4, with a maximum diameter to maximum width ratio between 2.5 and 4, more preferably between 3 and 3.5, and still more preferably between 3.2 and 3.3. This adapter may provide a transition from the larger diameter e-4 to a smaller diameter g-4. There may be four chamfers located on either side of the inner rim and either side of the outer rim.

FIGS. 71A-B depict a fifth pilot adapter PA-5. The total width h-5 of this pilot adapter PA-5 may be between 0.35 and 0.6, more preferably between 0.4 and 0.57, still more preferably between 0.44 and 0.53 of diameter e-5, with a maximum diameter to maximum width ratio between 1.75 and 2.5, more preferably between 1.9 and 2.3, and still more preferably between 2 and 2.2. This adapter may provide a transition from the larger diameter e-5 to a smaller diameter g-5. There may be two chamfers located on either side of the outer rim and two chamfers located on either side of the inner rim.

FIGS. 72A-B depict a sixth pilot adapter PA-6. The total width h-6 of this pilot adapter PA-6 may be between 0.35 and 0.6, more preferably between 0.4 and 0.55, still more preferably between 0.44 and 0.53 of diameter e-6, with a maximum diameter to maximum width ratio between 1.75 and 2.5, more preferably between 1.9 and 2.3, and still more preferably between 2 and 2.2. This adapter may provide a transition from a larger diameter e-6 to a smaller diameter g-6. There may be two chamfers located on either side of the outer rim and two chamfers located on either side of the inner rim.

FIGS. 73A-B depict a seventh pilot adapter PA-7. The total width h-7 of this pilot adapter PA-7 may be between 0.15 and 0.35, more preferably between 0.2 and 0.3, still more preferably between 0.23 and 0.28 of diameter f-7, with a maximum diameter to maximum width ratio between 3 and 4.5, more preferably between 3.7 and 4, and still more preferably between 3.8 and 3.9. This adapter with an inner diameter g-7 may provide a transition from a larger male diameter f-7, to a diameter e-7. The adapter may comprise a lip with inner diameter e-7 and outer diameter f-7 positioned at an angle i-7. There may be a chamfer located on the side of the outer rim.

FIGS. 74A-B depict an eighth pilot adapter PA-8. The total width h-8 of this pilot adapter PA-8 may be between 0.05 and 0.25, more preferably between 0.08 and 0.2, still more preferably between 0.11 and 0.16 of diameter f-8, with a maximum diameter to maximum width ratio between 6 and 9, more preferably between 6.5 and 8.5, and still more preferably between 7 and 8. A portion of width h-8 may have an inner diameter g-8, and the remaining portion of the adapter width may have the inner diameter e-8. This adapter may provide a transition from a larger diameter f-8 to a smaller diameter e-8. There may be two chamfers located on either side of the outer rim.

FIGS. 75A-B depict a ninth pilot adapter PA-9. The total width h-9 of this pilot adapter PA-9 may be between 0.03 and 0.18, more preferably between 0.05 and 0.15, still more preferably between 0.08 and 0.13 of diameter f-9, with a maximum diameter to maximum width ratio between 7.5 and 10.5, more preferably between 8 and 10, and still more preferably between 8.5 and 9.5. This adapter may provide a transition from a larger diameter e-9 to a smaller diameter g-9, and may comprise a lip with an outer diameter f-9, positioned at an angle i-9. There may be a chamfer on the lip side of the inner rim. The transition between the lip and the outer rim of the adapter may have a maximum radius.

FIGS. 76A-B depict a tenth pilot adapter PA-10. The total width h-10 of this pilot adapter PA-10 may be between 0.15 and 0.35, more preferably between 0.2 and 0.3, still more preferably between 0.23 and 0.27 of diameter e-10, with a maximum diameter to maximum width ratio between 2 and 5, more preferably between 3 and 4.5, and still more preferably between 3.5 and 4. This adapter may provide a transition from a larger diameter e-10 to a smaller diameter g-10. There may be four chamfers located on either side of the outer rim and on either side of the inner rim.

FIGS. 77A-B depict an eleventh pilot adapter PA-11. The total width h-11 of this pilot adapter PA-11 may be between 0.2 and 0.4, more preferably between 0.25 and 0.35, still more preferably between 0.3 and 0.4 of diameter e-11, with a maximum diameter to maximum width ratio between 2 and 4, more preferably between 2.5 and 3.5, and still more preferably between 2.75 and 3. This adapter may provide a transition from a diameter e-11 to a diameter g-11. There may be two chamfers located on either side of the outer rim.

FIGS. 78A-B depict a twelfth pilot adapter PA-12. The total width h-12 of this pilot adapter PA-12 may be between 0.4 and 0.7, more preferably between 0.45 and 0.65, still more preferably between 0.5 and 0.6 of diameter e-12, with a maximum diameter to maximum width ratio between 1 and 2.5, more preferably between 1.6 and 2.1, and still more preferably between 1.8 and 1.9. This adapter may provide a transition from a larger diameter e-12 to a smaller diameter g-12. There may be four chamfers located on either side of the outer rim and on either side of the inner rim.

FIGS. 79A-B depict a thirteenth pilot adapter PA-13. The total width h-13 of this pilot adapter PA-13 may be between 0.03 and 0.23, more preferably between 0.05 and 0.2, still more preferably between 0.1 and 0.15 of diameter e-13, with a maximum diameter to maximum width ratio between 6 and 9, more preferably between 7 and 8.5, and still more preferably between 7.8 and 7.9. This adapter may provide a transition from a larger diameter e-13 to a smaller diameter g-13. There may be four chamfers located on either side of the outer rim and on either side of the inner rim.

FIGS. 80A-B depict a fourteenth pilot adapter PA-14. The total width h-14 of this pilot adapter PA-14 may be between 0.2 and 0.35, more preferably between 0.23 and 0.31, still more preferably between 0.25 and 0.29 of diameter f-14, with a maximum diameter to maximum width ratio between 2.5 and 4.5, more preferably between 3 and 4, and still more preferably between 3.6 and 3.7. This adapter with an inner diameter g-14 may provide a transition from a larger male diameter f-14, to a diameter e-14. The adapter may comprise a lip with inner diameter e-14 and outer diameter f-14 positioned at an angle i-14. There may be a chamfer located on the side of the outer rim.

FIGS. 81A-B depict a fifteenth pilot adapter PA-15. The total width h-15 of this pilot adapter PA-15 may be between 0.03 and 0.18, more preferably between 0.05 and 0.15, still more preferably between 0.08 and 0.13 of diameter f-1, with a maximum diameter to maximum width ratio between 7 and 11, more preferably between 7.5 and 10.5, and still more preferably between 8 and 10. This adapter may provide a transition from a larger diameter e-15 to a smaller diameter g-15, and may comprise a lip with an outer diameter f-15, positioned at an angle i-15. There may be a chamfer on the lip side of the inner rim. The transition between the lip and the outer rim of the adapter may have a maximum radius.

FIGS. 82A-B depict a sixteenth pilot adapter PA-16. The total width h-16 of this pilot adapter PA-16 may be between 0.15 and 0.29, more preferably between 0.18 and 0.26, still more preferably between 0.20 and 0.24 of diameter f-16, with a maximum diameter to maximum width ratio between 3 and 6, more preferably between 3.5 and 5.5, and still more preferably between 4 and 5. This adapter with an inner diameter g-16 may provide a transition from a larger male diameter f-16 to a diameter e-16. The adapter may comprise a lip with inner diameter e-16 and outer diameter f-16 positioned at an angle i-16. There may be a chamfer located on the side outer rim.

In an exemplary embodiment of the present invention, thread gauges may be used for thread inspection of threaded portions present on the thread type mount adapters. Referring to FIGS. 7A-7B, a thread gauge TG may have an overall cylindrical shape, with total length L3. The thread gauge can be divided into three sections, the first section may have width j and diameter Dj, the second section may have width k and diameter Dk, the third section may have width l and diameter Dl. Both the first and third section may be threaded, with thread designation engraved on each end. All thread gauges may be made of 4140 steel, quenched and tempered. And all thread gauges may be treated with a salt bath of nitride melonite QPQ, which may provide a uniform coating and enhances resistance to corrosion. For each exemplary embodiment, reference characters may be further distinguished by a numeric suffix, i.e., Dk-1 for diameter Dk in a first embodiment of a thread gauge.

Figure 83A:
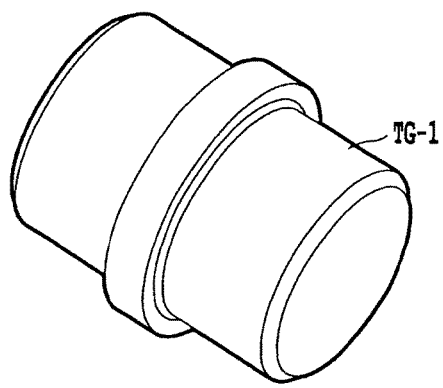
FIGS. 83A-B depict respectively a schematic isometric and cross-sectional view of a first thread gauge.
Figure 83B:
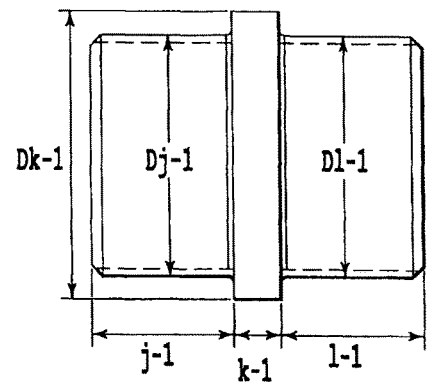

Referring to FIGS. 83A-B, the first thread gauge TG-1 may have a length L3-1 between 1.5" and 2.0", with a width j-1 and a diameter Dj-1, the second section may have a width k-1 and a diameter Dk-1, the third section may have a width l-1 and a diameter Dl-1. The first section may have at least eight threads. The third section may have at least eight threads. Each end may have a chamfer.

Figure 84A:
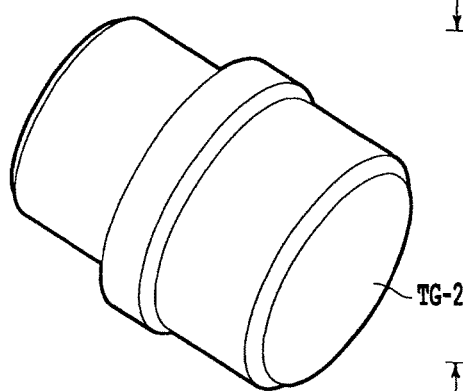
FIGS. 84A-B depict respectively a schematic isometric and cross-sectional view of a second thread gauge.
Figure 84B:
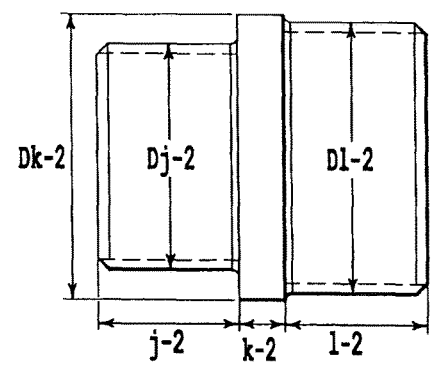

Referring to FIGS. 84A-B, the second thread gauge TG-2 may have a length L3-2 between 1" and 2.5", more preferably between 1.5" and 2", still more preferably between 1.7 and 1.8", with a width j-2 and a diameter Dj-2, the second section may have a width k-2 and a diameter Dk-2, the third section may have a width l-2 and a diameter Dl-2. The first section may have at least six threads. The third section may have at least six threads. Each end may have a chamfer.

Referring to FIGS. 85A-C, the third thread gauge TG-3 may have a length L3-3 between 1.5" and 3", more preferably between 1.75" and 2.75", still more preferably between 2 and 2.5", with a width j-3 and a diameter Dj-3, the second section may have a width k-3 and a diameter Dk-3, the third section may have a width l-3 and a diameter Dl-3. The first section may have at least eight threads. The third section may be bored out, and the bore hole may be threaded. Each end may have a chamfer.

Referring to FIGS. 87A-C and 91A-C, the holding cradle HC may comprise a wrenching plate WP and a tool cradle TC, which may be a rectangular frame with five sides welded to each other using fillet welds across the throat. Four sides of the tool cradle TC may be flat panels, one side consists of a flat plate FP with a lip on three sides. The wrenching plate WP may comprise four drill holes HC-H1 spaced apart, and may be located opposite a plate machined with a semi-circular opening HC-CO. Referring to the drill template shown in FIGS. 88A-D, the plate FP of the tool cradle TC may display four holes HC-H2, spaced between 8" to 9" apart to anchor down the holding cradle HC to the tool cart. The wrenching plate WP shown in FIG. 89 may be bolted onto the five-sided tool cradle TC on the inside, using the four pre-drilled holes HC-PD in the tool cradle TC spaced apart, using four hex bolts HC-B, four hex nuts HC-N, and eight associated washers HC-W. The wrenching plate WP may offer a rectangular slot HC-S. Finally, a stiffener plate shown in FIG. 90A-90B may comprise four drill holes HC-SH matching those HC-H2 and may be added to the bottom of the assembly between the holding cradle bottom plate FP and the tool cart.

The holding cradle HC may be placed on the tool cart. The UMFD can be positioned in the holding cradle in a stable fashion, such that the maximum diameter of the UMFD may make contact with the bottom of the holding cradle, and the receiving nut 11 of the UMFD may protrude from the holding cradle through the wrenching plate, providing access to mount on the required adapters.

Figure 8:
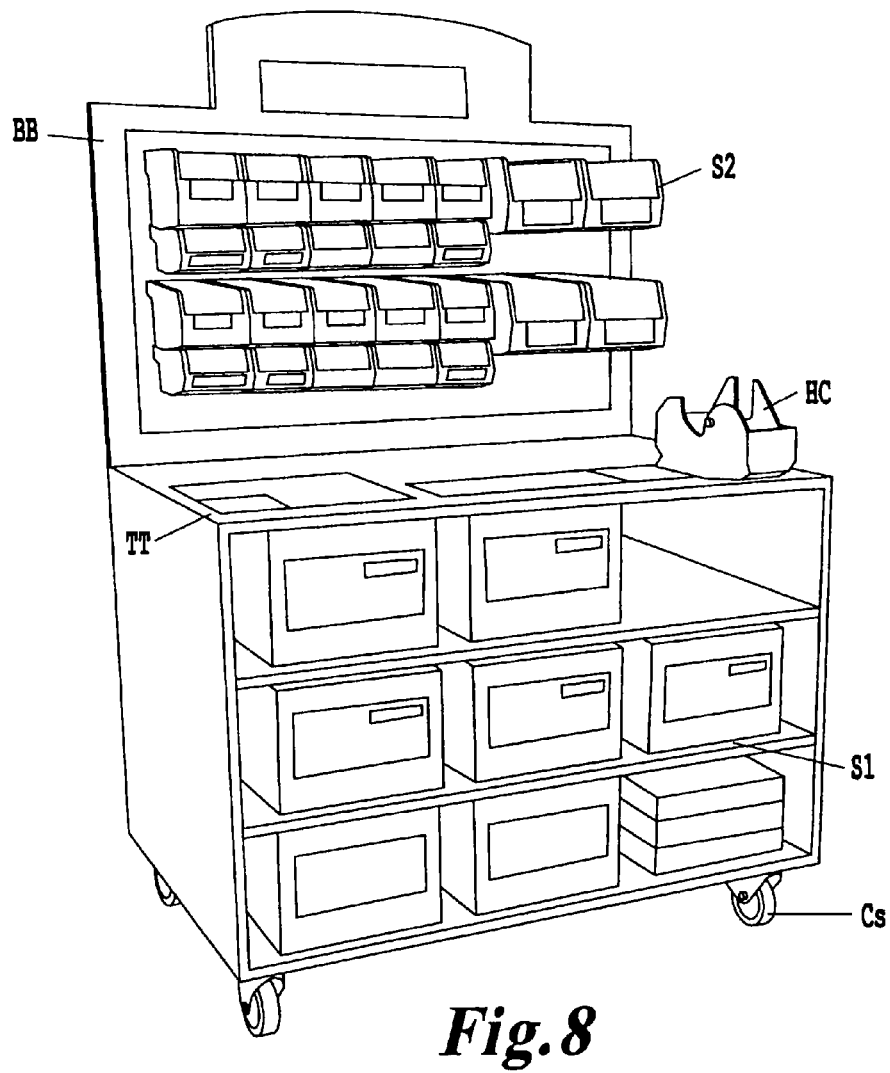
FIG. 8 depicts a tool cart for storing and accessing elements from an exemplary embodiment.

Referring to FIG. 8, in one exemplary embodiment a cart for storing easily accessible elements includes a rectangular structure comprising shelves and set on casters. All clutch heads, interchangeable brackets, drive adapters, and fan pilot adapters may be stored in a single tool cart, as shown in FIG. 8. This cart may be placed on casters Cs for maneuvering, and may comprise a tool table with a flat work surface TT, at one extremity of which a holding cradle HC may be fixed, within which a clutch head may be positioned to take apart or assemble the components within reach. The holding cradle HC may be fixed using the four bolt holes from the bottom plate, and may use the stiffener plate shown in FIG. 90A-90B as additional reinforcement. The flat surface which is the top of the lower half of the tool cart may display instructions and reference guides. In addition, the cart may comprise a backboard BB which roughly doubles the height of the rectangular structure, and on which an array of open trays S2 may be installed to hold adapter pieces required to replace the viscous clutch at hand. Each of the open trays S2 may store one type of mounting adapter or different types of mounting adapters. Below the flat surface TT, a plurality of shelves S1 may be arranged to hold larger parts such as UMFDs or fans.

Referring to FIGS. 86A-C, a fully circular spanner wrench SW may be set-up with two opposed alloy steel dowel pins DWP which protrude from the spanner wrench surface. A table which may be provided may help determine the required wrench type based on the mount adapter used. With the holding cradle HC, the clutch assembly can be immobilized, and an appropriate wrench, such as the spanner wrench, used to torque the required adapters onto the UMFD unit.

Because many possible embodiments may be made of the invention without departing from the scope thereof, it is to be understood that all matter herein set forth or shown in the accompanying drawings is to be interpreted as illustrative and not in a limiting sense.

The invention claimed is:

1. A kit for replacing a plurality of differently configured viscous fan drives, comprising:
 a plurality of universal modular viscous fan drives, each of said plurality of universal modular viscous fan drives including a viscous fluid and for serving as a substitute for a plurality of differently configured viscous fan drives, each of said plurality of universal modular viscous fan drives including a receiving nut; and
 a plurality of mount adapters, for connecting each one of the plurality of universal modular viscous fan drives to a particular engine block mount of a plurality of engine block mount configurations, the plurality of mount adapters comprising:
  a first subset of the plurality of mount adapters for threaded attachment to a subset of threaded type engine block mounts of the plurality of engine block mount configurations, and
  a second subset of the plurality of mount adapters for bolt attachment to a subset of flange and bolt type engine block mounts of the plurality of engine block mount configurations, wherein
  each mount adapter of the second subset comprises
   a first end section comprising a bore, and
   a second end section opposite the first end section and comprising a threaded region for threading into the receiving nut of one of the plurality of universal modular viscous fan drives, wherein the first end section comprises at least one of a) a plurality of spaced-apart slots extending radially inward from a circular edge of the first end section, and b) a plurality of apertures arranged radially around the bore; and
  each mount adapter of the first subset comprises:
   a first end section comprising at least a first portion of a first threaded region for threading into the receiving nut of one of the plurality of universal modular viscous fan drives;
   a second threaded region, wherein the first threaded region is coaxial with the second threaded region, and
   a central section between the first end section and the second end section, the central section having a wider diameter than both a diameter of the first end section and a diameter of the second end section;
 wherein each fan drive of the plurality of universal modular fan drives is threaded for compatibility with at least one of the first subset of the plurality of mount adapters and at least one of the second subset of the plurality of mount adapters such that each fan drive may be mounted to either a flange and bolt type engine block mount or a threaded type engine block mount.

2. The kit as claimed in claim 1, wherein the plurality of universal modular viscous fan drives comprises:
 a first group of fan drives of the plurality of universal modular viscous fan drives having a maximum outer diameter between approximately 200 mm and approximately 300 mm for serving as substitute for at least a portion of a first group of the plurality of differently configured viscous fan drives; and
 a second group of fan drives of the plurality of universal modular viscous fan drives having a maximum outer diameter between approximately 100 mm and approximately 200 mm for serving as substitute for at least a portion of a second group of the plurality of differently configured viscous fan drives, wherein the second group is different than the first group.

3. The kit as claimed in claim 1, wherein the plurality of mount adapters comprises at least fifty-one differently configured mount adapters.

4. The kit as claimed in claim 1, further comprising a plurality of pilot adapters, each of the pilot adapters being adapted to align one of the mount adapters of the second subset of the plurality of mount adapters to a mounting position on a particular flange and bolt type engine block mount of the plurality of engine block mount configurations by adapting a diameter of the respective mount adapter to a diameter of the mounting position.

5. The kit as claimed in claim 4, wherein the plurality of pilot adapters comprises at least sixteen differently configured pilot adapters.

6. The kit as claimed in claim 1, further comprising at least one fan adapter which adapts a pilot and bolt pattern of one of the plurality of universal modular viscous fan drives to a fan blade hub.

7. The kit as claimed in claim 1, wherein each of the plurality of mount adapters is adapted to mate directly to at least one of the plurality of differently configured viscous fan drives.

8. A kit for replacing a plurality of differently configured viscous fan drives, comprising:
 a plurality of universal modular viscous fan drives (UMVFDs), each of said UMVFDs including a viscous fluid and being adapted to serve as a substitute for a plurality of differently configured viscous fan drives, each of said plurality of UMVFD s including a receiving nut; and,
 a plurality of supplies of mount adapters, wherein
  each of the supplies of mount adapters contain one or more mount adapters,
  each of the supplies of mount adapters contain mount adapters configured differently relative to the mount adapters in each of the other supplies of mount adapters in the plurality of supplies of mount adapters, wherein
   in each of the supplies of mount adapters, the mount adapters therein are configured to connect each one of the plurality of UMVFDS to an engine block mount from which one of the plurality of differently configured viscous fan drives to be substituted is to be removed,
   each mount adapter in the plurality of supplies of mount adapters includes a threaded end for threading into the receiving nut of one of the plurality of UMVFDs,
   each mount adapter in a first supply of the plurality of supplies of mount adapters comprises a second threaded end coaxial with the threaded end of the first supply of the plurality of supplies of mount adapters for threading to a subset of threaded type engine block mounts of a plurality of engine block mount configurations, and
   each mount adapter in a second supply of the plurality of supplies of mount adapters comprises a bore end coaxial with the threaded end of the second supply of the plurality of supplies of mount adapters for threading to a subset of bolt and flange type engine block mounts of the plurality of engine block mount configurations, wherein
    the bore end comprises at least one of a) a plurality of spaced-apart slots extending radially inward from a circular edge of the bore end, and b) a plurality of apertures arranged radially around the bore.

9. The kit as claimed in claim 8, further comprising at least one fan adapter which adapts a pilot and bolt pattern of one of the (UMVFDs) to a fan blade hub.

10. The kit as claimed in claim 8, wherein the plurality of UMVFDs comprises at least one UMVFD having a first configuration and at least one UMVFD having a second configuration, wherein the first configuration is different from the second configuration.

11. A system for replacing a plurality of differently configured viscous fan drives comprising:
 a plurality of universal modular viscous fan drives, each of the plurality of universal modular viscous fan drives including a viscous fluid and being adapted to serve as a substitute for a plurality of differently configured viscous fan drives, each of the plurality of universal modular viscous fan drives including a receiving nut; and
 a plurality of mount adapters, each mount adapter of the plurality of mount adapters being differently configured relative to each of the other mount adapters of the plurality of mount adapters, and further being adapted to connect each one of the plurality of universal modular viscous fan drives to a particular engine block mount of a plurality of engine block mount configurations, wherein
  each mount adapter of the plurality of mount adapters includes a threaded end for threading into the receiving nut of one of the plurality of universal modular viscous fan drives,
  a first subset of the plurality of mount adapters comprises a second threaded end for threaded attachment to a subset of threaded type engine block mounts of the plurality of engine block mount configurations, wherein
   the second threaded end is coaxial with the threaded end of the first subset of the plurality of mount adapters, and
  a second subset of the plurality of mount adapters comprises a bore end for bolt attachment to a subset of flame and bolt type engine block mounts of the plurality of engine block mount configurations, wherein
   the bore end is coaxial with the threaded end of the second subset of the plurality of mount adapters, wherein
   the bore end comprises at least one of a) a plurality of spaced-apart slots extending radially inward from a circular edge of the bore end, and b) a plurality of apertures arranged radially around the bore; and
 a tool cart, comprising
  a plurality of trays, each tray in the plurality of trays configured to store a corresponding one of the plurality of supplies of mount adapters, and
  a plurality of shelves, each shelf in the plurality of shelves configured to hold at least one of the plurality of universal modular viscous fan drives.

12. The system of claim 11, wherein the plurality of shelves is disposed below the plurality of trays.

13. The kit as claimed in claim 1, wherein the first group of fan drives comprises:
 a first fan drive subgroup for serving as substitute for a first portion of the first group of the plurality of differently configured viscous fan drives; and
 a second fan drive subgroup for serving as substitute for a second portion of the first group of the plurality of differently configured viscous fan drives;

wherein the first fan drive subgroup comprises a large maximum fluid volume of the viscous fluid, and the second fan drive subgroup comprises a small maximum fluid volume of the viscous fluid, wherein the large maximum fluid volume is larger than the small maximum fluid volume.

14. The kit as claimed in claim 1, wherein the first group of fan drives comprises:
a first fan drive subgroup for serving as substitute for a first portion of the first group of the plurality of differently configured viscous fan drives; and
a second fan drive subgroup for serving as substitute for a second portion of the first group of the plurality of differently configured viscous fan drives;
wherein the first fan drive subgroup comprises designs encompassing a first range of viscosity of the viscous fluid; and
wherein the second fan drive subgroup comprises designs encompassing a second range of viscosity of the viscous fluid, wherein
the first range is different than the second range.

15. The kit as claimed in claim 1, wherein the central section comprises an angular exterior edge in the shape of an equilateral polygon.

16. The kit as claimed in claim 1, wherein each mount adapter of the second subset of the plurality of mount adapters comprises:
a central section between the first end section and the second end section;
wherein a diameter of the first end section is greater than a diameter of other sections of the respective mount adapter.

17. The kit as claimed in claim 8, wherein the first end section comprises at least one of a) a plurality of spaced-apart slots extending radially inward from a circular edge of the first end section, and b) a plurality of apertures arranged radially around the bore.

18. The kit as claimed in claim 8, wherein each mount adapter of the first subset of the plurality of mount adapters comprises:
a central section between the first end section and the second end section, the central section having a wider diameter than both a diameter of the first end section and a diameter of the second end section;
wherein the central section comprises an angular exterior edge in the shape of an equilateral polygon.

19. The system of claim 11, further comprising a holding cradle for holding a selected universal modular viscous fan drive of the plurality of universal modular viscous fan drives during assembly, the holding cradle being provided on a work surface of the tool cart.

* * * * *